United States Patent
Yamato et al.

(10) Patent No.: US 7,219,363 B2
(45) Date of Patent: May 15, 2007

(54) DEVICE AND METHOD FOR PROCESSING BROADCAST PROGRAM RELATED INFORMATION

(75) Inventors: Junichi Yamato, Tokyo (JP); Hiroshi Matoba, Tokyo (JP)

(73) Assignee: NEC Corporation, Tokyo (JP)

( * ) Notice: Subject to any disclaimer, the term of this patent is extended or adjusted under 35 U.S.C. 154(b) by 1070 days.

(21) Appl. No.: 09/906,814

(22) Filed: Jul. 18, 2001

(65) Prior Publication Data

US 2002/0016960 A1 Feb. 7, 2002

(30) Foreign Application Priority Data

Jul. 19, 2000 (JP) .............................. 2000-218298

(51) Int. Cl.
*G06F 3/00* (2006.01)
*G06F 13/00* (2006.01)
*H04N 5/445* (2006.01)

(52) U.S. Cl. .......................... 725/58; 725/39; 725/131

(58) Field of Classification Search ................. 725/58, 725/137

See application file for complete search history.

(56) References Cited

U.S. PATENT DOCUMENTS

| | | | | |
|---|---|---|---|---|
| 5,699,107 | A * | 12/1997 | Lawler et al. | 725/58 |
| 6,259,405 | B1 * | 7/2001 | Stewart et al. | 342/457 |
| 6,259,740 | B1 * | 7/2001 | Lyu | 375/240.25 |
| 6,772,433 | B1 * | 8/2004 | LaJoie et al. | 725/52 |
| 6,813,775 | B1 * | 11/2004 | Finseth et al. | 725/46 |
| 6,968,364 | B1 * | 11/2005 | Wong et al. | 709/217 |

FOREIGN PATENT DOCUMENTS

| | | |
|---|---|---|
| JP | 10-136312 | 5/1998 |
| JP | 11-69317 | 3/1999 |
| WO | PCT/US99/19541 | 8/1999 |

OTHER PUBLICATIONS

Office Action from the Japanese Patent Office Issued on Jan. 30, 2007, with English language translation, pp. 1-4.

* cited by examiner

*Primary Examiner*—Christopher Grant
*Assistant Examiner*—Justin Shepard
(74) *Attorney, Agent, or Firm*—Whitham Curtis Christofferson & Cook, PC

(57) ABSTRACT

A broadcast program related information processor is provided wherein a user can easily create a message containing a program tag corresponding to a program during watching. When externally receiving a program tag capture request, the program display controller 2 captures the program-related information of a program in displaying from the recorded-video management data 3, creates a program tag based on the program information, and then returns the created program tag to the request source. When the program tag further contains scene information, the program display controller 2 captures the scene information regarding a scene in replay at the time of capturing program related information and then utilizes the scene information at the program tag creation time. The message creator 1 transmits the program tag capture request to the program display controller 2 and then, when the program tag is returned, inserts it into the message 5.

8 Claims, 34 Drawing Sheets

| PROGRAM TAG (AREA A) | PROGRAM TAG (AREA B) | PROGRAM TAG (AREA C) | ..... |
|---|---|---|---|

US 7,219,363 B2

DEVICE AND METHOD FOR PROCESSING BROADCAST PROGRAM RELATED INFORMATION

BACKGROUND OF THE INVENTION

The present invention relates to a device and method for processing broadcast program related information. Particularly, the present invention relates to a method of creating, utilizing, and relating to broadcast-program-related-information linked with broadcast programs.

There are AV (Audio-Visual) apparatuses which video-record (sound-record) television or radio programs broadcast with terresterail waves or through a satellite on the hard disk within a PC (Personal Computer) or within a set-top box and reproduce these programs for watching and hearing them. It has been generally performed to link the PC or the set-top box to the Internet.

Moreover, there is a method for presenting the information related with a program to a user, in cooperation with the corresponding program and the method for presenting the information related with a program stored in a VCR (Video Cassette Recorder) to a user, in cooperation with the corresponding program. The former method is disclosed in the JP-A No. 69317/1999. The latter method is disclosed in the JP-A No. 136312/1998. These methods each relate to the service of showing information related to a program in watching to a user, in cooperation with the corresponding program.

Various types of information are issued from Web pages through the Internet. The Internet is being used for inter-user communications including a BBS (Bulletin Board System), chat such as IRC [Internet Relay Chat (RFC 1459, 2812)], e-mail and a mailing list.

Some pieces of information, which are exchanged over the Internet acting as a medium, are related to television and radio programs. By referring to the related information, a user may watch a program being broadcast or a video-recorded program or may reserve (or preset) video-recording.

The above-mentioned conventional program related information is merely shown in linkage with the program. Using the information regarding a television or radio program supplied through a Web page, mail, BBS, or chat over the Internet, a user has to manually watch and record the program indicated by the supplied information.

Moreover, the creator of a Web page, mail, BBS, chat, or the like has to bury program information in the Web page, mail, BBS, chat, or the like by referring to a program for watching and a program guide such as an EPG (Electric Program Guide).

The TV or radio broadcast station often broadcasts television or radio programs at different hours. In such a case, the program guides for areas have to be respectively prepared to provide the program related information.

When an already broadcast program is not video-recorded, it is impossible to watch and hear it. Although the program may be re-broadcast at a later time, the schedule has to be confirmed by consulting the program guide.

Video and sound recording of television and radio programs are permitted only for personal uses. Hence, even if issuing information regarding television and radio programs through the Internet is tried, the copyright law inhibits persons from sending the audio and video of broadcast programs.

Therefore, the intention of an information sender has to be expressed using only information regarding texts except copyrighted materials possessed by a broadcast station. The intention of the information sender cannot be accurately shown using only such information.

SUMMARY OF THE INVENTION

The present invention is made to solve the above-mentioned problems. An object of the present invention is to provide to a broadcast program related information processor wherein a user can easily create a message containing a program tag corresponding to a program during watching. An object of the present invention is to provide to a broadcast program a related information processing method suitable for the above-mentioned processor.

Another object of the present invention is to provide a broadcast program related information processor wherein a user can easily create a message containing a program tag corresponding to a program using an Electric Program Guide. Another object of the present invention is to provide a broadcast program related information processing method suitable for the above-mentioned processor.

Another object of the present invention is to provide a broadcast program related information processor wherein a user can easily watch a program specified by a program tag in a message. Another object of the present invention is to provide a broadcast program related information processing method suitable for the above-mentioned processor.

Another object of the present invention is to provide a broadcast program related information processor wherein a user can easily reserve or preset the video-recording of a program specified by a program tag in a message. Another object of the present invention is to provide a broadcast program related information processing method suitable for the above-mentioned processor.

Another object of the present invention is to provide a broadcast program related information processor that can easily automatically decide whether or not a program corresponding to a program tag in a message can be recorded or watched, thus facilitating watching or reservation of video-recording. Another object of the present invention is to provide a broadcast program related information processing method suitable for the above-mentioned processor.

Another object of the present invention is to provide a broadcast program related information processor that can easily automatically decide whether or not a program corresponding to a program tag in a message can be recorded or watched, thus indicating the state of the program to a user. Another object of the present invention is to provide a broadcast program related information processing method suitable for the above-mentioned processor.

Another object of the present invention is to provide a broadcast program related information processor that can facilitate watching or reservation of video-recording while differences in broadcast hours between areas are concealed. Another object of the present invention is to provide a broadcast program related information processing method suitable for the above-mentioned processor.

Another object of the present invention is to provide a broadcast program related information processor wherein, if a program broadcast in another hour is recorded, the same program can be easily watched. Another object of the present invention is to provide a broadcast program related information processing method suitable for the above-mentioned processor.

Another object of the present invention is to provide a broadcast program related information processor that can easily reserve or preset the video-recording of an unbroadcast program to be broadcast in another hour. Another object of the present invention is to provide a broadcast program related information processing method suitable for the above-mentioned processor.

According to one aspect of the present invention, a broadcast program related information processor comprises a creator for creating at least a program tag referring to the program based on information regarding a program during watching received from the program display controller, the program display controller display-controlling a telecast program during video-recording or broadcasting and a stored program during replaying; and an inserter for inserting the created program tag into a location externally specified.

In the broadcast program related information processor, a message containing the program tag is created based on the content of an EPG (Electric Program Guide) containing predetermined broadcast program information.

The broadcast program related information processor further comprises means for instructing the program display controller to replay a program specified in accordance with program tag information externally specified during displaying the message.

The broadcast program related information processor further comprises means for issuing an instruction for reserving the video-recording of a program specified in accordance with program tag information externally specified during displaying the message.

The broadcast program related information processor further comprises a decider for deciding whether or not a program specified with a program tag externally specified during displaying the message is a program before or during broadcasting or in a recorded state. The decider, when determining a program before broadcasting, issues an instruction for reserving the video-recording of a program specified in accordance with the program tag information. The decider, when determining a program during broadcasting or a recorded program, issues an instruction for replaying a program specified in accordance with the program tag information.

The broadcast program related information processor further comprises means for displaying when a program specified with a program tag in a message to be displayed is before broadcasting, a program tag in a representation method representing a record reservable state; means for displaying, when a program specified with the program tag is during broadcasting or in a recorded state, a program tag in a representation method of representing a displayable state; and means for displaying, when a program specified with the program tag is in an already-recorded state and in a non-recorded state, a program tag in a representation method of representing a non-displayable state.

The broadcast program related information processor further comprises a database for storing correspondence relationships between program tags different at every area; and means for converting a program tag in a message transmitted from a different area based on the database and in accordance with an area representing the program.

The broadcast program related information processor further comprises means for converting, when a program with the same content is rebroadcast at a different time, a program tag buried in the message into a program tag with the same content of a program during broadcasting or in a recorded state.

The broadcast program related information processor further comprises means for converting, when a program with the same content is rebroadcast at a different time, a program tag buried in the message into a program tag of a program with the same content before broadcasting.

In another aspect of the present invention, a broadcast program related information processing method; comprises the steps of creating at least a program tag referring to a program tag based on information on a program while watching received from a program display controller, the program display controller display-controlling a telecast program during video-recording or broadcasting and a stored program during replaying; and inserting the created program tag into a location externally specified.

In the broadcast program related information processing method, a message including the program tag is created based on the content of an EPG (Electric Program Guide) containing predetermined broadcast program information.

The broadcast program related information processing method further comprises the step of instructing the program display controller to replay a program specified in accordance with program tag information externally specified during displaying the message.

The broadcast program related information processing method further comprises the step of issuing an instruction for reserving the video-recording of a program specified in accordance with program tag information externally specified during displaying the message.

The broadcast program related information processing method further comprises the step of deciding whether or not a program specified with a program tag externally specified during displaying the message is before or during broadcasting or in a recorded state. An instruction for reserving the video-recording of a program specified in accordance with the program tag information is issued upon determining a program before broadcasting. An instruction for replaying a program specified in accordance with the program tag information is issued upon determining a program during broadcasting or a recorded program.

The broadcast program related information processing method comprises the steps of displaying, when a program specified with a program tag in a message to be displayed is before broadcasting, a program tag in a representation method representing a record reservable state; displaying, when a program specified with the program tag is during broadcasting or in a recorded state, a program tag in a representation method of representing a displayable state; and displaying, when a program specified with the program tag is in an already-broadcast state and in a non-recorded state, a program tag in a representation method of representing a non-displayable state.

The broadcast program related information processing method further comprises the step of converting a program tag in a message transmitted from a different area based on a database and in accordance with an area representing the program, the database storing correspondence relationships between program tags different at every area.

The broadcast program related information processing method further comprises the step of converting, when a program with the same content is rebroadcast at a different time, a program tag buried in the message into a program tag with the same content of a program during broadcasting or in a recorded state.

The broadcast program related information processing method further comprises the step of converting, when a program with the same content is rebroadcast at a different time, a program tag buried in the message into a program tag of a program with the same content before broadcasting.

That is, in the broadcast program related information processor, a program tag defined in the information format for linking to a TV or radio program is introduced in a message configured of information such as a text.

There are as the program tag three tags including a "program specifying tag", a "series program batch specifying tag", and a "program/point-in-program specifying tag". The "program specifying tag" identifies each program. The "series program batch specifying tag" links a regularly telecast program such as a program telecast every week or an irregularly telecast program with the same title or series. The "program/point-in-program specifying tag" specifies a scene contained in a program specified by a tag. The program tag is applicable to a past broadcast program, a currently broadcast program, and a later broadcast program.

The message has an information structure chiefly including a text transmitted through a Web page, mail, BBS or chat. One message may contain plural program tags. The message may contain information on the linking to an image or other messages, in addition to a text.

There is a difference in meaning between the message and the EPG (Electric Program Guide). The EPG is configured of information for introducing TV programs such as a program title or a performer. The message has a program tag for referring to a program and contains not only program related information but also other types of information.

The present invention is directed to not only television broadcast but also radio broadcast. In the description, "watching" means not only watching but also hearing only the sound while "video-recording" means not only video-recording but also sound recording.

More specifically, in the first aspect of the invention, the broadcast program related information processor has a message creator that creates a message containing a program tag based on program watching. The message creator receives information regarding a program during watching from a program display controller, in response to a program insertion instruction from a user, while the user creates a message. Then, the message creator creates a program tag based on the information, and inserts the created program tag into the portion in the message specified by a user. The program display controller controls displaying of a telecast program during recording or broadcast, or a stored program during replay.

In the second aspect of the invention, the broadcast program related information processor has a message creator that creates a message containing a program tag based on an EPG. The message creator receives information regarding a desired program inserted from an EPG, in response to a program tag insertion indication from a user, while the user is creating a message. Then, the broadcast program related information processor creates a program tag based on the received information, and inserts the created program tag into a portion in the message specified by the user.

In the third aspect of the invention, the broadcast program related information processor has a message display that displays a program shown with a program tag in a message. The message display instructs the program display controller to replay a specified program or a scene specified therein, in accordance with program tag information in message display specified by a user.

In the fourth aspect of the invention, the broadcast program related information processor has a message display that displays a program shown with a program tag in a message. The message display instructs the program reserver to reserve (or preset) the recording of a specified program, in accordance with program tag information specified by a user in message display.

In the fifth aspect of the invention, the broadcast program related information processor has a message display. The message display presets video-recording if the program specified with a program tag specified by a user is before broadcasting, displays the program if the specified program is in broadcasting and in viewable state, and displays the replayed program if the program is in a stored state. That is, the broadcast program related information processor automatically decides either reservation of recording of the specified program or display for replay thereof, based on the content of the program tag and current time information.

If a program specified by a program tag specified by a user in message displaying is before broadcasting, the message display instructs the program reserver to preset the recording of the specified program in accordance with program tag information specified by the user. If a program specified by a program tag specified by a user in message displaying is being broadcast or in a video recorded state, the message display instructs the program display controller to replay a specified program or a scene specified thereof.

In the sixth aspect of the invention, the broadcast program related information processing method has a message display to clarify the state of a program to a user. The message display automatically decides whether or not a program tag of a message is in any one of three states and shows the state of a program specified by a program tag. The three states include the state where a program specified by the program tag based on current time information is in a pre-broadcast state, the state where the program is recorded during broadcasting or in a already-broadcast state, and the state where a program is in an already broadcast state and in a non-recorded state.

If the program specified by the program tag in a message to be displayed is in a pre-broadcast state, the message display displays the program tag in the representation method showing that presetting of video recording is possible. If the program is recorded during broadcasting or in an already-broadcast state, the message display displays the program tag in the representation method showing that displaying is possible. If the program is in already broadcast state and in a non-recorded state, the message display displays the program tag in the representation method showing that displaying is impossible. As the representation method there are the method of changing color of a program tag, font, character modifying method (underline, bold face, italics, shading, and the like) and the method of displaying a character string showing the state.

In the seventh aspect of the invention, the broadcast program related information processor has a tag converter. The tag converter, when a broadcast station in an area telecasts a program with the same content at a different time, converts a program tag buried in a message, into the program tag of a telecast program with the same content in the area of a message receiver.

The tag converter also converts the program tag in a message transmitted from a different area into a user area, using the database having relationships between program tags different at every area. The broadcast program related information processors in the third and fourth aspect of the invention is applicable to the message displaying.

In the eighth aspect of the invention, the broadcast program related information processor has a tag converter that searches for programs with the same names from the EPG for a user area. The tag converter converts a program tag in a message transmitted from a different area into a program tag corresponding to the user area, using the EPG for the user area from the program tag information. In this case, the broadcast program related information processing method in the third and fourth aspects of the invention is applicable to display messages.

In the ninth aspect of the invention, the broadcast program related information processor has a message display that notifies a server storing a message of a user area to obtain a message and converts the message into a program tag corresponding to the user area.

The message display specifies the area of a receiver to the message storing server. The server converts a program tag in a transmitted message into a user area and then transmits the message to the message display. In this case, the broadcast program related information processing method in the third and fourth embodiments of the invention can be used for message displaying. The broadcast program related information processing method in the seventh aspect of the invention can be used for tag conversion.

The broadcast program related information processor in the tenth embodiment of the invention has a tag converter. The tag converter converts, when a program with the same content is re-telecast at a different time, a program tag buried in a message into the program tag of a program with the same content being broadcast or recorded.

When a program specified with a program tag in a message is in an already broadcast state and in a non-recorded state, the tag converter converts a program tag in the message into a program tag of a program during broadcasting or in a recorded state, based on a database having correspondences between different program tags every telecast time. In this case, the broadcast program related information processing method in the third aspect of the invention can be used for message displaying.

In the broadcast program related information processor in the eleventh embodiment of the invention, the tag converter searches for programs with the same program names from the EPG. The tag converter converts, when a program specified by a program tag in a message is in an already broadcast state and in non-recorded state, the program into the program tag of a program during broadcasting or in an already-broadcast state and in a recorded state, using the EPG from the program tag information. In this case, the broadcast program related information processing method in the third aspect of the invention can be used for message displaying.

The broadcast program related information processor in the twelfth aspect of the invention has a message display that notifies the server of recorded program information to obtain a message and converts it into a reproducible program tag by the server.

The message display transmits the program tag of a recorded program to the server storing a message. When there is a program with the same content as that of a program recorded by a user of program tags in a message to be transmitted, the server converts it into the program tag of a program recorded by a user and transmits the message to the message display. In this case, the broadcast program related information processing method in the third aspect of the invention can be used for message displaying.

In the thirteenth aspect of the invention, when a program with the same content is re-telecast at a different time, the broadcast program related information processor has a tag converter that converts a program tag buried in the message into the program tag of a program with the same content before broadcasting.

When a program specified with a program tag in a message is in an already-broadcast state, the tag converter converts the program tag in a message into the program tag before broadcasting, based on a database holding correspondences between program tags different every telecast time. In this case, the broadcast program related information processor in the fourth aspect of the invention can be used for message displaying.

In the broadcast program related information processor in the fourteenth aspect of the invention, the tag converter searches for a program the same program name from the EPG. When a program specified with a program tag in a message is in an already-broadcast state, the tag converter converts the program tag information into a program tag of the program before broadcasting, using the EPG. In this case, the broadcast program related information processing method in the fourth aspect of the invention can be used for message displaying.

In the broadcast program related information processor according to the fifteenth aspect of the invention, the server converts a program tag in a program tag before broadcasting. When there are pre-broadcast programs with the same contents corresponding to broadcast program tags in a message to be transmitted, the server transmits the message to the message display after conversion to the program tag of a pre-broadcast program. In this case, the broadcast program related information processing method in the fourth aspect of the invention can be used for message displaying.

Using information regarding television or radio programs supplied through a Web page, mail, BBS, or chat over the Internet, the above-mentioned method can easily watch and video-record the program shown by the supplied information.

Moreover, program information can be buried in a Web page, mail, BBS, or chat by consulting a program in watching and a program table such as an EPG (Electric Program Guide).

Moreover, some broadcast stations may often broadcast the same television or radio program at a different time, thus reducing differences between areas.

An already-broadcast program not video-recorded cannot be watched. However, when rebroadcast of the program may be scheduled at the time where watching is desired, the program can be easily recorded.

The video and sound recording of television and radio programs is approved only for personal uses. The copyright law inhibits an information sender from transmitting video and sound of television and radio programs through the Internet. The intention of an information sender must be expressed only by information, for example, texts, excluded from materials copyrighted by a broadcast station. However, the intention of an information sender cannot be accurately and fully expressed with the information only.

Hence, information only which are not covered by copyrights are originated through the Internet. Video or sound recorded in the personal computer of an opponent party related to the originated information is shown to the receiver, together with the originated information. Thus, the intention of an information sender can be accurately transmitted.

As described above, the present invention can provide the method of creating information to transmit the intention of an information sender to an information receiver and the method of showing originated information.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
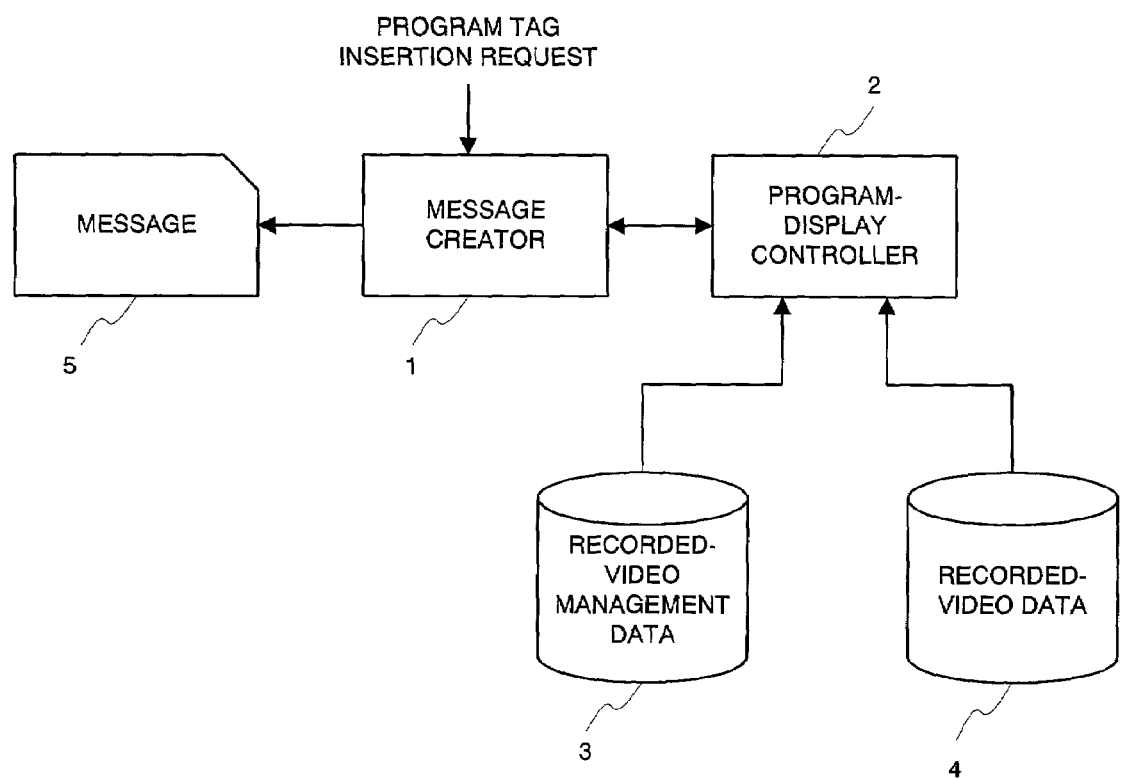
FIG. 1 is a block diagram illustrating the configuration of a broadcast program related information processor according to a first embodiment of the present invention.

Embodiments of the present invention will be described here. The embodiments of the present invention feature a program tag added to a message. Since the program tag is included in a message formed of text information, the program tag is needed to distinguish from other texts in the message.

When the message is formed of data structured like HTML (Hyper Text Markup Language) data, the program tag is distinguishable from other text in terms of the data format. That is, in the case of HTML data, a dedicated tag distinguishes the program tag.

When a message is data not structured like a text, the program tag can be distinguished from other texts by determining the format. Examples of the format are shown below. "foo" represents program information. "tvtag://" is placed in front of "foo". Space (" ") is placed behind "foo". That is, the format becomes "tvtag://foo". More specific examples are listed below:

"tvtag://broadcast station name—broadcast date—broadcast starting time"

"tvtag://broadcast station name—broadcast date—broadcast starting time—scene starting time"

"tvtag://broadcast station name—broadcast date—broadcast starting time—program name"

"tvtag://broadcast station name—broadcast date—broadcast starting time—program name—scene starting time"

The program tag includes various types of program information. A program tag (information by which a user can recognize a program) is partially displayed by a message display. For example, when a program tag includes "broadcast station, broadcast date, broadcast starting time, length of program, and program name", it is considered that the message display displays only the "program name" or "broadcast date program name" to a user.

A program tag may be formed of "program information (in example, broadcast station name•broadcast date•broadcast starting time)" and "display character string", for example, "tvtag://broadcast station name—broadcast date—broadcast starting time display character string". In such a case, the information actually displayed by the message display may be formed of only the "display character string".

The program tag may contain a tag specifying a program, a tag batch-specifying a program in a series, or a tag specifying a program and a point in time thereof.

A program tag specifying a program may have the following information:

Ex. 1. broadcast station+broadcast date+broadcast starting time

Ex. 2. area+channel number+broadcast date+broadcast starting time

Ex. 3. Ex. 1 (Ex. 2)+length of program

Ex. 4. Ex. 1 (Ex. 2, Ex. 3)+program name

Ex. 5. Program name+broadcast date

Ex. 6. Program name (series name)+sub-title

Ex. 7. Program name (series name)+number of times of broadcasting

Ex. 8. Ex. 1 (Ex. 2, Ex. 3)+Ex. 6 (Ex. 7)

In this case, "broadcasting station" is represented by the company name of a broadcast station or by its abbreviation. "area" is represented by an area name such as "KANTO (the wide area including Tokyo)" or by an abbreviation showing a prefecture name or district.

A program tag batch-specifying programs in series may have the following information:

Ex. 1. series name

Ex. 2. broadcast station+first broadcast date of a series+first broadcast starting time of a series Ex. 3. broadcast station+broadcast period+broadcast day (days)+broadcast starting time Ex. 4. Ex. 3+length of program Ex. 5. Ex. 1+Ex. 2 (Ex. 3, Ex. 4)

A program tag specifying a program or a point in time thereof may have the following information:

Ex. 1. Tag specifying a program+a relative time between a program starting time and a scene starting time Ex. 2. A tag specifying a program+information specifying a scene during data broadcasting The format is configured by adding information on a scene specifying tag to information on a program specifying tag. Through the BS (Broadcasting Satellite) digital broadcasting or the ground-waves digital broadcasting, program related information are data-transmitted in addition to video and audio. The program related information may contain scene-related information such as the beginning of a scene.

In order to reserve (preset) video-recording of the format collectively specifying series programs, there is the method of presetting (or reserving) all reservable broadcast programs corresponding to the series. Moreover, there is the method of presetting the program being reservable and having the shortest period to the broadcast, which corresponds to the series. Moreover, there is the method of indicating reservable broadcast programs corresponding to the series and then reserving the recording of only the program specified by a user.

When the format of batch-specifying series programs is used for program watching, there is the method of simultaneously displaying recorded programs corresponding to the series. Moreover, there is the method of displaying the recorded programs corresponding to the series in the order of broadcasting or in the reversed order thereof.

Moreover, there is the method of displaying the latest or oldest one from among recorded programs corresponding to the series. Moreover, there is the method of displaying a table of recorded programs corresponding to the series and displaying a program selected by a user.

In order to specify one of the above-mentioned three types used for a program tag, the method may be specified by the format of the program tag and may be specified by adding information showing the usage except program information to the program tag.

When a program tag contains as program information "broadcast station•broadcast date•broadcast starting time•length of program", the recording of programs can be preset using only the program tag, without acquiring the program information using the EPG (Electric Program Guide).

Next, an embodiment of the present invention will be described below by referring to the attached drawings. FIG. 1 is a block diagram illustrating the configuration of a broadcast program related information processor according to a first embodiment of the present invention. Referring to FIG. 1, the broadcast program related information processor includes a message creator 1, a program display controller 2, a recorded-video management data 3, and recorded-video data 4. The message creator 1 creates a message 5 through an entry of a user and with a program tag captured by a program display controller 2. The program-display controller 2 displays recorded data on a display (not shown). The recorded-video management data 3 stores information on a recorded program. The recorded-video data 4 stores data on recorded television- or radio-broadcast programs.

The message creator 1, which creates the message 5 in accordance with an instruction by a user, can save the created message 5 as a file or transfer to a server (not shown) through the Internet. The message creator 1 is a Web page creation application, a mail editor, a Web browser, or an application for chatting.

A program display controller 2 reproduces recorded-video data such as video or audio of a television or radio program in accordance with an instruction of a user. The program-display controller 2 also uses recorded-video management data 3 recording video-recorded program related information, together the recorded-video data 4.

Figure 2:
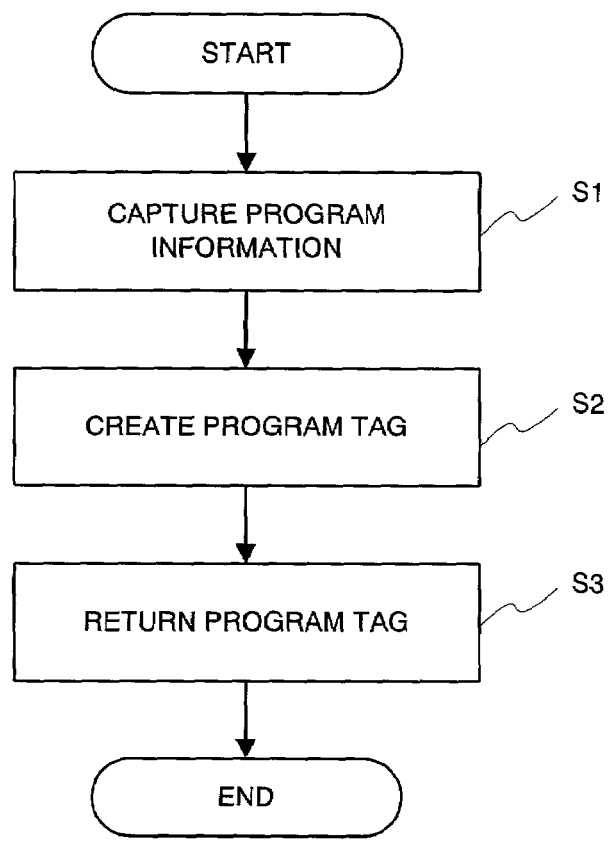
FIG. 2 is a flowchart illustrating a program tag creation process of the program-display controller in FIG. 1.
Figure 3:
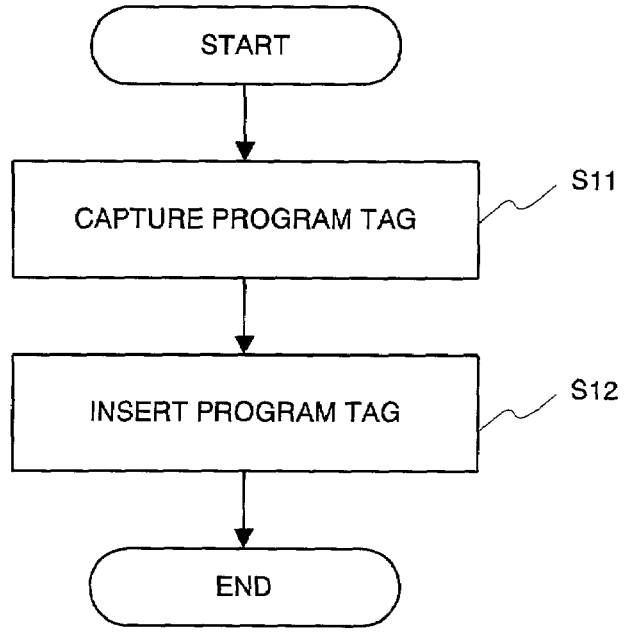
FIG. 3 is a flowchart illustrating a process of inserting a program tag into a message by the message creator of FIG. 1.

FIG. 2 is a flowchart illustrating the program tag creation process of the program display controller 2 in FIG. 1. FIG. 3 is a flowchart illustrating a process of inserting a program tag into a message by the message creator 1 of FIG. 1. The broadcast program related information processor according to the first embodiment of the present invention will be described below referring to FIGS. 1 to 3.

The program tag creation procedure of the program display controller 2 will be described by referring to FIG. 2. When externally receiving a program tag capture request (step S1 in FIG. 2), the program display controller 2 acquires program related information of a program in a display mode from the recorded-video management data 3.

In succession, the program display controller 2 creates a program tag based on the captured program information (step S2 in FIG. 2) and then returns it to the request source (step S3 in FIG. 2).

When the program tag includes scene information, the program display controller 2 captures scene information related to a scene in replay at the stage of capturing program related information and utilizes it at the time of creating a program tag.

Next, the process in which the message creator 1 inserts a program tag into the message 5 will be described below by referring to FIG. 3. When a user instructs the message creator 1 to insert a program tag into the message 5, the message creator 1 transmits a program tag capture request to the program display controller 2 (step S11 in FIG. 3). When the program display controller 2 returns the program tag, the message creator 1 inserts the returned program tag into the message 5 (step S12 in FIG. 3).

As described above, a user can easily create the message 5 containing a program tag corresponding to a program in watching using the program display controller 2. Information relating television or radio programs can be issued, together with the message 5, through a Web page, mail, BBS, or chat, over the Internet.

Figure 4:
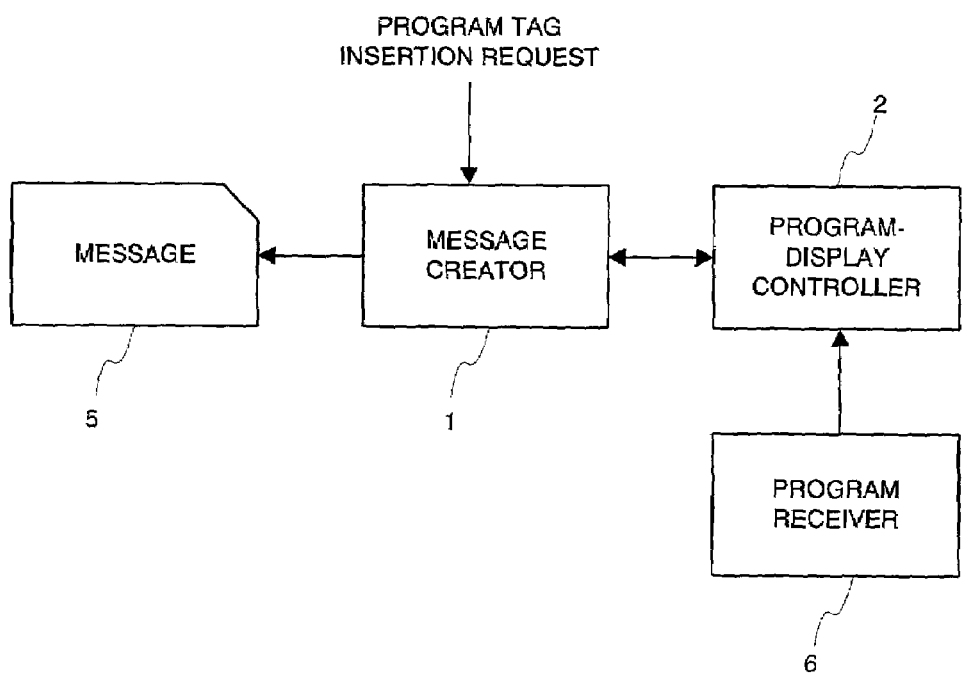
FIG. 4 is a block diagram illustrating the configuration of a broadcast program related information processor according to a second embodiment of the present invention.

FIG. 4 is a block diagram illustrating the configuration of a broadcast program related information processor according to a second embodiment of the present invention. Referring to FIG. 4, the broadcast program related information processor includes a message creator 1, a program display controller 2, and a program receiver 6. The message creator 1 creates a message based on a program tag acquired through an entry of a user and by the program display controller 2. The program display controller 2 outputs a program transmitted from the program receiver 6 onto a display. The program receiver 6 receives a TV or radio broadcast program and then changes the data format thereof. FIG. 4 shows the case where the program display controller 2 watches and listens to data in broadcasting.

The program receiver 6 converts the broadcast program received thereby into a format reproducible by the program display controller 2, including MPEG-1 (Moving Picture Experts Group phase 1) or MPEG-2 (Moving Picture Experts Group phase 2).

The program display controller 2 acquires program information from an EPG obtained through broadcasting or the Internet and holds the program related information of a program in watching. The message creator 1 operates as described above.

Figure 5:
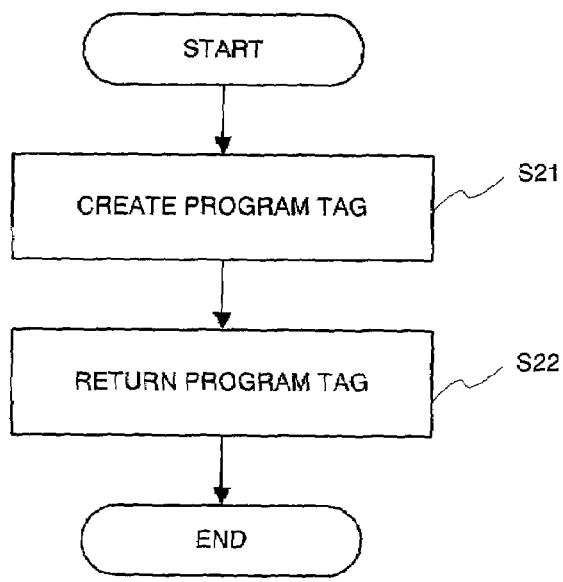
FIG. 5 is a flowchart illustrating a program tag creation process of the program-display controller in FIG. 4.

FIG. 5 is a flowchart illustrating the program tag creating process of the program display controller in FIG. 4. The operation of another configuration of a broadcast program related information processor according to the first embodiment of the present invention will be described by referring to FIGS. 4 and 5.

When externally receiving a program tag capture request, the program display controller 2 creates a program tag from the program related information of the held program in displaying (step S21 in FIG. 5) and returns the created program tag to the request source (step S22 in FIG. 5). When a program tag has scene information, the scene information related to the scene is utilized at the time of creating the program-tag.

As described above, the user can easily create the message 5 including a program tag corresponding to a program in watching by means of the program display controller 2. Information related to TV or radio programs can be issued through a Web page, mail, BBS, or chat over the Internet, using the message 5.

Figure 6:
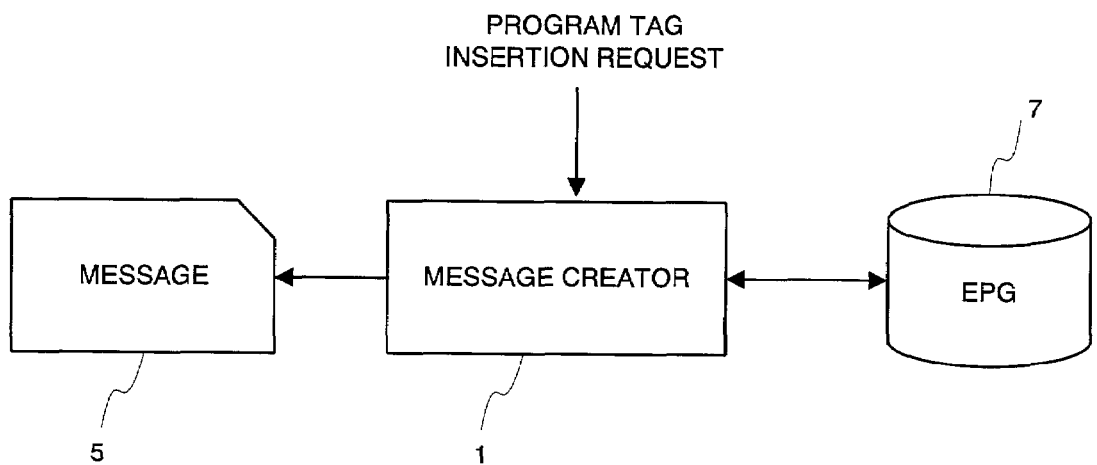
FIG. 6 is a block diagram illustrating the configuration of a broadcast program related information processor according to a third embodiment of the present invention.

FIG. 6 is a block diagram illustrating the configuration of a broadcast program related information processor according to the third embodiment of the present invention. The broadcast program related information processor includes a message creator 1 for creating the message 5 from the program tag created through an entry of an user and with an EPG 7, and an EPG 7 obtained through the Internet or broadcasting (not shown).

The user specifies a program described in the EPG 7 and then instructs the message creator 1 to insert the program tag of the specified program in the message 5. The message creator 1 creates the message 5 in accordance with the instruction from the user.

The message creator 1 can save the created message 5 as a file or can transfer it to the server (not shown) via the Internet (not shown). The message creator 1 is a Web page creation application, a mail editor, a Web browser, or an application for chatting.

Figure 7:
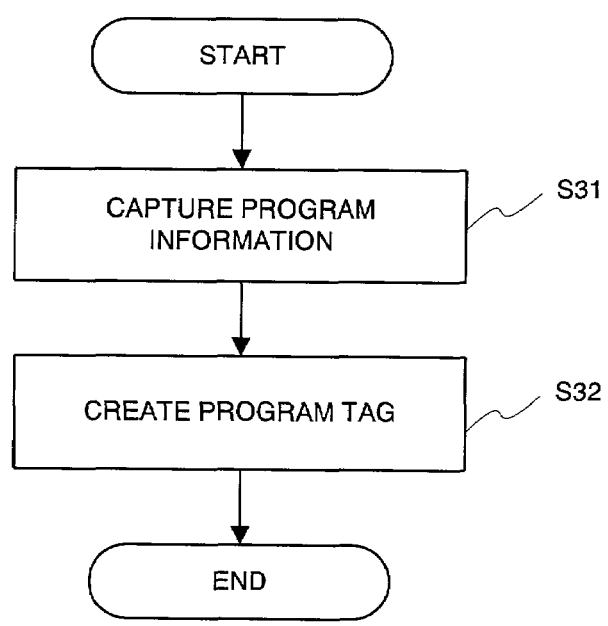
FIG. 7 is a flowchart illustrating a process of inserting a program tag into a message by the message creator of FIG. 6.

FIG. 7 is a flowchart illustrating the process of inserting a program tag into the message 5 by the message creator 1 of FIG. 6. The operation of the broadcast program related information processor according to the third embodiment of the present invention will be described below by referring to FIGS. 6 and 7.

When a user instructs the message creator 1 to insert a program tag into the message 5, the message creator 1 acquires program information of a program specified from the EPG 7 (step S31 in FIG. 7).

In succession, the message creator 1 creates a program tag based on the program information captured from the EPG 7 and then inserts it into the message 5 (step S32 in FIG. 7).

As described above, the message 5 containing the program tag corresponding to a program can be easily created using the EPG 7. Information regarding TV or radio programs can be issued using the message 5 through a Web page, mail, BBS, or chat over the Internet.

Figure 8:
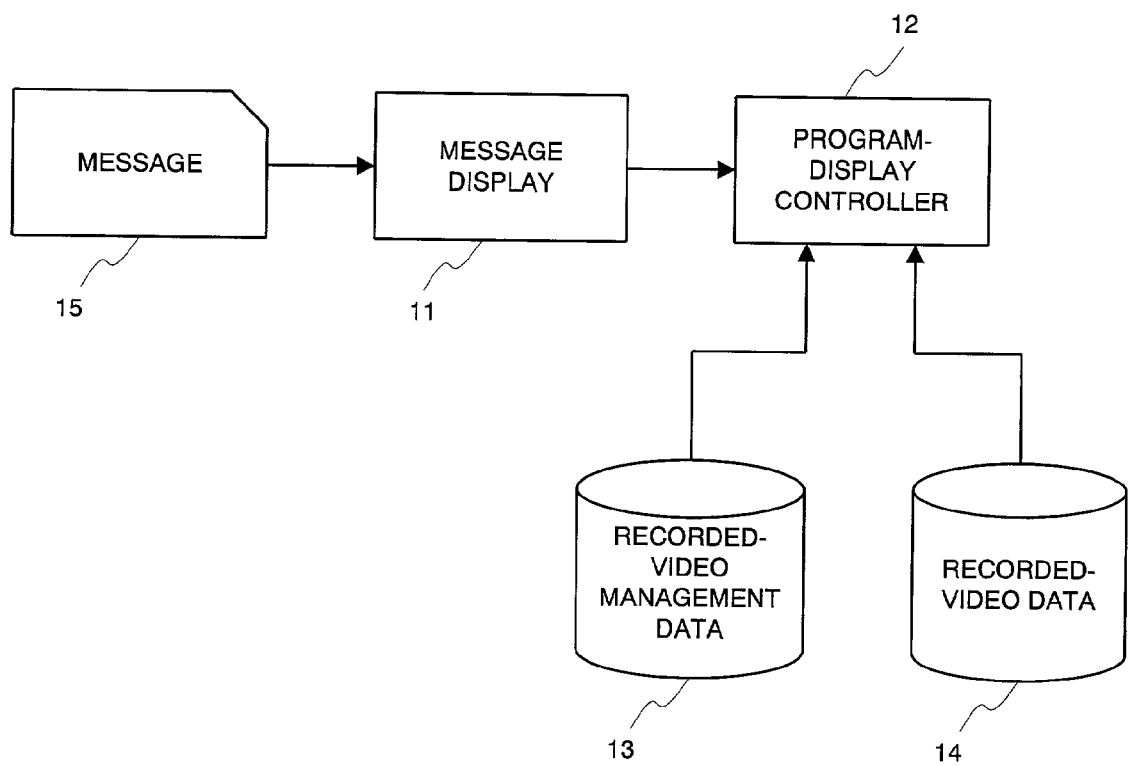
FIG. 8 is a block diagram illustrating the configuration of a broadcast program related information processor according to a fourth embodiment of the present invention.

FIG. 8 is a block diagram illustrating the configuration of a broadcast program related information processor according to the fourth embodiment of the present invention.

Referring to FIG. 8, the broadcast program related information processor includes a message display 11, a program display controller 12, a recorded-video management data 13, and a recorded video data 14. The message display 11 displays a message 5. The program display controller 12 outputs recorded video data 14 onto a display (not shown) based on the program tab transmitted from the message display 11. The recorded-video management data 13 stores recorded program information. The recorded video data 14 saves data video-recording TV or radio programs.

The message display 11 displays the message 15 acquired through the Internet (not shown) or stored in a local file system (not shown), to a user. The message display 11 is a mail VIEWER, a Web browser, or an application for chatting.

A user specifies a program tag in the message 15 in displaying and requests the message display 11 to display (reproduce) it. In response to the request from the user, the message display 11 specifies the program tag to the program display controller 12 to instruct the beginning of reproduction.

When the message display 11 instructs the beginning of reproduction, the program display controller 12 retrieves the recorded video data 14 of a program corresponding to the program tag specified by the recorded-video management data 13 and initiates the reproduction if there is the recorded video data 14.

Figure 9:
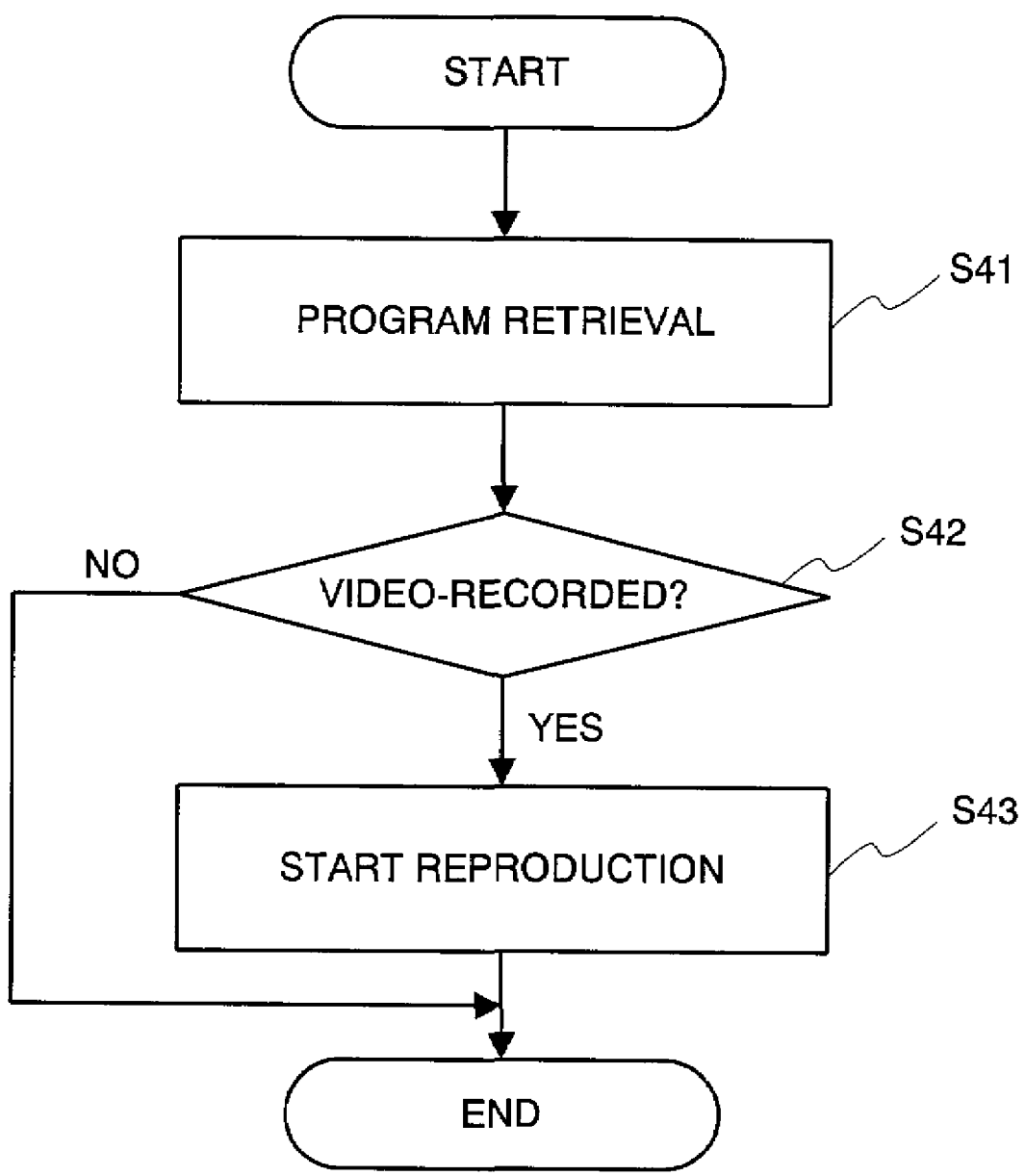
FIG. 9 is a flowchart illustrating a process to the beginning of reproduction at the program-display controller in FIG. 8.

FIG. 9 is a flowchart illustrating the process to the beginning of reproduction by the program display controller 12 in FIG. 8. The operation of broadcast program related information processor according to the fourth embodiment of the present invention will be described below referring to FIGS. 8 and 9.

When the message display 11 instructs the beginning of reproduction, the program display controller 12 retrieves recorded video data of a program corresponding to a program tag specified with recorded-video management data (step S41 in FIG. 9).

When the program is in a recorded state (step S42 in FIG. 9), the program display controller 12 initiates the reproduction of the program (step S43 in FIG. 9). When the program is not in a recorded state (step S42 in FIG. 9), the program display controller 12 ends its process. When the program tag has scene information, the program display controller 12 starts the reproduction of the program from a specified scene.

As described above, the program specified with the program tag in the message 15 can be easily watched by means of the message display 11 and the program display controller 12.

Figure 10:
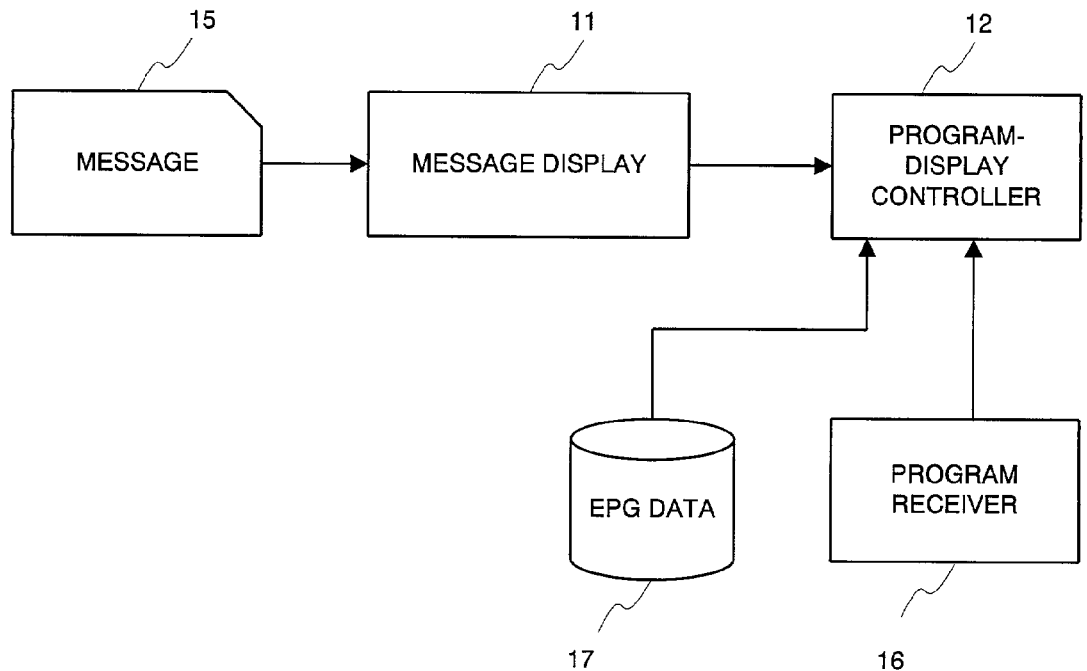
FIG. 10 is a block diagram illustrating the configuration of a broadcast program related information processor according to a fifth embodiment of the present invention.

FIG. 10 is a block diagram illustrating the configuration of a broadcast program related information processor according to the fifth embodiment of the present invention. Referring to FIG. 10, the broadcast program related information processor includes a message display 11, a program display controller 12, a program receiver 16, and an EPG 17. The message display 11 displays a message 15. The program display controller 12 outputs a program transmitted from the program receiver 16 onto the display (not shown) based on the program tag transmitted from the message display 11. The program receiver 16 receives a TV or radio broadcast program and changes it in a data format. This example shows the case where the program display controller 12 watches data in broadcasting.

The EPG 17 is an electronic program table captured through the broadcasting or the Internet. The message display 11 operates as described above. When the message display 11 issues an instruction for the beginning of reproduction, the program display controller 12 decides whether or not the program corresponding to the program tag is receivable using the EPG 17. In the receivable state, the program display controller 12 instructs the program receiver 16 to receive the program specified by the program tag and then displays the program transmitted from the program receiver 16.

Figure 11:
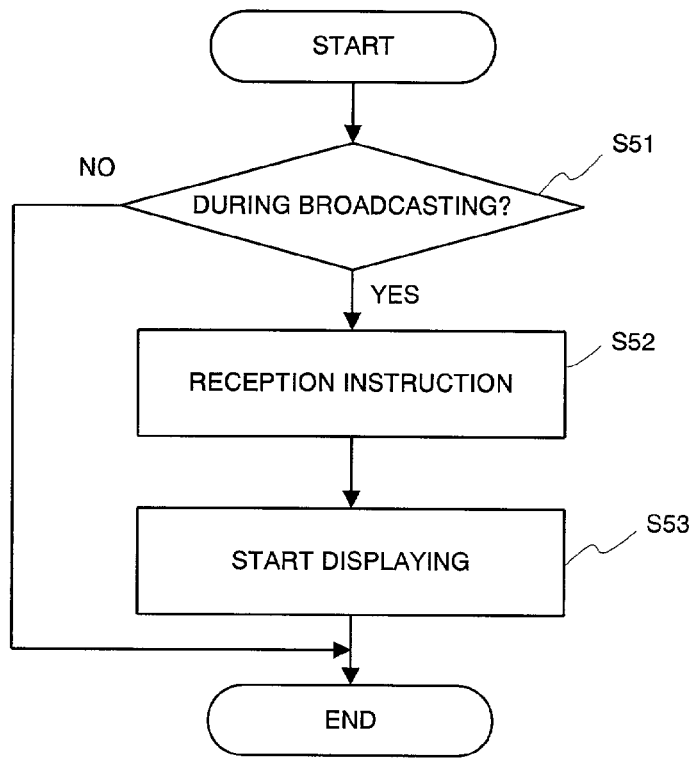
FIG. 11 is a flowchart illustrating a process to the beginning of reproduction at the program-display controller in FIG. 10.

FIG. 11 is a flowchart illustrating the process to the beginning of reproduction by the program display controller 12 in FIG. 10. The operation of the broadcast program related information processor according to the fifth embodiment of the present invention will be described by referring to FIGS. 10 and 11.

When the message display 11 issues an instruction for the beginning of reproduction, the program display controller 12 decides whether or not the program corresponding to the program tag is receivable or the corresponding program is during broadcasting, using the EPG (step S51 in FIG. 11).

In the receivable state, the program display controller 12 instructs the program receiver 16 to receive the program specified with the program tag (step S52 in FIG. 11) and displays the program transmitted from the program receiver 16 (step S53 in FIG. 11). Moreover, in the receivable state, the program display controller 12 ends its process.

The program specified with the program tag in the message 15 can be easily watched by means of the message display 11 and the program display controller 12.

Figure 12:
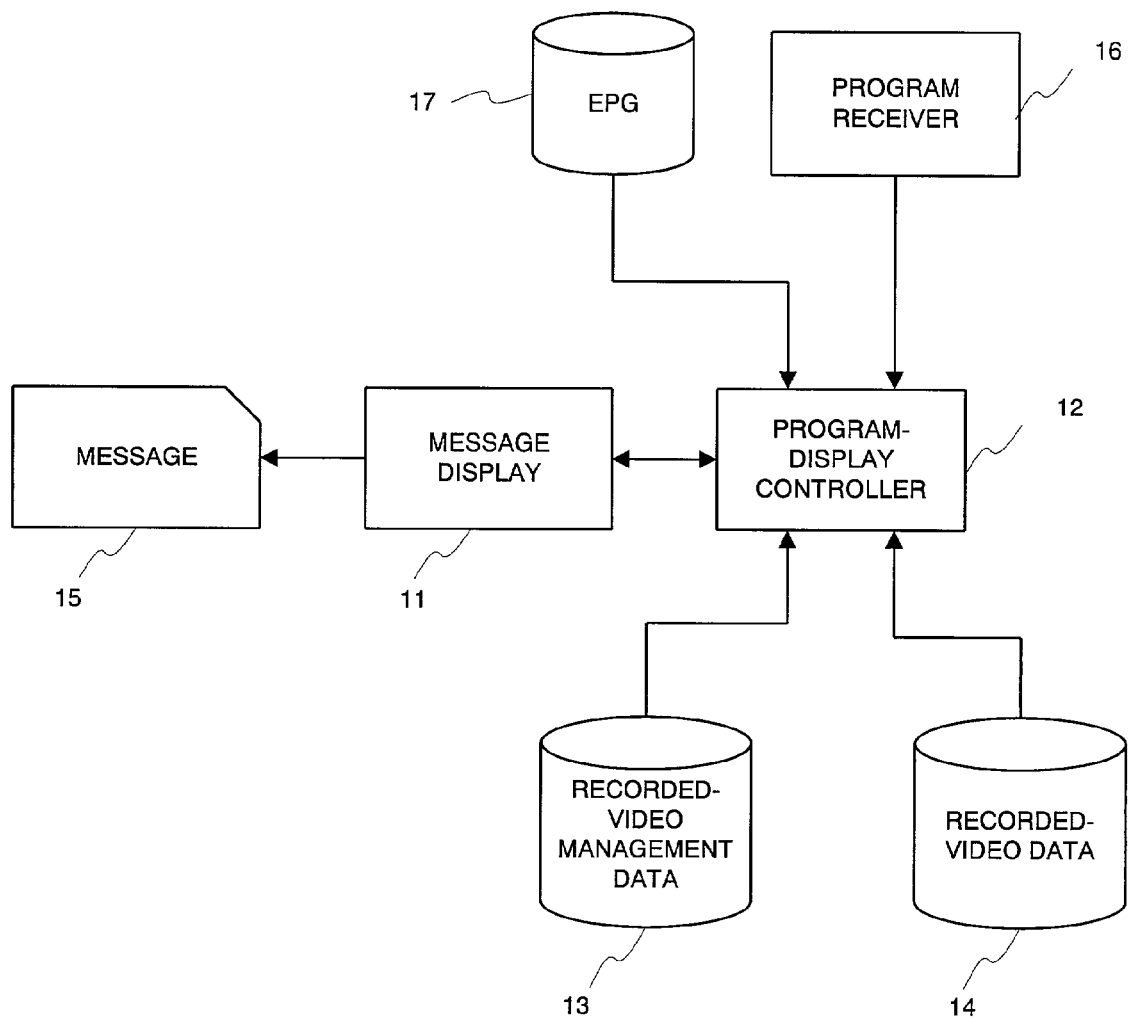
FIG. 12 is a block diagram illustrating the configuration of a broadcast program related information processor according to a sixth embodiment of the present invention.

FIG. 12 is a block diagram illustrating the configuration of a broadcast program related information processor according to the sixth embodiment of the present invention. Referring to FIG. 12, the broadcast program related information processor includes a message display 11, a program display controller 12, recorded-video management data 13, recorded video data 14, a program receiver 16, and an EPG 17. The message display 11 displays a message 15. The program display controller 12 outputs a program transmitted from the program receiver 16 or the recorded video data 14 onto the display (not shown), based on the program tag transmitted from the message display 11. The recorded-video management data 13 stores recorded video program information. The recorded video data 14 saves data recording TV or radio broadcast programs. The program receiver 16 receives a TV or radio broadcast program and changes it in a data format. This example shows the case where the program display controller 12 selectively uses data in broadcasting and the recorded video data 14.

The EPG 17 is an electronic program table captured through broadcasting or through the Internet. The message display 11 operates as described above. When the message display 11 issues an instruction for the beginning of reproduction, the program display controller 12 retrieves the recorded video data 14 of the program corresponding to a program tag specified by the recorded-video management data 13. When there is the recorded video data 14, the display controller 12 starts reproduction.

When there is not the recorded video data 14, the program display controller 12 decides whether or not the program corresponding to a program tag is receivable using the EPG 17. If the corresponding program is receivable, the program display controller 12 instructs the program receiver 16 to receive the program specified by he program tag and displays the program transmitted from the program receiver 16.

Figure 13:
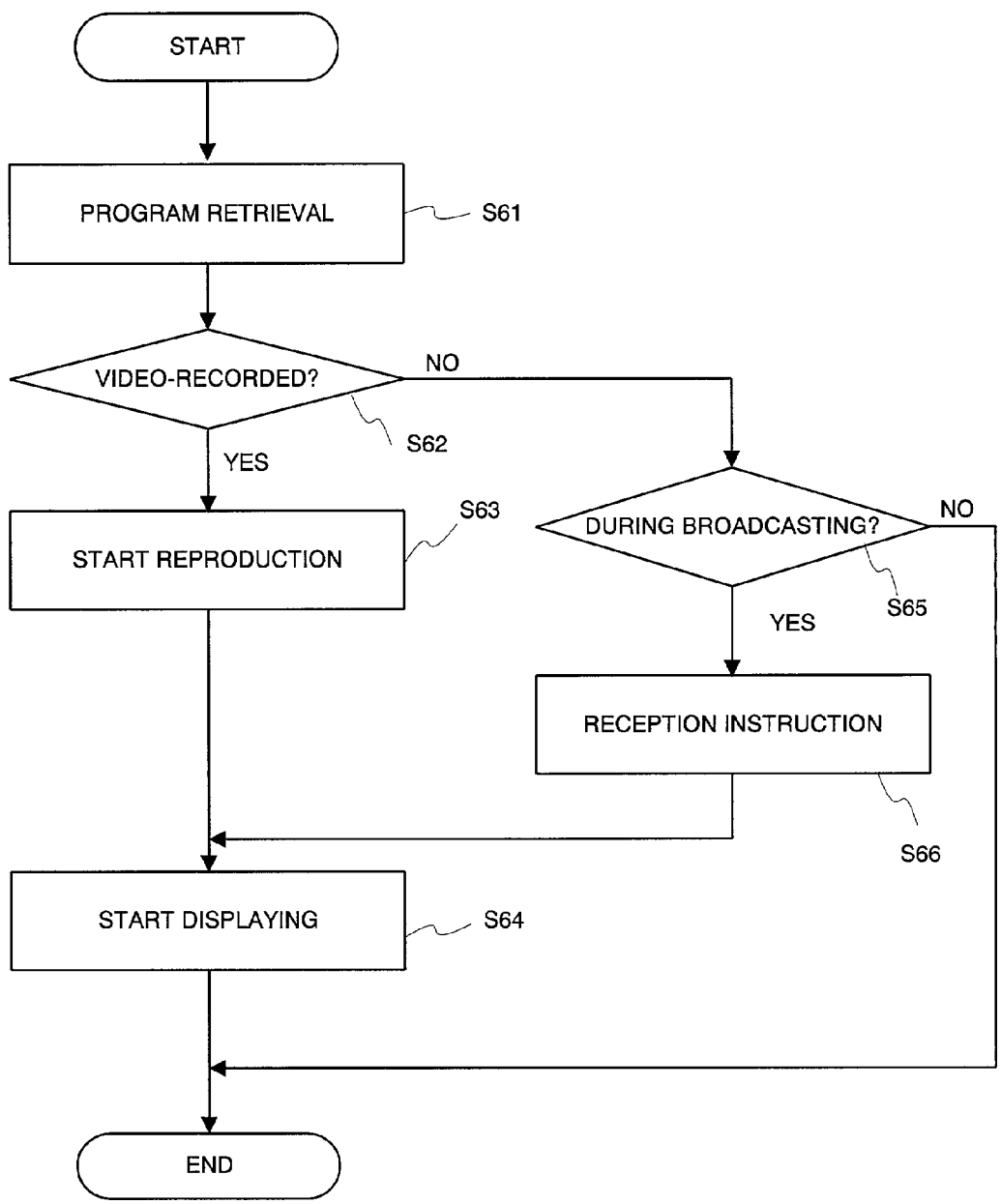
FIG. 13 is a flowchart illustrating a process to the beginning of reproduction at the program-display controller in FIG. 12.

FIG. 13 is a flowchart illustrating the process to the beginning of reproduction by the program display controller 12 in FIG. 12. The operation of the broadcast program related information processor according to the sixth embodiment of the present invention will be described by referring to FIGS. 12 and 13.

When the message display 11 issues an instruction for the beginning of reproduction, the program display controller 12 retrieves the recorded video data 14 of a program corresponding to a program tag specified with the recorded-video management data 13 (step S61 in FIG. 13). If there is the recorded video data 14 (step S62 in FIG. 13), the program display controller 12 starts the reproduction of the recorded video data 14 (step S63 in FIG. 13).

When there is not the recorded video data (step S62 in FIG. 13), the program display controller 12 decides whether or not the program corresponding to the program tag is receivable or the corresponding program is during broadcasting, using the EPG 17 (step S65 in FIG. 13).

If the program tag is receivable, the program display controller 12 instructs the program receiver 16 to receive the program specified with the program tag (step S66 in FIG. 13) and displays the program transmitted from the program receiver (step S64 in FIG. 13).

As described above, the program specified with the program tag in the message 15 can be easily watched by means of the message display 11 and the program display controller 12.

Figure 14:
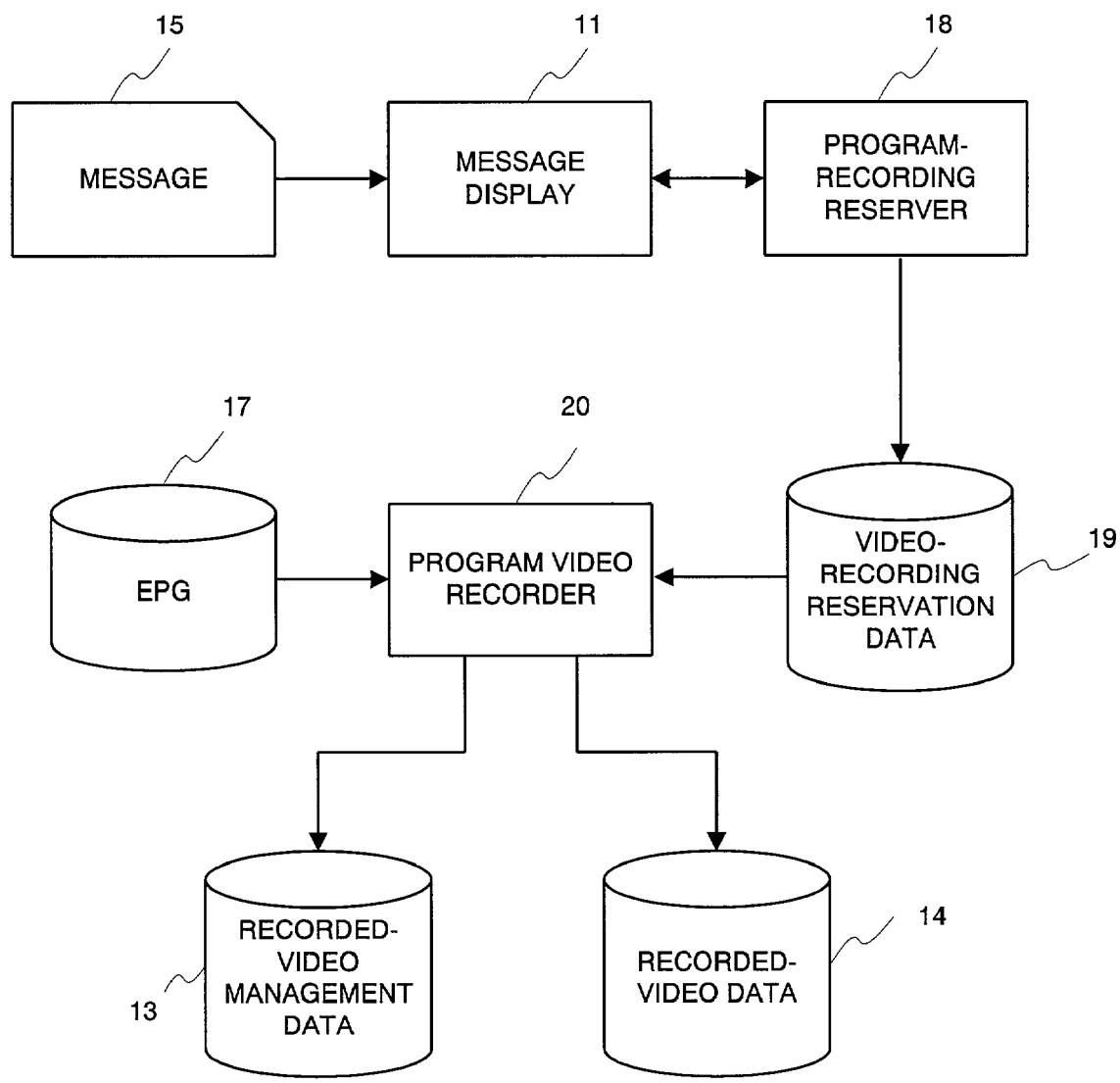
FIG. 14 is a block diagram illustrating the configuration of a broadcast program related information processor according to a seventh embodiment of the present invention.

FIG. 14 is a block diagram illustrating the configuration of a broadcast program related information processor according to the seventh embodiment of the present invention. Referring to FIG. 14, the broadcast program related information processor includes a message display 11, recorded-video management data 13, recorded video data 14, an EPG 17, a program recording reserver 18, video-recording reservation data 19, and a program video recorder 20. The message display 11 displays the message 15. The recorded-video management data 13 stores information on a recorded program. The recorded video data 14 saves data recording TV or radio broadcast programs. The program recording reserver 18 registers video recording reservation in the video-recording reservation data 19 based on the program tag transmitted from the message display 11. The video-recording reservation data 19 records video-recording reservation information. The program video recorder 20 receives a TV or radio program based on the video-recording reservation data 19 and records the program into the recorded video data 14, and records the information related to a program recorded based on the EPG 17, in the recorded-video management data 13.

The EPG 17 is an electronic program table captured through broadcasting or through the Internet. The program video recorder 20 receives a program reserved based on the video-recording reservation data 19, converts it in the format reproducible by the program display controller (not shown) converts MPEG-1 or MPEG-2, and then records the converted data into recorded video data 14. At this time, the program video recorder 20 captures recorded program related information from the EPG 17 and records it in the recorded-video management data 13.

The message display 11 displays to the user the message 15 acquired through the Internet or the message 15 in a local file system. The message display 11 is a mail VIEWER, a Web browser, or an application for chatting.

The user specifies a program tag in the message 15 in displaying and then requires the message display 11 to reserve or preset the video recording. In response to the request from the user, the message display 11 specifies the program tag to the program recording reservation means 18 and instructs it to reserve the video recording. The program recording reservation means 18 registers reservation of a program in the video-recording reservation data 19 based on the specified program tag.

As described above, the program specified with a program tag in the message 15 is registered in the video-recording reservation data 19 by means of the message display 11 and the program recording reservation means 18, so that the recording or presetting of video recording can be easily performed.

Figure 15:
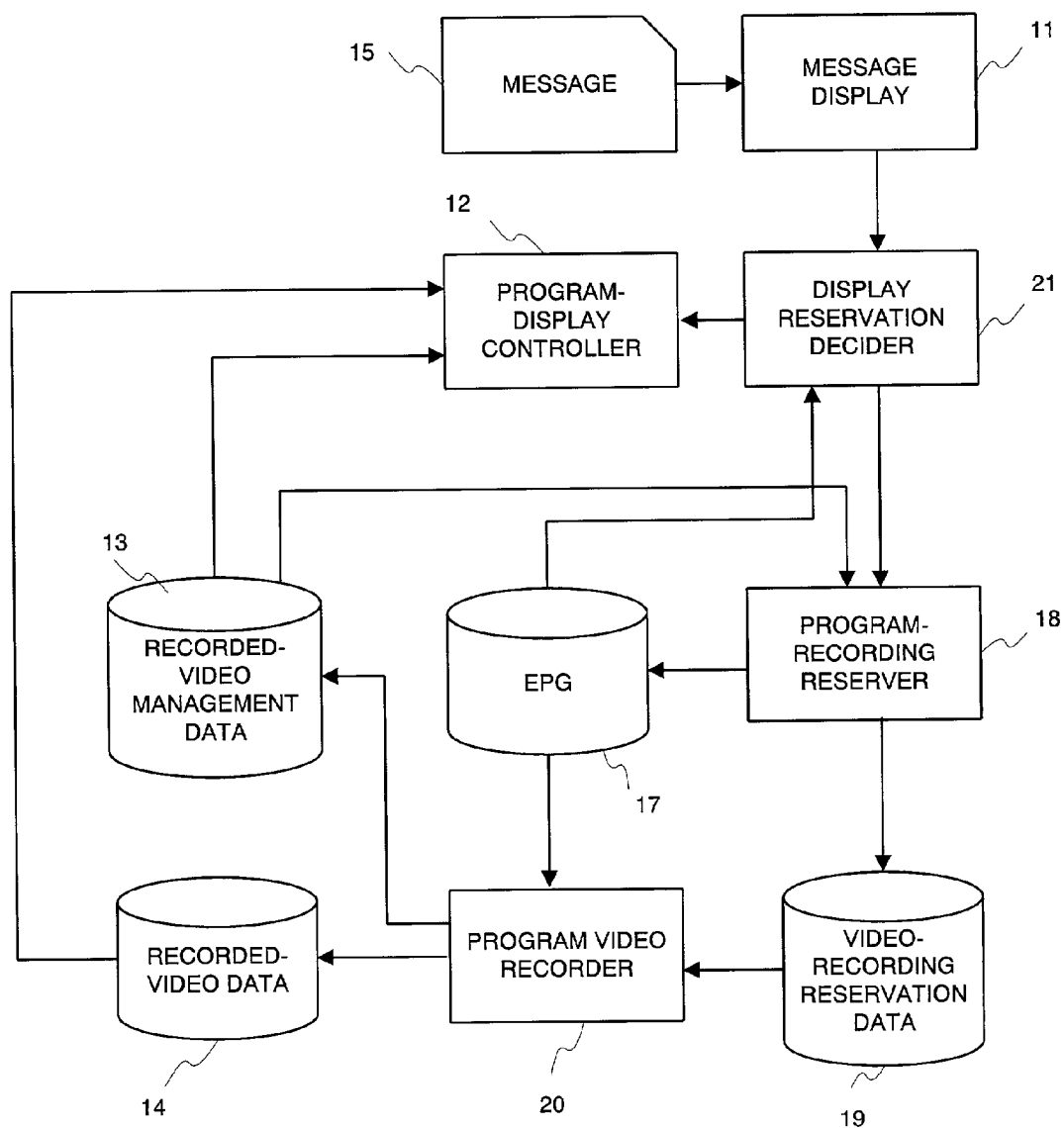
FIG. 15 is a block diagram illustrating the configuration of a broadcast program related information processor according to an eighth embodiment of the present invention.

FIG. 15 is a block diagram illustrating the configuration of a broadcast program related information processor according to the eighth embodiment of the present invention. Referring to FIG. 15, the broadcast program related information processor includes a message display 11, a program display controller 12, recorded-video management data 13, recorded video data 14, an EPG 17, a program recording reserver 18, video-recording reservation data 19, a program video recorder 20, and a display reservation decider 21. The message display 11 displays a message 15. The program display controller 12 outputs recorded video data 14 to a display (not shown) based on a program tag transmitted from the display reservation decider 21. The recorded-video management data 13 stores information on a recorded program. The recorded video data 14 saves data recording TV or radio broadcast programs. The program recording reserver 18 registers the recording reservation in video-recording reservation data 19 based on the program tag transmitted from the display reservation decider 21. The program video recorder 20 receives a TV or radio program based on the video-recording reservation data 19, records the program into the recorded video data 14, and records the information related to a program recorded based on the EPG 17. If the program is in a broadcast state, the display reservation decider 21 issues an instruction to the message display controller 11 based on the program tag transmitted from the program display controller 12. If the program is an un-broadcast state, the display reservation decider 21 issues an instruction to the program recording reserver 18.

In this embodiment, the message display 11 specifies a program tag and transmits it to the display reservation decider 21. The remaining configuration and function are similar to those in the fourth to seventh embodiments of the invention.

The broadcast program related information processor in the eighth embodiment resembles the broadcast program related information processor in the fourth embodiment in the configuration and operation. However, the difference is that the display reservation decider 21 transmits instructions to the program display controller 12.

Moreover, the broadcast program related information processor in the eighth embodiment resembles the broadcast program related information processor in the seventh embodiment in the configuration and operation. However, the difference is that the display reservation decider 21 transmits instructions to the program recording reserver 18.

Figure 16:
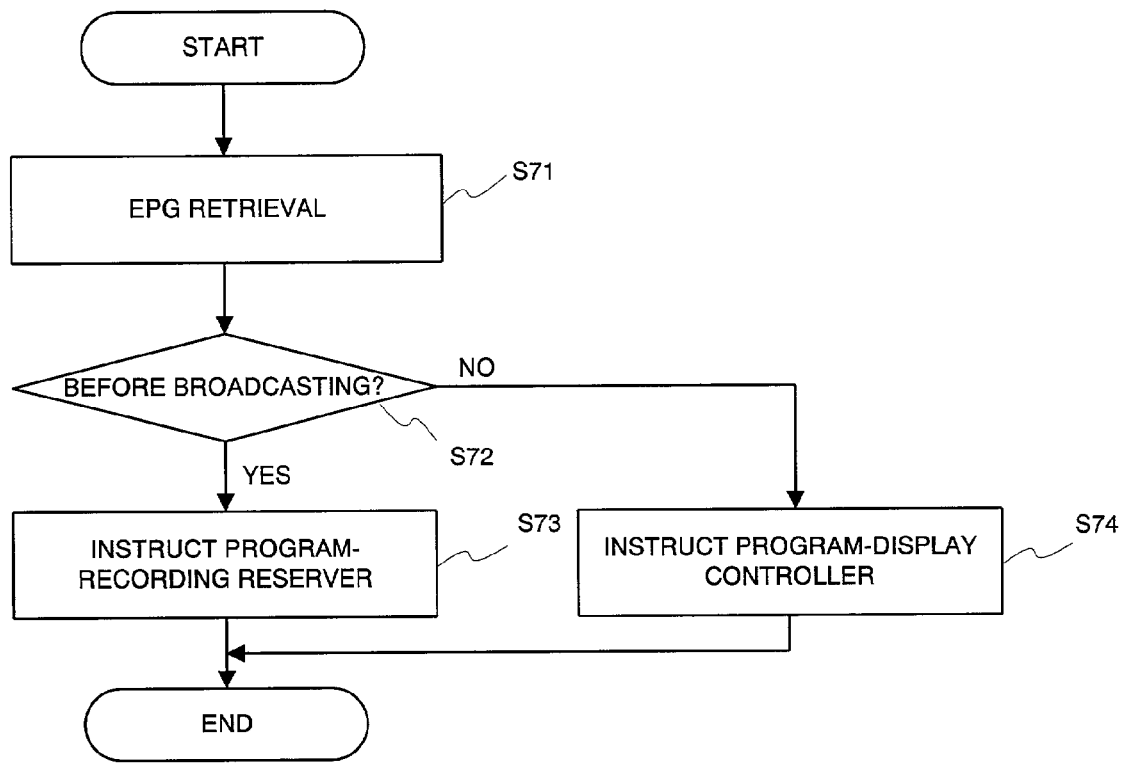
FIG. 16 is a flowchart illustrating the operation of the display reservation decider in FIG. 15.

FIG. 16 is a flowchart illustrating the operation of the display reservation decider 21 in FIG. 15. The operation of the broadcast program related information processor according to the eighth embodiment will be described below by referring to FIGS. 15 and 16.

When receiving an instruction from the message display 11, the display reservation decider 21 retrieves the EPG 17 for a program corresponding to a specified program tag (step S71 in FIG. 16) and then decides whether or not the specified program is before broadcasting, based on the retrieval result (step S72 in FIG. 16).

When the retrieval result indicates that the program is in the state before broadcasting, the display reservation decider 21 notifies the program recording reserver 18 of the program tag specified from the message display 11 and instructs reservation of vide-recording (step S73 in FIG. 16). When the retrieval result indicates that the program is in a broadcast state, the display reservation decider 21 notifies the program display controller 12 of a program tag specified from the message display 11 and instructs the reproduction of program (step S74 in FIG. 16).

As described above, the display reservation decider 21 automatically decides whether or not the program corresponding to the program tag in the message 15 is recordable or viewable. As a result, watching and hearing or video recording can be easily reserved.

The broadcast program related information processor in the eighth embodiment corresponds to the broadcast program related information processor in the sixth embodiment. However, in this case, the hearing and watching portion has to be replaced.

Figure 17:
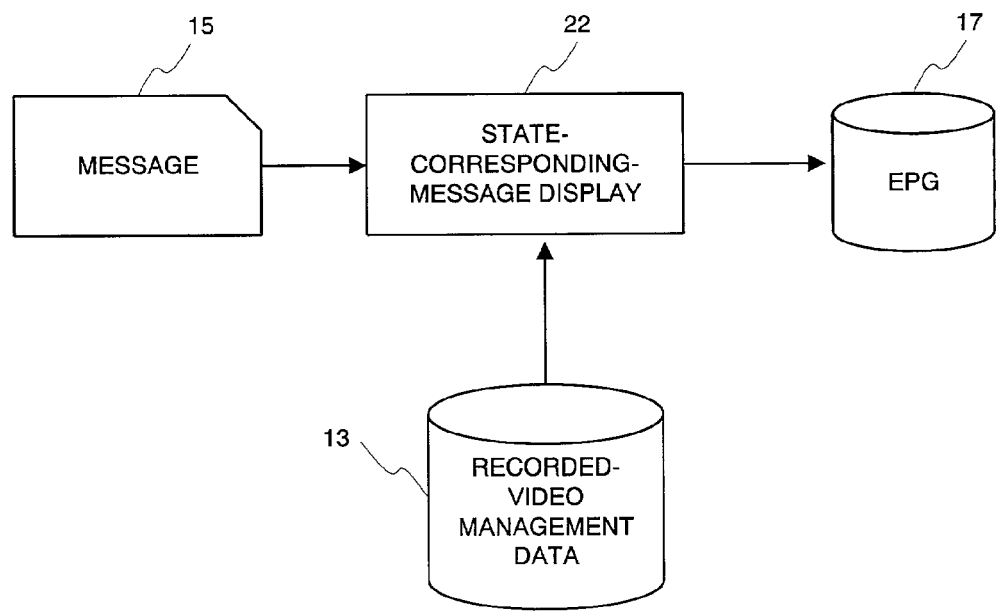
FIG. 17 is a block diagram illustrating the configuration of a broadcast program related information processor according to a ninth embodiment of the present invention.

FIG. 17 is a block diagram illustrating the configuration of a broadcast program related information processor according to the ninth embodiment of the present invention. Referring to FIG. 17, the broadcast program related information processor includes a recorded-video management data 13, EPG 17 and a state corresponding message display 22. The recorded-video management data 13 records information on a recorded program. The state corresponding message display 22 classifies the program tag in the message 15 into three modes (that is, a recordable mode, a viewable mode, and a non-viewable mode), using the EPG 17 and the recorded-video management data 13. Thus, the state corresponding message display 22 varies the display format of the program tag in accordance with the classifications and displays the message 15.

Figure 18:
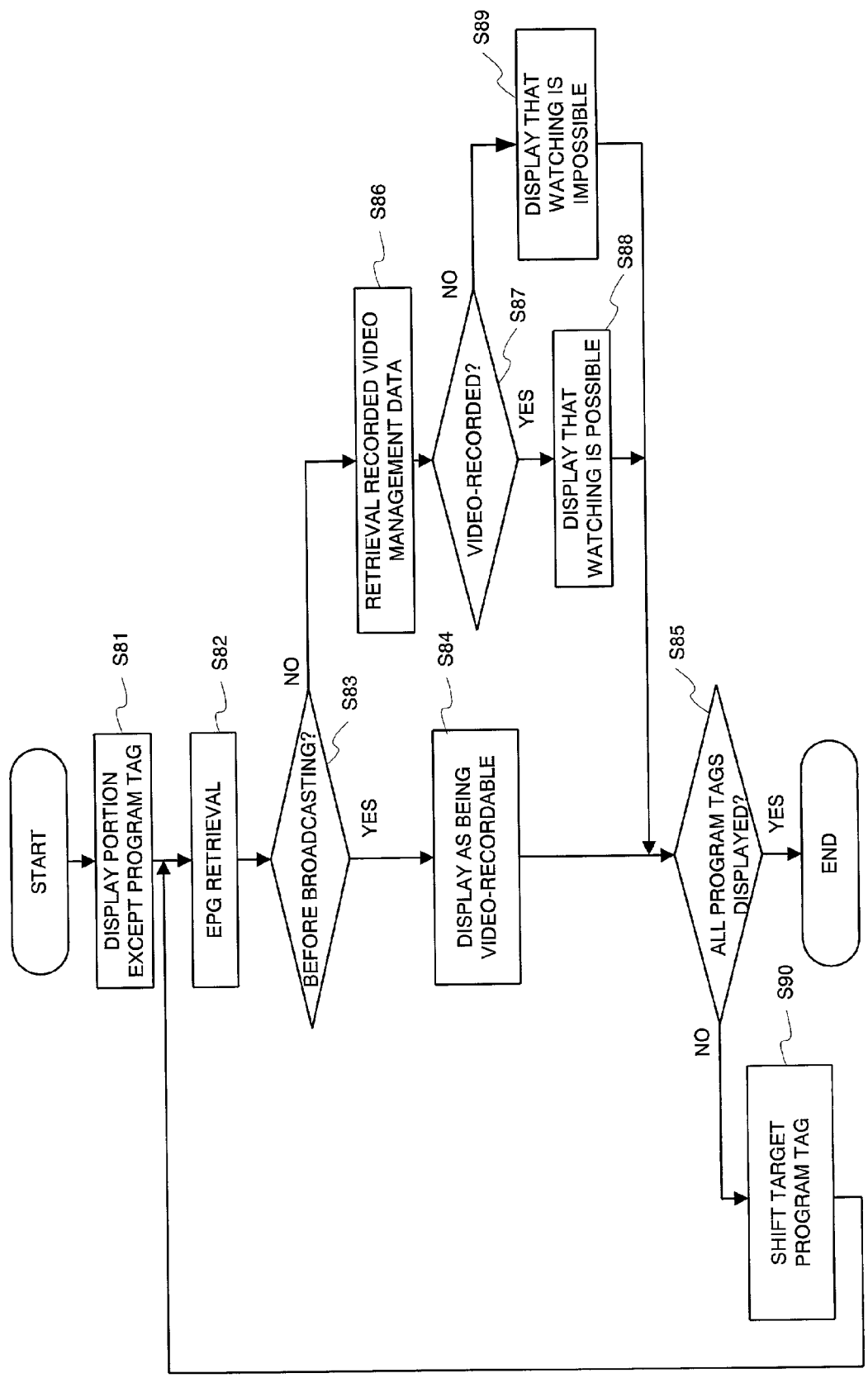
FIG. 18 is a flowchart illustrating the operation to a message display of the status corresponding message display in FIG. 17.

FIG. 18 is a flowchart illustrating the operation to the message displaying of the state-corresponding-message display 22 in FIG. 17. The broadcast program related information processor according to the ninth embodiment of the present invention will be described below by referring to FIGS. 17 and 18.

In response to the message 15, the state-corresponding-message display 22 displays the portion other than a program tag in the message 15 (step S81 in FIG. 18). Then, the state-corresponding-message display 22 targets the first coming program tag in the message 15 and checks for whether or not the program specified with the program tag is before broadcasting, based on the EPG 17 (steps S82 and S83 in FIG. 18).

If the program is before broadcasting, the state-corresponding-message display 22 displays the program tag in a video recordable display format (step S84 in FIG. 18). If the program is not before broadcasting, the state-corresponding-message display 22 checks for whether or not the program specified by the program tag has been recorded, using the recorded-video management data 13 (steps S86 and S87 in FIG. 18).

If the program is in a recorded state, the state-corresponding-message display 22 displays the program tag in a viewable display mode (step S88 in FIG. 18). If the program is not in a recorded state, the state-corresponding-message display 22 displays the program tag in a non-viewable display mode (step S89 in FIG. 18).

If there is a program tag not displayed in the message 15 after the displaying operation (step S85 in FIG. 18), the state-corresponding-message display 22 returns to the retrieval of the EPG 17 targeting the tag (step S82 in FIG. 18). When all program tags are displayed (step S85 in FIG. 18), the state-corresponding-message display 22 ends its process.

As the display format adopted to the state, there is the method of changing the program tag display format, for example, changing a display color, changing font, and providing underline, bold character, italics, and shading. In another method, a symbol representing each state is disposed behind a program tag. For example, a character string "reservable", "viewable", or "not viewable" showing each state is attached behind a program tag.

Alternately, there is the method of displaying, behind the program tag, a button clicked for reservation indication if a program is recordable, or a button clicked for display indication if a program is viewable, or nothing if a program is unviewable.

As described above, whether or not the program corresponding to a program tag in the message can be recorded or viewed is automatically decided. Thus, the state of the program can be shown to users.

Figures 19, 20:
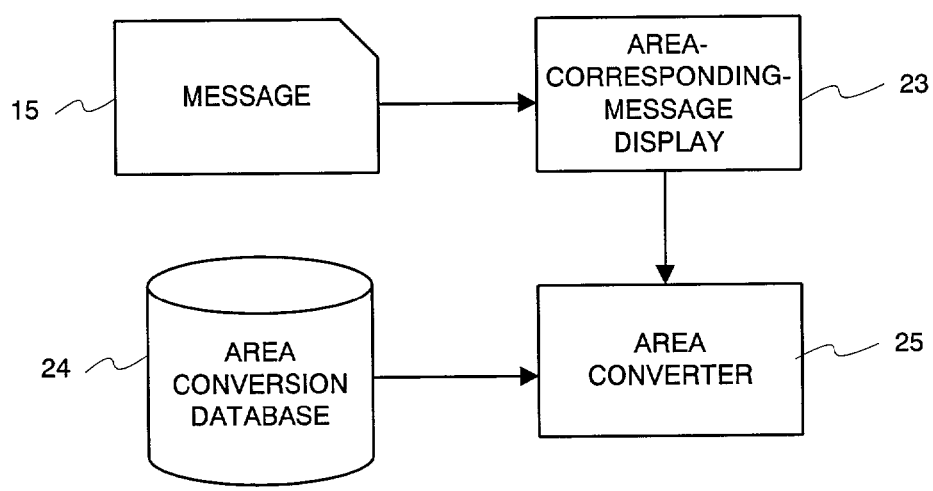
FIG. 19 is a block diagram illustrating the configuration of a broadcast program related information processor according to a tenth embodiment of the present invention.
FIG. 20 is a diagram illustrating an entry of an area conversion database in FIG. 19.

FIG. 19 is a block diagram illustrating the configuration of a broadcast program related information processor according to the tenth embodiment of the present invention. Referring to FIG. 19, the broadcast program related information processor includes an area conversion database 24, an area converter 25, and an area corresponding message display 23. The area conversion database 24 describes program tags each corresponding to the same program different at each area. The area converter 25 converts a specified program tag into a program tag of a specified area using the area conversion database 24. The area corresponding message display 23 changes a program tag in the message 15 by the area converter 25, replaces the program tag in the message with the changed program tag, and then displays it. The area conversion database 24 is a database recording a program tag, different for each area, of the same program acquired through the Internet (not shown).

FIG. 20 is a block diagram illustrating an example of an entry of the area conversion database 24 in FIG. 19. Referring to FIG. 20, each entry is allocated to each program. Each entry is formed of a field (area A, area B, area C, . . . ) for each area.

A program tag of a program corresponding to an area is registered in each field. When the program has not been broadcast in an area, the value representing no corresponding program tag is registered in the field of the area.

The message display 11 in the fourth to sixth embodiments may be replaced with the area corresponding message display 23 in the present embodiment. Thus, the present embodiment can be used to display programs. The message display 11 in the seventh embodiment may be replaced with the area corresponding message display 23 in the present embodiment. Thus, the present embodiment can be used to reserve (preset) the video-recording of a program.

Figure 21:
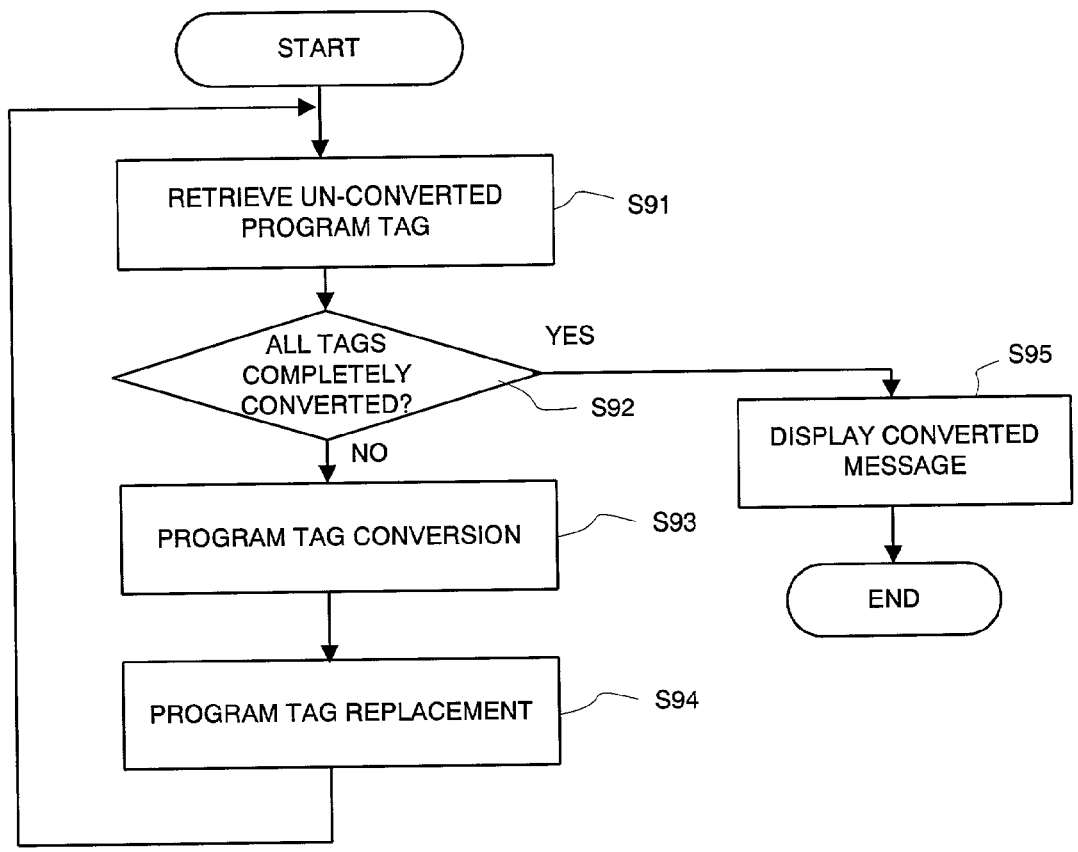
FIG. 21 is a flowchart illustrating a message display operation of the area corresponding message display in FIG. 19.

FIG. 21 is a flowchart illustrating the operation in which the area corresponding message display 23 in FIG. 19 displays messages. The operation of the broadcast program related information processor according to the tenth embodiment will be described by referring to FIGS. 19 to 21. The area corresponding message display 23 has information on display object area specified by an user.

First, the area corresponding message display 23 retrieves an unconverted program tag in the message 15 (step S91 in FIG. 21). When all program tags have completely converted (step S92 in FIG. 21), the area corresponding message display 23 displays the converted message 15 (step S95 in FIG. 21).

If there is an unconverted program tag (step S92 in FIG. 21), the area corresponding message display 23 specifies a program tag to be converted and a display area to be displayed, to the area converter 25. Moreover, the area corresponding message display 23 instructs the area converter 25 to convert the program tag (step S93 in FIG. 21) and replaces the program tag in the message with the converted program tag (step S94 in FIG. 21). Finally, the area corresponding message display 23 returns to the retrieval operation of an unconverted program tag (step S91 in FIG. 21).

The area converter 25 searches for an entry including a program tag specified by the area conversion database 24 and returns the program tag recorded to the entry, that is, the program tag in a specified area. When the corresponding program is not found in the specified area, the area converter 25 returns data representing no broadcasting.

Even if a different program tag is used for an area, a program tag is converted into one corresponding to a specified area. Thus, the viewing or video-recording of a program can be easily reserved with differences between areas concealed.

In the broadcast program related processor according to the tenth embodiment, the area corresponding message display 23 can convert a program tag only when a user issues an indication.

Moreover, in the broadcast program related processor according to the tenth embodiment, the area corresponding message display 23 displays the program tag to be converted by the area converter 25 as the message 15 to a user. The program tag converted by the area converter 25 may be used as one used when instructions are sent to the program display controller, the program vide-recording reserver, and the display reservation decider.

Figure 22:
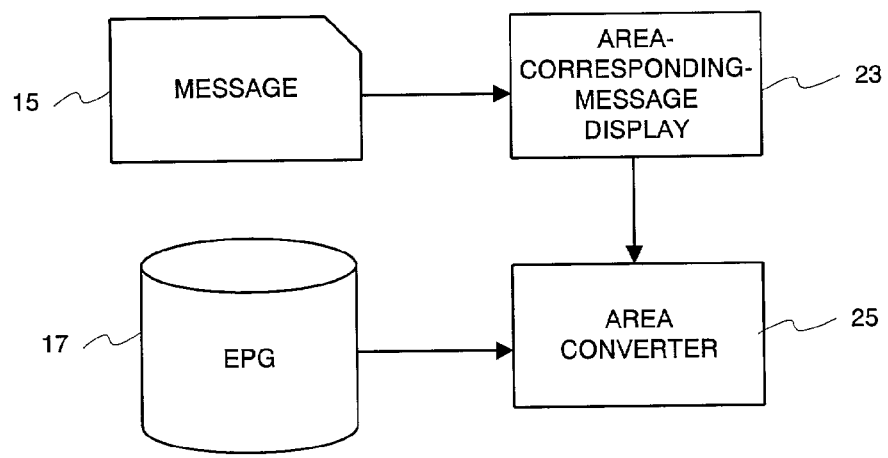
FIG. 22 is a block diagram illustrating the configuration of a broadcast program related information processor according to an eleventh embodiment of the present invention.

FIG. 22 is a block diagram illustrating the configuration of the broadcast program related information processor according to the eleventh embodiment of the present invention. Referring to FIG. 22, the broadcast program related information processor includes an EPG 17, an area converter 25, and an area corresponding message display 23. The area converter 25 converts a specified program tag into a program tag of a specified area. The area corresponding message display 23 makes the area converter 25 convert a program tag in the message 15, replaces the original program tag with the converted program tag, and displays the converted program tag.

The area corresponding message display 23 may be used in place of the message display 11 in the fourth to sixth embodiments. Thus, the present embodiment can be used to display programs.

Moreover, the area corresponding message display 23 may be used in place of the message display 11 in the seventh embodiments. Thus, the present embodiment can be used to reserve the video recording of a program.

The area corresponding message display 23 has information on a display area specified by a user. The operation of the area corresponding message display 23 is similar to that in the tenth embodiment of the present invention.

The area converter 25 searches the EPG 17 for a specified area for the same program name as that in the program information of a specified program tag and creates and returns the program tag of the program with the program name. When the corresponding program is not found in the specified area, the area converter 25 returns data representing no broadcasting.

Even if a different program tag is used for each area, watching or video recording reservation can be easily reserved or preset, with differences in area concealed, by converting the program tag into one corresponding to a specified area.

In the broadcast program related information processor according to the eleventh embodiment, the area corresponding message display 23 may convert the program tag only in response to an indication from a user.

In the broadcast program related information processor according to the eleventh embodiment, the area corresponding message display 23 displays as the message 15 the program tag to be converted by the area converter 25 to a user. The program tag converted by the area converter 25 may be used as one used when an instruction is sent to the program display controller, the program vide-recording reserver, and the display reservation decider.

Figure 23:
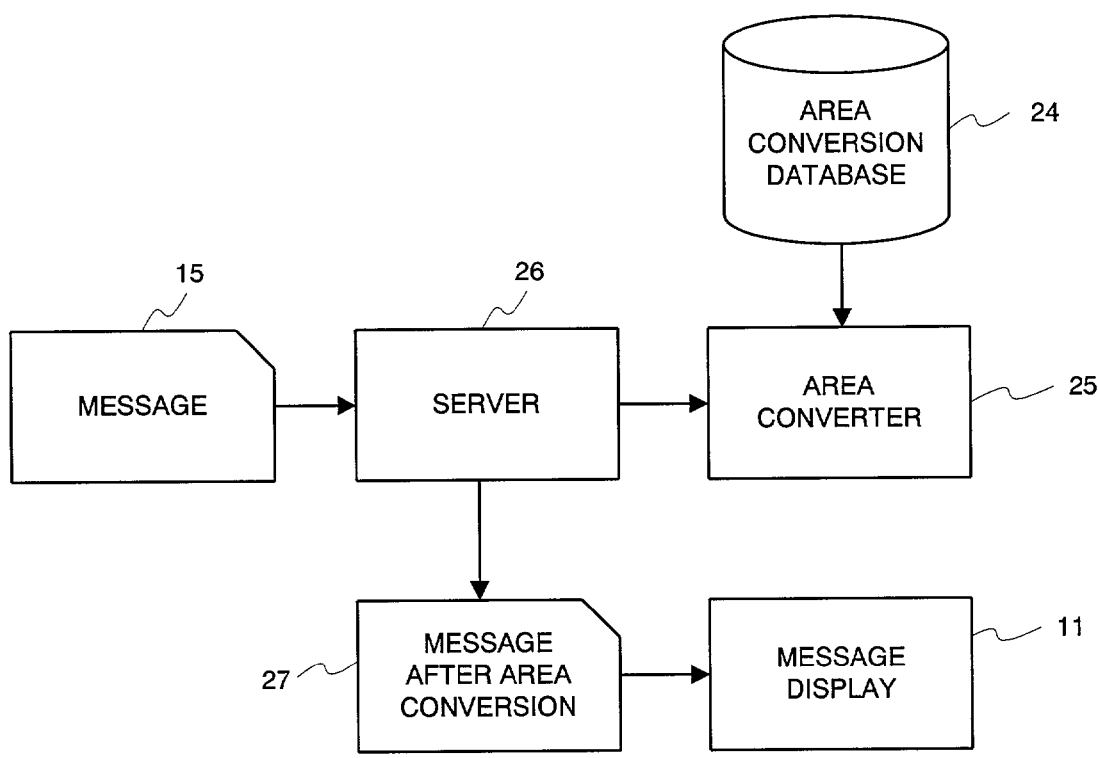
FIG. 23 is a block diagram illustrating the configuration of a broadcast program related information processor according to a twelfth embodiment of the present invention.

FIG. 23 is a block diagram illustrating the configuration of a broadcast program related information processor according to the twelfth embodiment of the present invention. Referring to FIG. 23, the broadcast program information processor includes an area conversion database 24, a message display 11, an area converter 25, and a server 26. The area conversion database 24 describes correspondences between program tags corresponding to the same program, different at each area. The message display 11 displays the message 27 after area conversion specifying an area when a message is required to the server 26 and transmitted from the server 26. The area converter 25 converts a specified program tag into the program tag of a specified area, using the area conversion database 24. The server 26 converts the message 15 into the program tag of an area specified by the message display 11, using the area converter 25.

The configuration of the area conversion database 24 is similar to that in the tenth embodiment. The present embodiment can be used to display programs by adding the present embodiment to the fourth to sixth embodiments. The present embodiment can be used to reserve the video-recording of programs by adding the present embodiment to the seventh embodiment.

The message display 11 in the present embodiment is similar to that in the third to seventh embodiments, except that the message display 11 receives the message of specifying an area and receiving a display message from the server 26, that is, the message 27 after area conversion. The area converter 25 is similar to that in the tenth embodiment, except that the server 26 requires conversion of the program tag.

Figure 24:
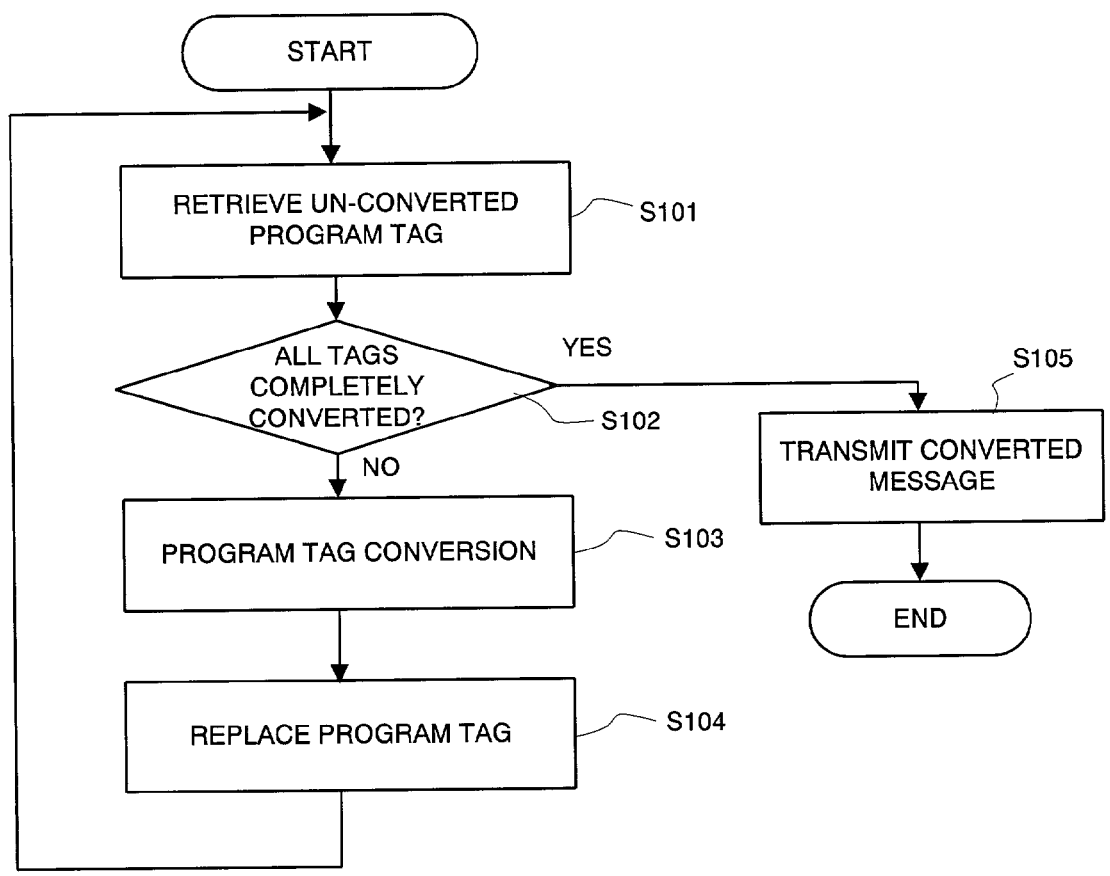
FIG. 24 is a flowchart illustrating a process to message transmission of the server in FIG. 23.

FIG. 24 is a flowchart illustrating the process to the message transmission of the server 26 in FIG. 23. The operation of the broadcast program related information processor in the twelfth embodiment will be described by referring to FIGS. 23 and 24.

When the message display 11 specifies an area for a message request, the server 26 retrieves an unconverted program tag in the message 15 (step S101 in FIG. 24). If all program tags has been completely converted (step S102 in FIG. 24), the server 26 transmits the converted message (step S105 in FIG. 24).

If there is an unconverted program tag (step S102 in FIG. 24), the server 26 specifies a program tag to be converted and area information to be displayed, to the area converter and issues an instruction for program tag conversion (step S103 in FIG. 24). Then, the server 26 replaces the program tag in the message 15 with the converted program tag (step S104 in FIG. 24) and returns to the mode of retrieving the unconverted program tag (step S101 in FIG. 24).

Even if a different program tag is used for each area, the program tag is converted into one corresponding to a specified area. Thus, viewing or video-recording programs can be easily reserved with differences in area concealed.

Figure 25:
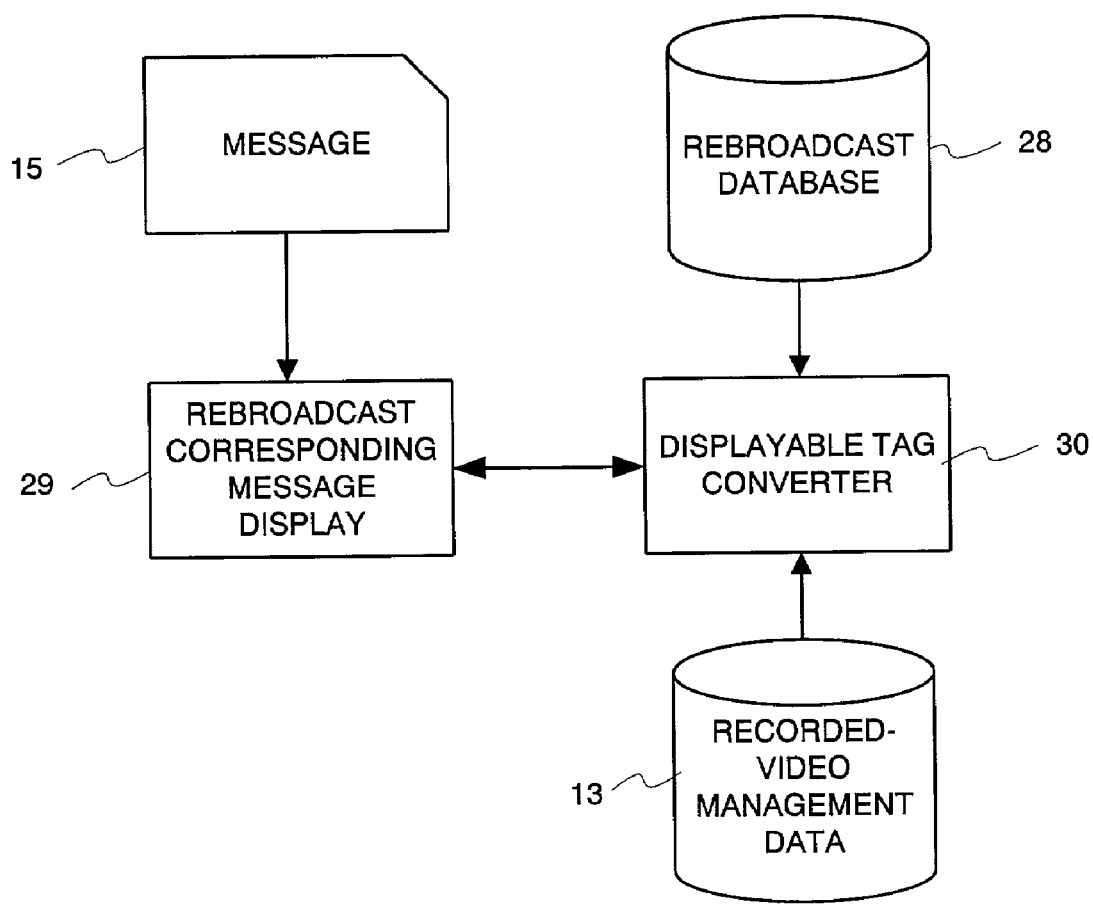
FIG. 25 is a block diagram illustrating the configuration of a broadcast program related information processor according to a thirteenth embodiment of the present invention.

FIG. 25 is a block diagram illustrating the configuration of a broadcast program related information processor according to the thirteenth embodiment of the present invention. Referring to FIG. 25, the broadcast program related information processor includes a rebroadcast database 28, a recorded-video management data 13, a displayable tag converter 30, and a rebroadcast corresponding message display 29. When the same program has a different program tag because being broadcast at a different time, the rebroadcast database 28 records the relationship between the program tags. The recorded-video management data 13 records information on video-recorded programs. The displayable tag converter 30 converts a program tag specified using both the rebroadcast database 28 and the recorded-video management data 13 into a displayable program tag with the same content. The rebroadcast corresponding message display 29 makes the displayable tag converter 30 convert a program tag in the message 15 and displays the message.

The rebroadcast database 28 is a database for, when the same program acquired through the Internet (not shown) has plural program tags to broadcast at different times, recording the relationships between the plural program tags.

Figure 26:
FIG. 26 is a diagram illustrating an entry of the rebroadcast database of FIG. 25.
Figure 27:
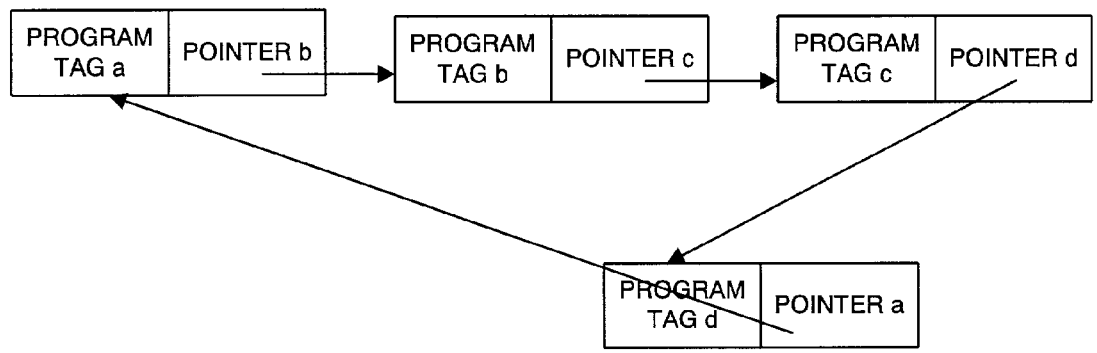
FIG. 27 is a diagram showing an example that the rebroadcast database 28 in FIG. 25 refers to an entry.

FIG. 26 is a diagram illustrating an entry of the rebroadcast database 28 in FIG. 25. FIG. 27 is a diagram illustrating an entry of the rebroadcast database 28. The broadcast program related information processor according to the thirteenth embodiment of the present invention will be described below by referring to FIGS. 25 to 27.

Each entry of the rebroadcast database 28 is configured of a program tag and a pointer for referring to other entries in the rebroadcast database 28 (refer to FIG. 26). The pointer stores information for referring to an entry having a program tag specifying the same program as that specified by the program tag of the entry.

Each entry is referred to from another entry or from no entries. That is, if there is a rebroadcast program, the entry is referred to another entry. If there is no rebroadcast program, the entry is not referred to from other entries.

The pointer of an entry storing the program tag corresponding to a rebroadcast program may often refer to an entry storing the program tag of the first broadcast program. The entry corresponding to the same program in the rebroadcast database 28 forms lists looped in one direction, as shown in FIG. 27.

That is, the pointer of an entry of a program tag (a) refers to an entry of the program tag (b). The pointer of an entry of a program tag (b) refers to an entry of the program tag (c). The pointer of an entry of a program tag (d) refers to an entry of the program tag (a). In this case, the lists are looped in one direction, as shown in FIG. 27.

In the present embodiment, the message display 11 in the fourth to sixth embodiments may be replaced with the rebroadcast corresponding message display 29. Thus, the present embodiment may be used to display programs.

The rebroadcast corresponding message display 29 differs from the message display 11 in the fourth to sixth embodiments in that the message 15 is converted and then displayed.

Figure 28:
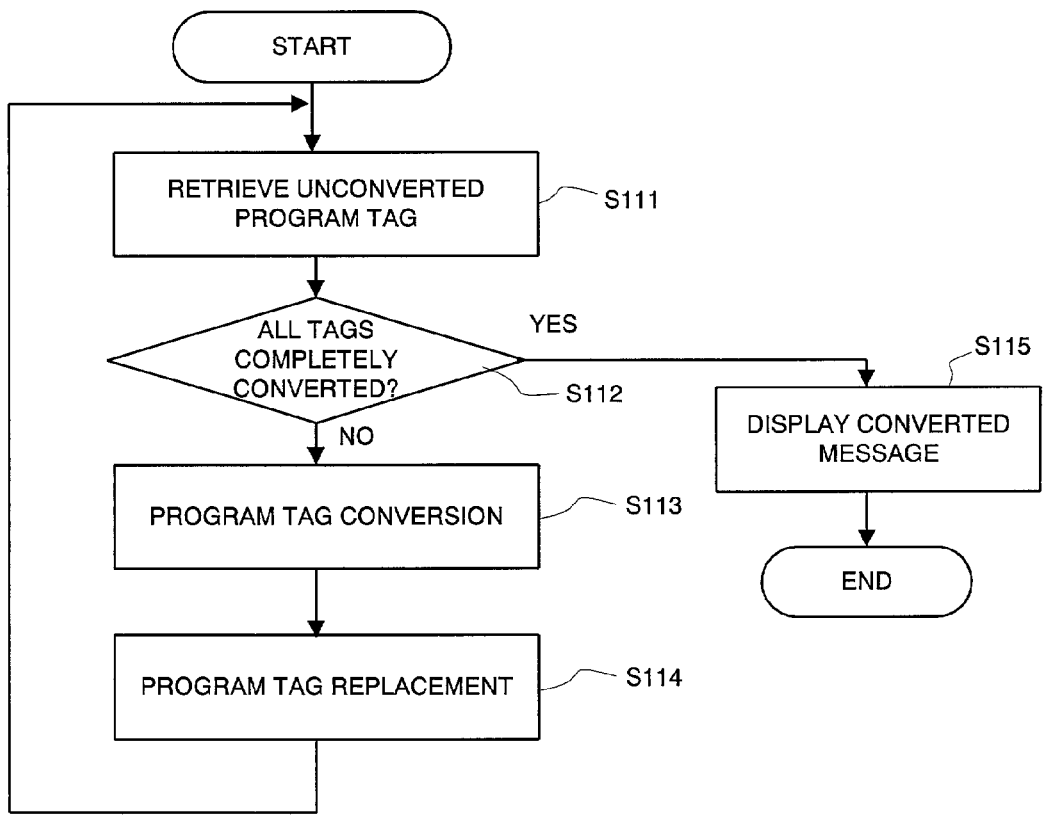
FIG. 28 is a flowchart illustrating the operation in which the rebroadcast corresponding message display in FIG. 25 displays a message.
Figure 29:
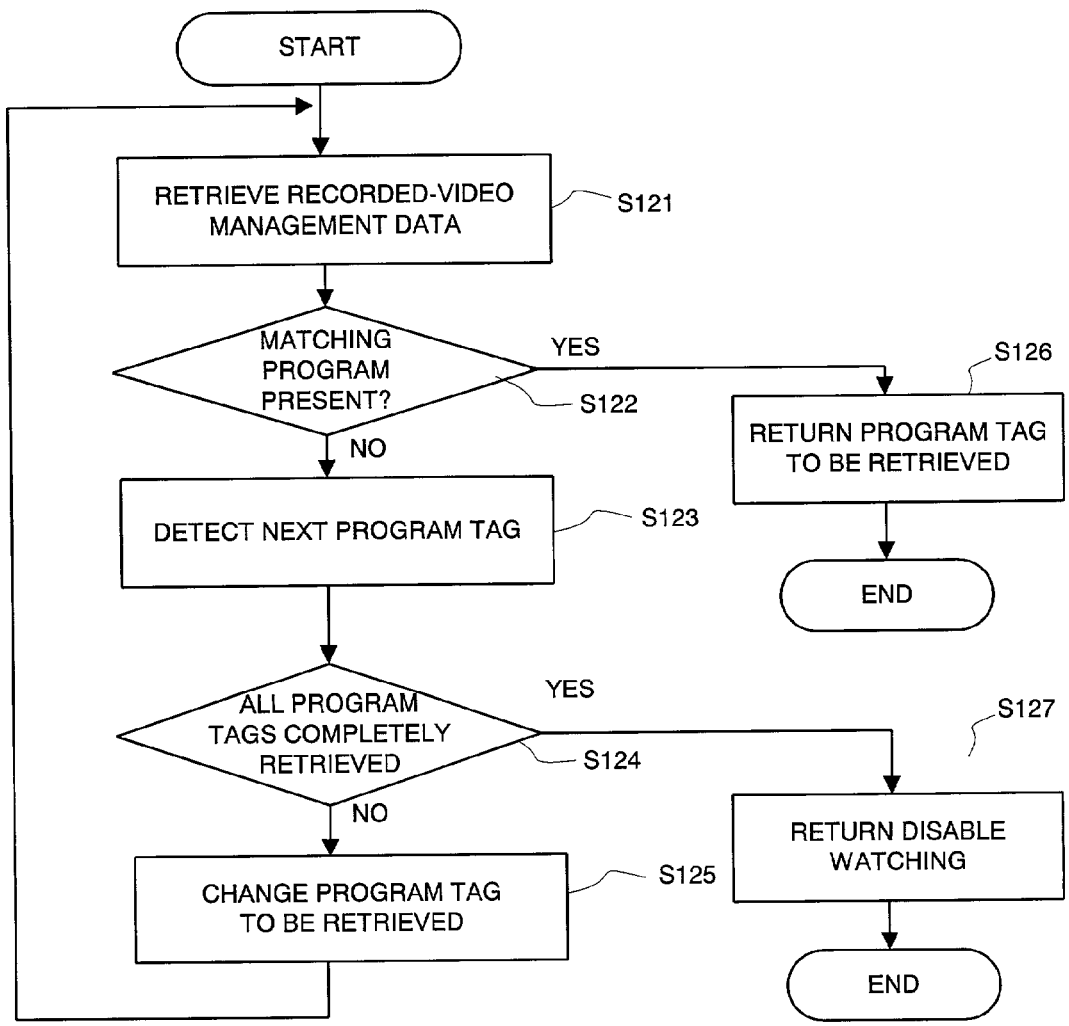
FIG. 29 is a flowchart illustrating the operation of the displayable tag converter in FIG. 25.

FIG. 28 is a block diagram illustrating the operation in which the rebroadcast corresponding message display 29 in FIG. 25 displays the message 15. FIG. 29 is a flowchart representing the operation of the displayable tag converter 30 in FIG. 25. The operation of the broadcast program related information processor according to the thirteenth embodiment of the present invention will be described by referring to FIGS. 25 to 29.

The rebroadcast corresponding message display 29 first retrieves an unconverted program tag in the message 15 (step S111 in FIG. 28). If all program tags have been completely converted (step S112 in FIG. 28), the rebroadcast corresponding message display 29 displays a converted message (step S115 in FIG. 28).

If there is an unconverted program tag (step S112 in FIG. 28), the rebroadcast corresponding message display 29 specifies a program tag to be converted, to the displayable tag converter and indicates the conversion of the program tag (step S113 in FIG. 28). Moreover, the rebroadcast corresponding message display 29 replaces the program tag in the message 15 with the converted program tag (step S114 in FIG. 28) and returns to a retrieval operation of an unconverted program tag (step S111 in FIG. 28).

The displayable tag converter 30 converts a specified program tag into a program tag to be retrieved. The displayable tag converter 30 retrieves the recorded-video management data 13 to check for whether or not a program matching with the program tag to be retrieved has been recorded (step S121 in FIG. 29).

When the program matching with the retrieved program tag is recorded (step S122 in FIG. 29), the displayable tag converter 30 returns the program tag to be retrieved and then ends its process (step S126 in FIG. 29).

When the matched program is in a non-recorded state (step S122 in FIG. 29), the displayable tag converter 30 finds an entry of the retrieval program tag from the rebroadcast database 28, thus searching for the entry referred to by the pointer in the entry (step S123 in FIG. 29).

There may be no entries referred to by the pointer in the entry, or the program tag in the entry referred to by the pointer may match with an already-retrieved program tag, that is, all program tags may have been completely retrieved (step S124 in FIG. 29). In such a case, the displayable tag converter 30 returns "disabled watching", and ends its process (step S127 in FIG. 29).

If all program tags is not in a retrieved state (step S124 in FIG. 29), the displayable tag converter 30 changes the program tag in a referred entry to a retrieval program tag (step S125 in FIG. 29) and then returns to the mode of retrieving recorded-video management data (step S121 in FIG. 29).

As described above, when a program corresponding to a program tag in the message 15 is in a non-recorded state, a program tag corresponding to the same program to be broadcast at a different time is found. Thus, if the program broadcast at a different time has been video-recorded, the same program can be easily viewed.

In the broadcast program related information processor according to the thirteenth embodiment, the rebroadcast corresponding message display 29 can convert the program tag only when being instructed by a user.

Moreover, in the broadcast program related information processor, the rebroadcast corresponding message display 29 may display an original program tag in a message to be converted by the displayable tag converter 30, to a user. The displayable tag converter 30 may change only the program tag used to send an instruction to the program display controller.

Figure 30:
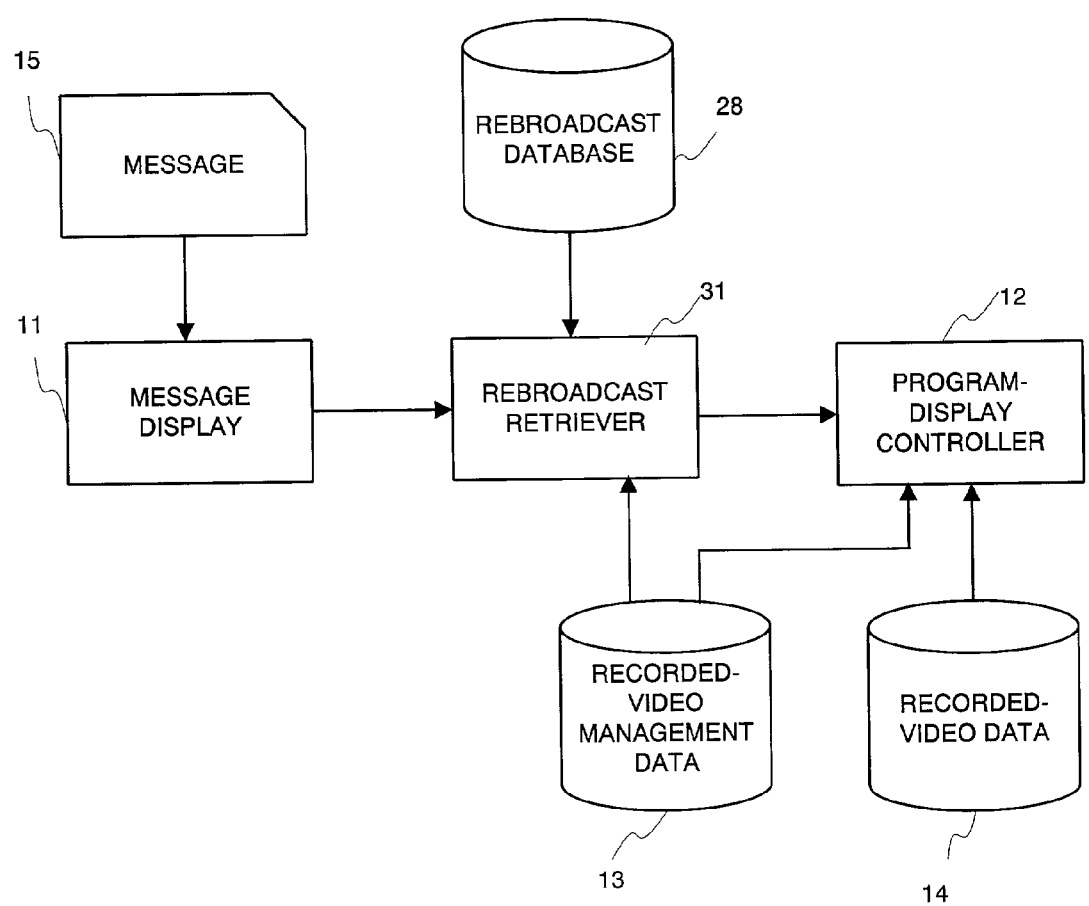
FIG. 30 is a block diagram illustrating the configuration of a broadcast program related information processor according to a fourteenth embodiment of the present invention.

FIG. 30 is a block diagram illustrating the configuration of a broadcast program related information processor according to the fourteenth embodiment of the present invention. Referring to FIG. 30, the broadcast program related information processor includes a rebroadcast database 28, recorded-video management data 13, recorded video data 14, a message display 11, a rebroadcast retriever 31, and a program display controller 12. The rebroadcast database 28 records, when the same program has different program tags to be broadcast at different hours, relationships between the program tags. The recorded-video management data 13 records information on video-recorded programs. The recorded video data 14 saves data recording TV or radio programs. The message display 11 displays the message 15. The rebroadcast retriver 31 retrieves a reproducible program tag using the recorded-video management data 13 and the rebroadcast database 28 based on the program tag transmitted from the message display 11. The program display controller 12 outputs the recorded video data 14 to the display (not shown) based on the program tag transmitted from the reproducible retriever 31. Thus, the program tag is converted upon instructing the display of programs, without changing the message 15 displayed by the message display 11.

The rebroadcast database is similar to the rebroadcast database 28 in the tenth embodiment in configuration and operation. The message display 11 in the present embodiment differs from the message display 11 in the fourth to sixth embodiments in that instructions for reproduction are issued to the rebroadcast retriever 31. The program display controller 12 differs from the program display controller 12 in the fourth to sixth embodiments in that the rebroadcast retriever 31 issues instructions of reproduction.

Figure 31:
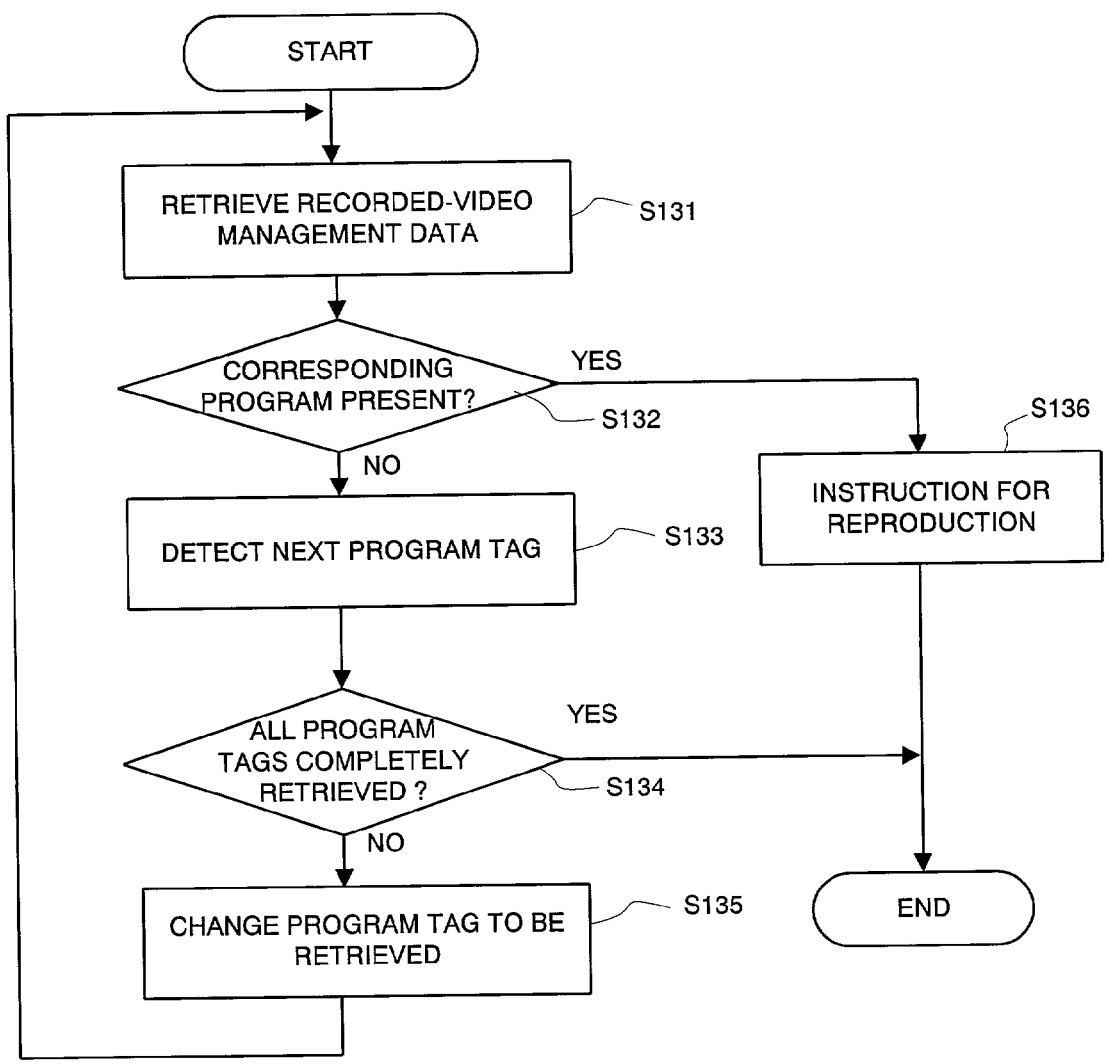
FIG. 31 is a flowchart illustrating the operation in which the rebroadcast retriever of FIG. 30 receives a reproduction instruction from the message display.

FIG. 31 is a flowchart illustrating the operation that the rebroadcast retriever 31 in FIG. 30 receives instructions for reproduction from the message display 11. The operation of the broadcast program related information processor in the fourteenth embodiment is described by referring to FIGS. 30 and 31.

In response to instructions for reproduction, the rebroadcast retriever 31 retrieves the recorded-video management data 13 to check for whether or not the program corresponding to a program tag to be retrieved, being a specified program tag, has been video-recorded (step S131 in FIG. 31).

When the coincident program is in a recorded state (step S132 in FIG. 31), the rebroadcast retriever 31 specifies a program tag to be retrieved to the program display controller 12, instructs the reproduction (step S136 in FIG. 31), and ends its process.

When the coincident program tag is not in a recorded state (step S132 in FIG. 31), the rebroadcast retriever 31 finds an entry of a program tag to be retrieved from the rebroadcast database 28 and searches for the entry referred by the pointer in the entry (step S133 in FIG. 13).

When there is no entry referred by the pointer in the entry and the program tag in the entry referred by the pointer coincides with the program tag to be already retrieved, that is, when all program tags has been completely retrieved (step S134 in FIG. 31), the rebroadcast retriever 31 ends its process.

When all program tags are not in a retrieved state (step S134 in FIG. 31), the rebroadcast retriever 31 changes the program tag in the referred entry into a program tag to be retrieved (step S135 in FIG. 31) and then returns to the retrieval operation of the recorded-video management data (step S131 in FIG. 31).

As described above, even when a corresponding program has not been recorded to the program tag in the message 15, the program tag corresponding to the same program broadcast at a different time can be found. Hence, if the program broadcast at a different time is in a recorded state, the same program can be easily watched.

Figure 32:
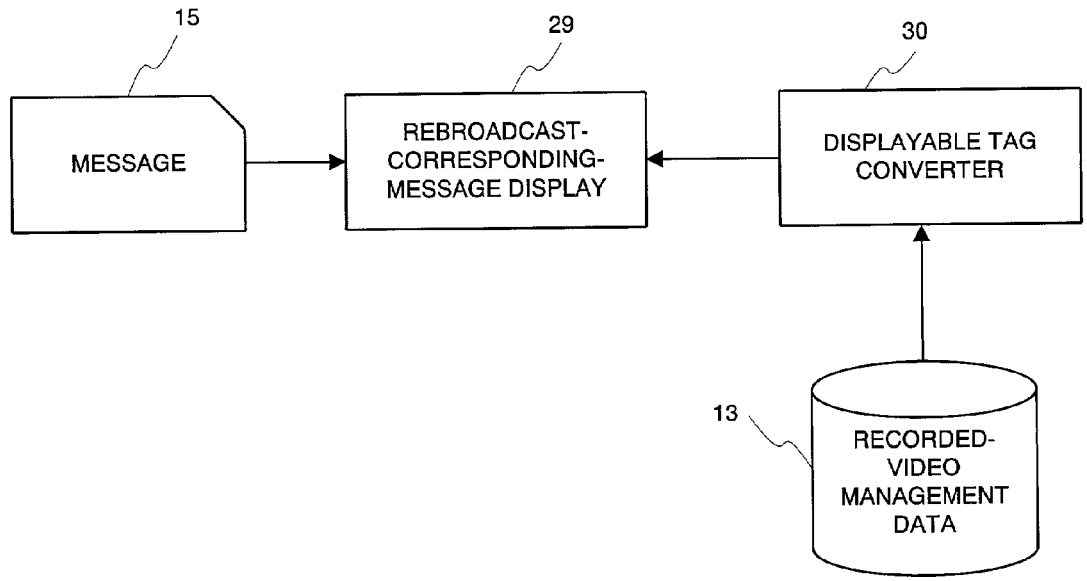
FIG. 32 is a block diagram illustrating the configuration of a broadcast program related information processor according to a fifteenth embodiment of the present invention.

FIG. 32 is a block diagram illustrating the configuration of a broadcast program related information processor in the fifteenth embodiment of the present invention. Referring to FIG. 32, the broadcast program related information processor includes a recorded-video management data 13, a displayable tag converter 30, and a rebroadcast corresponding message display 29. The recorded-video management data 13 records information about video-recorded programs. The displayable tag converter 30 converts into a displayable program tag having the same content as that of a program tag specified with the recorded-video management data 13. The rebroadcast corresponding message display 29 displays makes the displayable tag converter 30 convert the program tag in the message 15 and displays the message.

The message display 11 in the fourth to sixth embodiments is replaced with the rebroadcast corresponding message display 29 in the present embodiment. Thus, the present embodiment can display programs. The rebroadcast corresponding message display 29 is similar to the rebroadcast corresponding message display 29 in the thirteenth and fourteenth embodiments.

Figure 33:
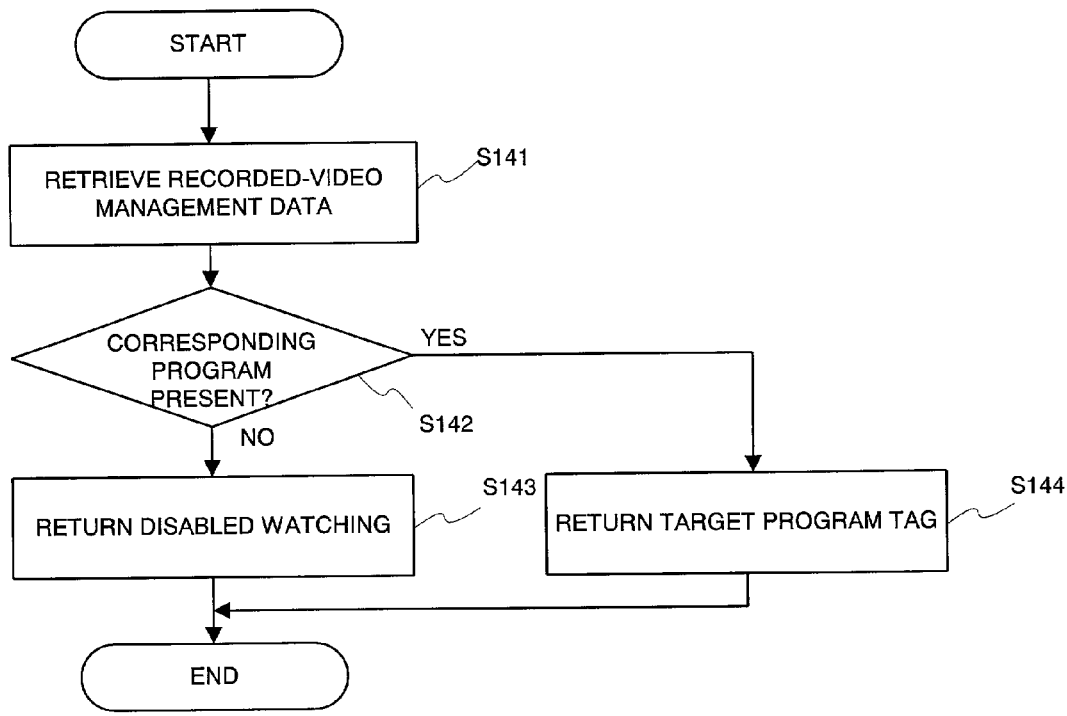
FIG. 33 is a flowchart illustrating the operation of the displayable tag converter in FIG. 32.

FIG. 33 is a flowchart illustrating the operation of the displayable tag converter 30 in FIG. 32. The operation of the broadcast program related information processor in the fifteenth embodiment will be described referring to FIGS. 32 and 33.

The displayable tag converter 30 extracts a program name (in a case, a series name or a subtitle) from the program information of a specified program tag, retrieves information on the program video-recorded in the recorded-video management data 13, and searches for a program name matching with a retrieval object (step S141 in FIG. 33).

When a matched program is found (step S142 in FIG. 33), the displayable tag converter 30 creates a program tag based on the program information (step S144 in FIG. 33), sends back it, and ends its process.

When a matched program is not found (step S142 in FIG. 33), the displayable tag converter 30 sends back "disabled watching" (step S143 in FIG. 33), and ends its process.

As described above, even if a program corresponding to the program tag in a message is video-recorded, a program tag corresponding to the same broadcast program to be broadcast at a different time is found. Thus, if the program broadcast at a different time is in a recorded state, the same program can be easily viewed.

In the broadcast program related information processor according to the fifteenth embodiment, the rebroadcast corresponding message display 29 can convert the program tag only in response to an indication by a user.

In the broadcast program related information processor in the fifteenth embodiment, the rebroadcast corresponding message display 29 may display an original program tag (of a message) to be converted by the displayable tag converter 30 to a user. The program tag may be used that is obtained by converting only the program tag used to transmit instructions to the program display controller, using the displayable tag converter 30.

Figure 34:
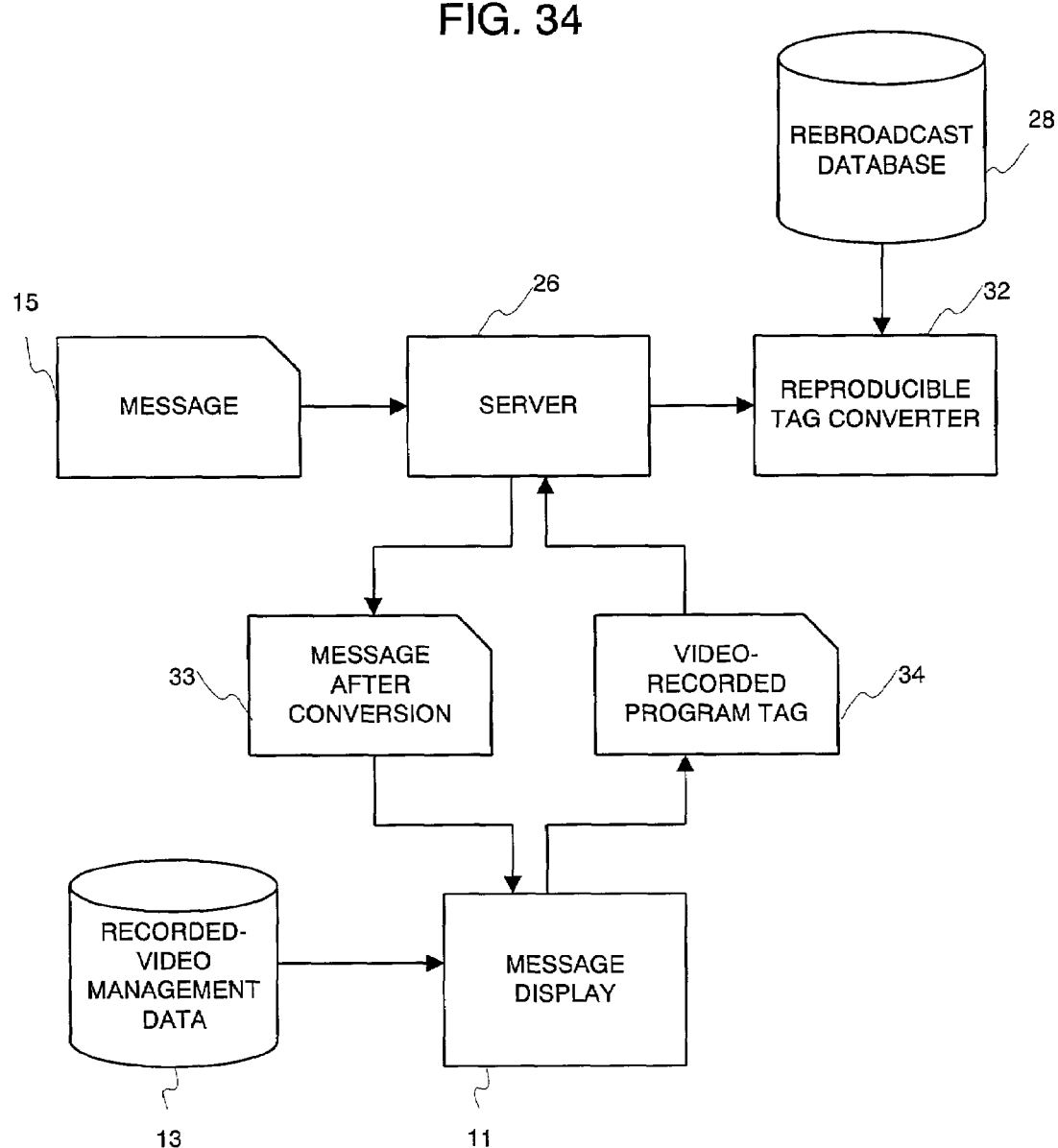
FIG. 34 is a block diagram illustrating the configuration of a broadcast program related information processor according to a sixteenth embodiment of the present invention.

FIG. 34 is a block diagram illustrating the configuration of a broadcast program related information processor according to the sixteenth embodiment. Referring to FIG. 34, the broadcast program related information processor includes a recorded-video management data 13, a message display 11, a reproducible tag converter 32, and a server 26. The recorded-video management data 13 records information on video-recorded programs. The message display 11 transmits program tags of vide-recorded programs created based on the recorded-video management data 13 at the time of requesting a message and then displays the message (the converter message 33) transmitted from the server 26. The reproducible tag converter 32 converts into the displayable program tag having the same content as that of the program tag specified using the rebroadcast database 28. The server 26 converts a program tag in the message 15 into the program tag contained in a recorded program tag transmitted from the message display 11, using the reproducible tag converter 32, and transmits it. The present embodiment added to the fourth to sixth embodiments can be used for the program displaying.

The message display 11 differs from the message display 11 of the fourth to sixth embodiments in that the program tag of a recorded program is created based on the recorded-video management data 13 and the created recorded program tag is sent to the server 26.

Figure 35:
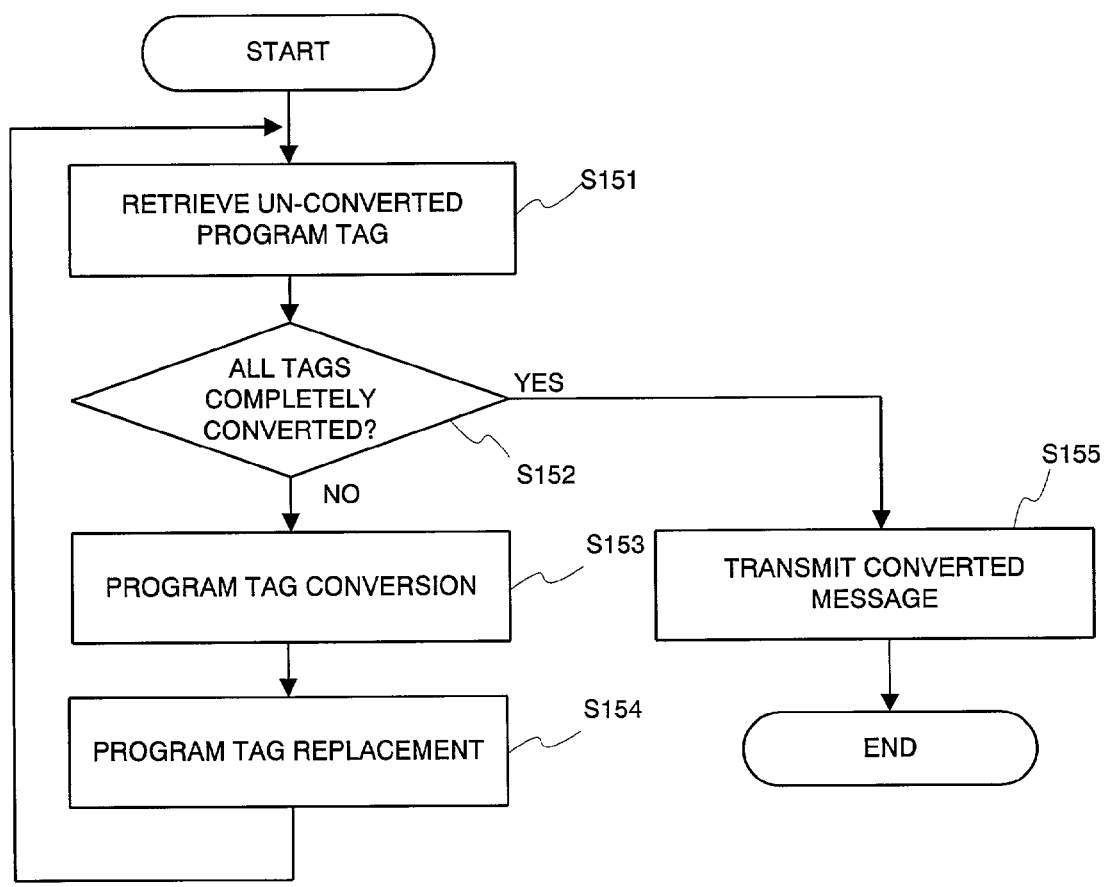
FIG. 35 is a flowchart illustrating the process to message transmission of the server in FIG. 34.
Figure 36:
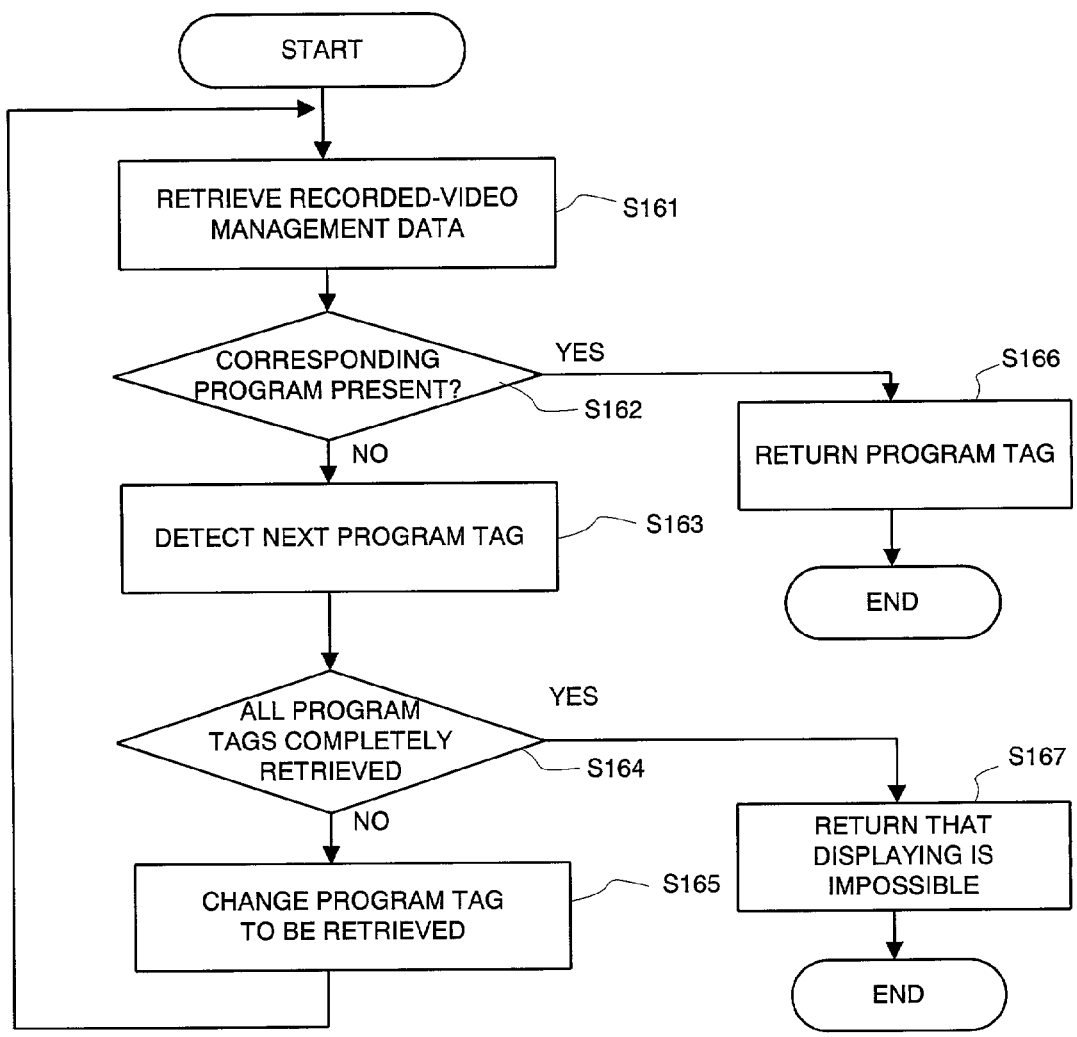
FIG. 36 is a flowchart illustrating the operation of the reproducible tag converter in FIG. 34.

FIG. 35 is a flowchart illustrating the process to message transmission of the server in FIG. 34. FIG. 36 is a flowchart illustrating the operation of the reproducible tag converter 32 in FIG. 34. The operation of the broadcast program related information processor according to the sixteenth embodiment will be described below referring to FIGS. 34 to 36.

When the message display 11 transmits a recorded program tag to issue a message request, the server 26 retrieves an unconverted program tag within the message 15 (step S151 in FIG. 35). If all program tags are in a converted mode (step S152 in FIG. 35), the server 26 transmits the converted message (step S155 in FIG. 35) and ends the process.

If there is an unconverted program tag (step S152 in FIG. 35), the server 26 specifies a conversion intended program tag and a recorded program tag to the reproducible tag converter 32 and then instructs it to convert the program tags (step S153 in FIG. 35). Moreover, the server 26 replaces the program tag in the message 15 with the converted program tag (step S154 in FIG. 35) and then returns to the operation retrieving an unconverted program tag (step S151 in FIG. 35).

The reproducible tag converter 32 retrieves a specified program tag and retrieves whether or not a target program tag is contained in the recorded program tag (step S161 in FIG. 36). When the recorded program tag contains the target program tag (step S162 in FIG. 36), the reproducible tag converter 32 returns the target program tag (step S166 in FIG. 36) and then ends the process.

When there is not the target program tag (step S163 in FIG. 36), the reproducible tag converter 32 finds an entry of the retrieve intended program tag from the rebroadcast database 28 and then searches for an entry referred to by the pointer in the entry (step 163 in FIG. 36).

When there is no entry referred to the pointer in the entry or a program tag in an entry referred by a pointer matches with the program tag to be retrieved, that is, when all program tag are in a retrieved state (step S164 in FIG. 36), the reproducible tag converter 32 returns "disabled watching" (step S167 in FIG. 36) and then ends its process.

If all program tags are not in a retrieved mode (S164 in FIG. 36), the reproducible tag converter 32 changes the referred program tag in the referred entry into a retrieval intended program tag (step S165 in FIG. 36) and then returns to the retrieval of the recorded program tag (S161 in FIG. 36).

As described above, even if a program corresponding to a program tag in the message is not video-recorded, the program tag corresponding to the same program to be broadcast at a different time is found. Thus, if a program broadcast at a different time is in a recorded state, the same program can be easily viewed.

Figure 37:
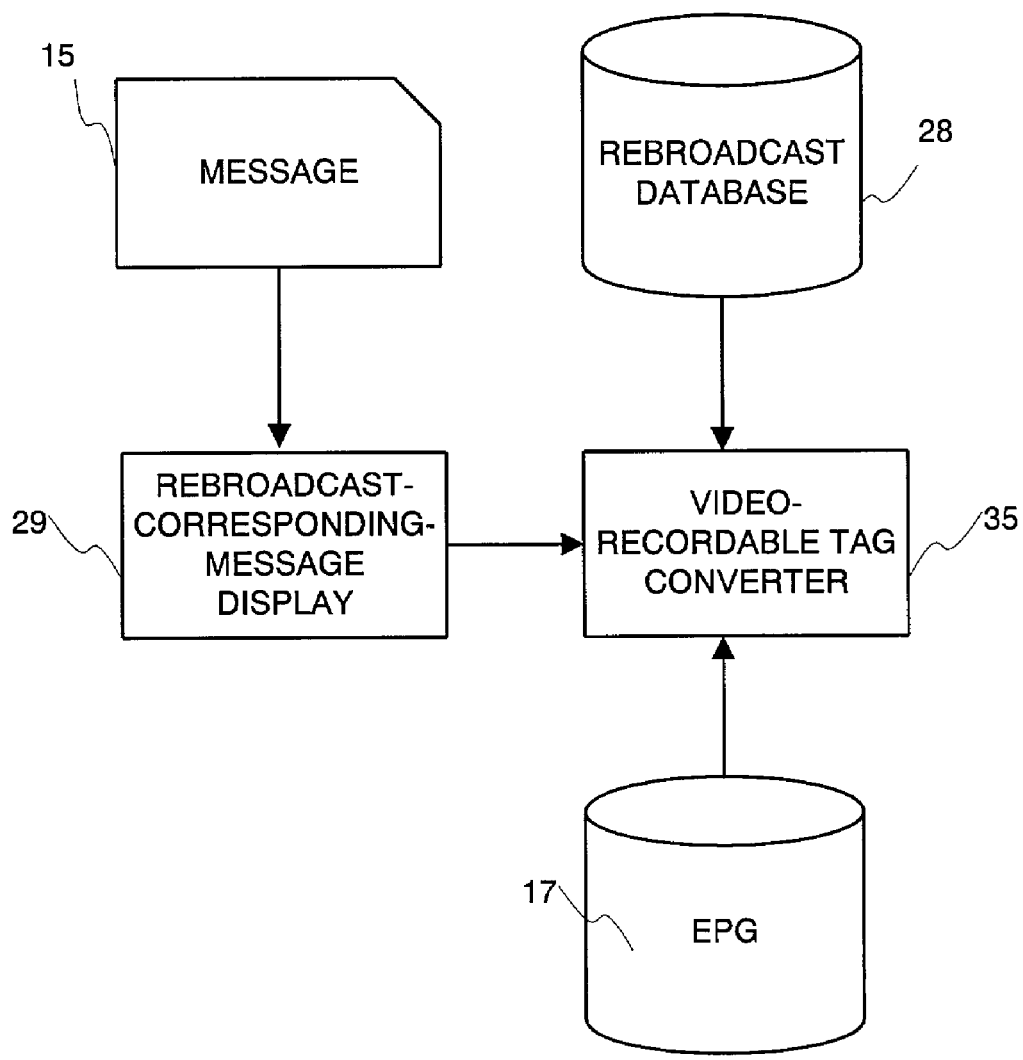
FIG. 37 is a block diagram illustrating the configuration of a broadcast program related information processor according to a seventeenth embodiment of the present invention.

FIG. 37 is a block diagram illustrating the configuration of a broadcast program related information processor according to the seventeenth embodiment of the present invention. Referring to FIG. 37, the broadcast program related information processor includes a rebroadcast database 28, an EPG 17, a recordable tag converter 35, and a rebroadcast corresponding message display 29. The rebroadcast database 28 records relationships between different program tags possessed by the same program to be broadcast at different time. The recordable tag converter 35 converts a program tag specified using the rebroadcast database 28 and the EPG 17 into a recordable program tag with the same content. The rebroadcast corresponding message display 29 makes the recordable tag converter 35 convert a program tag in the message 15 and displays the message 15.

The rebroadcast database 28 has the same configuration as that of the rebroadcast database 28 in the thirteenth and fourteenth embodiments. The present embodiment can preset the recording of a program by replacing the message display 11 in the seventh embodiment with the rebroadcast corresponding message display 29 in the present embodiment. The rebroadcast corresponding message display 29 differs from the message display 11 of the seventh embodiment in that a converted version of the message 15 is displayed.

Figure 38:
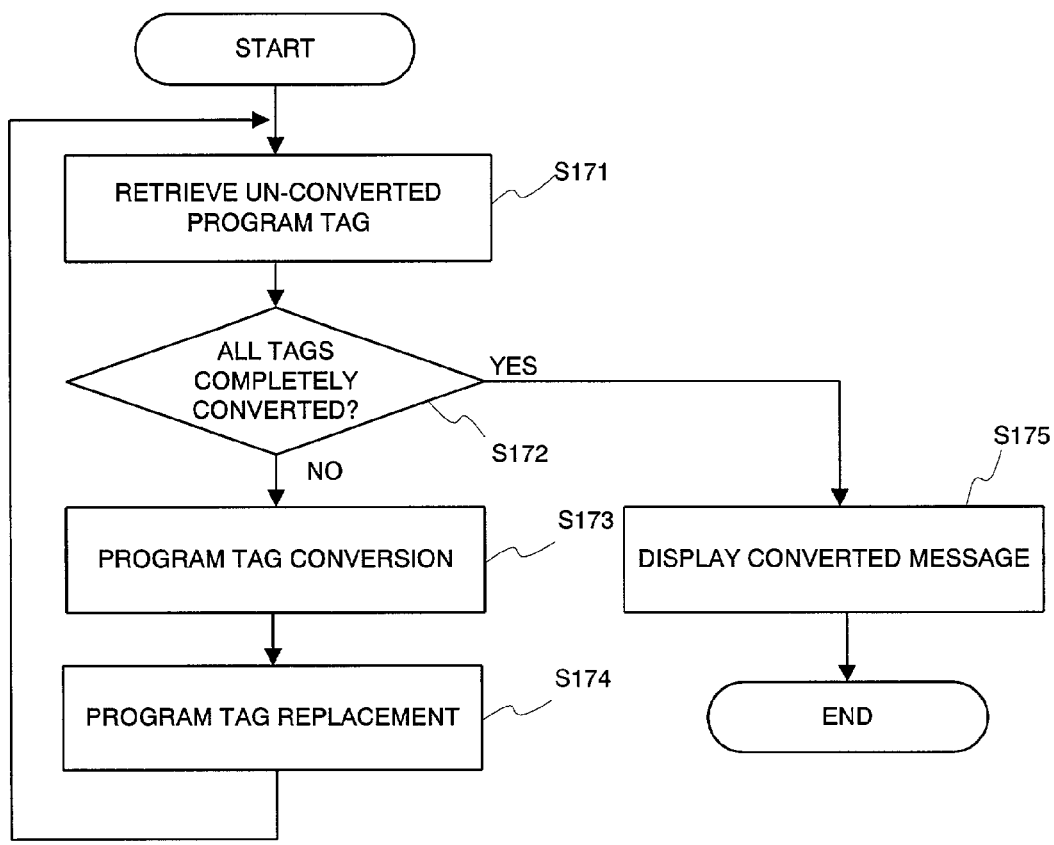
FIG. 38 is a flowchart illustrating a message display operation of the rebroadcast corresponding message display in FIG. 37.
Figure 39:
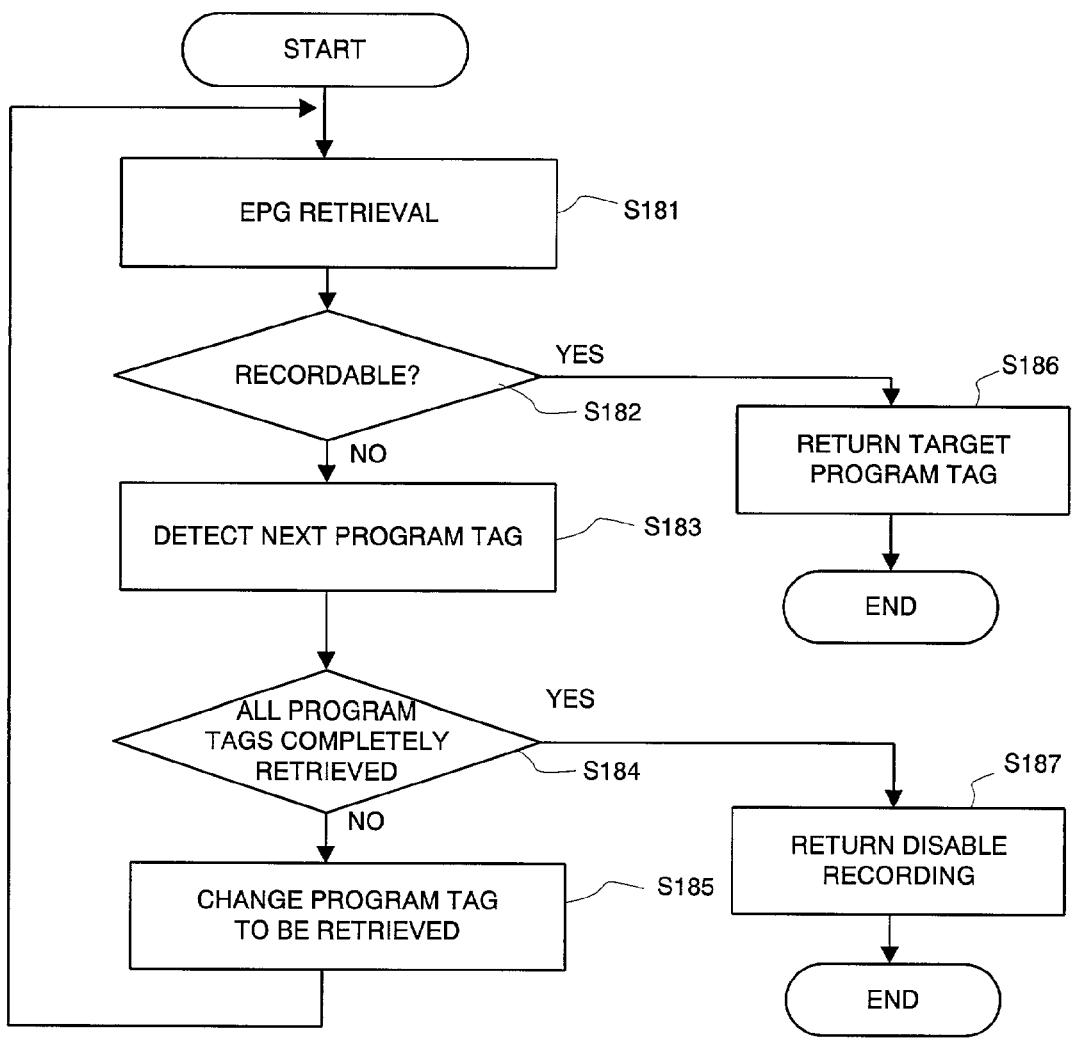
FIG. 39 is a flowchart illustrating an operation of the recordable tag converter in FIG. 37.

FIG. 38 is a flowchart illustrating the message displaying operation of the rebroadcast corresponding message display 29 in FIG. 37. FIG. 39 is a flowchart illustrating the operation of the recordable tag converter 35 in FIG. 37. The operation of the broadcast program related information processor according to the seventeenth embodiment of the present invention will be described below by referring to FIGS. 37 to 39.

The rebroadcast corresponding message display 29 first retrieves an unconverted program tag in the message 15 (step S171 in FIG. 38). If all program tags are in a converted state (step S172 in FIG. 38), the rebroadcast corresponding message display 29 displays the converted message (step S175 in FIG. 38) and then ends its process.

When there is an unconverted program tag (step S172 in FIG. 38), the rebroadcast corresponding message display 29 specifies a conversion intended program tag to the recordable tag converter 35 and instructs the recordable tag converter 35 to convert the program tag (step S173 in FIG. 38). Moreover, the rebroadcast corresponding message display 29 replaces the program tag in the message with the converted program tag (step S174 in FIG. 38) and returns to retrieval conversion of the unconverted program tag (step S171 in FIG. 38).

The recordable tag converter 35 checks the EPG 17 for the program matching with the retrieval intended program tag being a specified program tag (step S181 in FIG. 39). When the matched program tag is not in a broadcast state or is recordable (step S182 in FIG. 39), the recordable tag converter 35 returns the retrieval intended program tag (step S186 in FIG. 39) and then ends its process.

If a matched program tag is in an already broadcast state or be recordable (step S182 in FIG. 39), the recordable tag converter 35 finds an entry of a retrieval intended program tag from the rebroadcast database 28. The pointer within the entry searches for the referred entry (step S183 in FIG. 39).

When there is no entry referred by the pointer in the entry, or the program tag in the entry referred by the pointer matches with the program tag to be retrieved, that is, all program tags are in a retrieved state (step 184 in FIG. 39), the recordable tag converter 35 returns "disabled recording" (step S187 in FIG. 39) and then ends its process.

If all program tags are not in a retrieved state (step S184 in FIG. 39), the recordable tag converter 35 changes the program tag in the referred entry into the retrieval intended program tag (step S185 in FIG. 39) and then returns to the retrieval of the EPG 17 (step S181 in FIG. 39).

The program corresponding to a program tag in a message may be in an already-broadcast state and may not be able to be preset for video-recording. In such a case, an unbroadcast program to be broadcast at a different time can be preset for recording by finding the program tag corresponding to the same.

In the broadcast program related information processor according to the seventeenth embodiment, the rebroadcast corresponding message display 29 can perform the program tag conversion only through the indication by a user.

In the broadcast program related information processor according to the seventeenth embodiment, the rebroadcast corresponding message display 29 may display a program tag in a message, to be converted by the recordable converter 35, to a user. The program tag converted by the recordable tag converter 35 may be used as a program tag used to send an indication to the program recording reserver.

Figure 40:
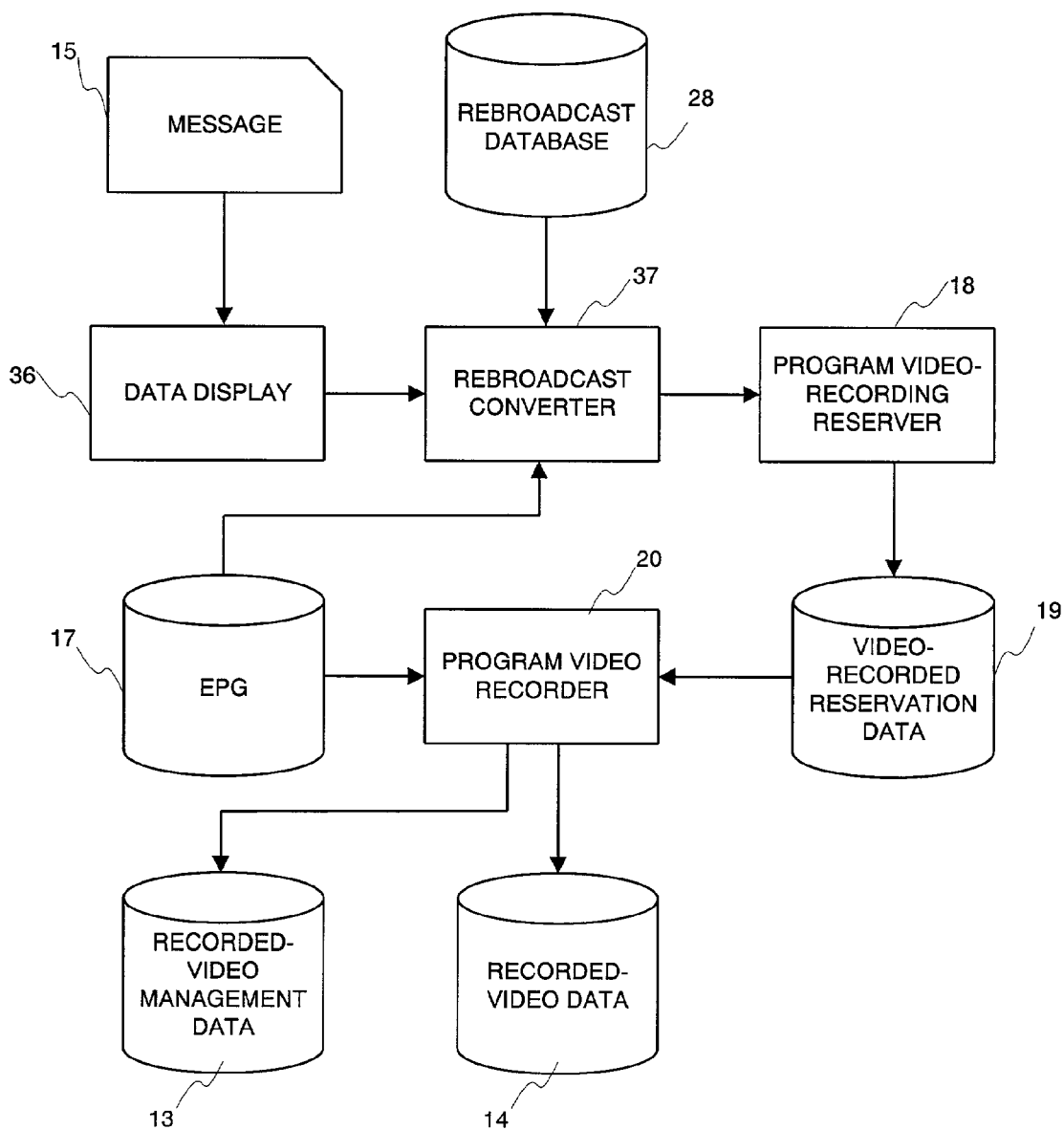
FIG. 40 is a block diagram illustrating the configuration of a broadcast program related information processor according to an eighteenth embodiment of the present invention.

FIG. 40 is a block diagram illustrating the configuration of a broadcast program related information processor according to the eighteenth embodiment of the present invention. Referring to FIG. 40, the broadcast program related information processor includes recorded-video management data 13, recorded video data 14, an EPG 17, recorded reservation data 19, a rebroadcast database 28, a program video recorder 20, a data display 36, a rebroadcast converter 37, and a program recording reserver 18. The recorded-video management data 13 records video-recorded program information. The recorded data 14 saves data video-recording TV or radio broadcast programs. The recorded reservation data 19 records recorded-video reservation information. The rebroadcast database 28 records relationships between different program tags of the same program to be broadcast at a different time. The program video recorder 20 receives a TV or radio program based on the recorded-video reservation data 19, records it into the recorded-video data 14, and records related information of the recorded program into the recorded-video management data 13 based on the EPG 17. The data display 36 displays the message 15. The rebroadcast converter 37 converts the program tag of the message 15 transmitted from the data display 26 into a recordable program tag, using both the EPG 17 and the rebroadcast database 28. The program video-recording reserver 18 registers video-recording reservation in the recorded-video reservation data 19 based on the program tag transmitted from the rebroadcast converter 38.

The above-mentioned configuration converts a program tag at the time of indicating the preset recording of a program, without changing the message 15 displayed by the data display 36. The rebroadcast database 28 is similar to the rebroadcast database 28 in the thirteenth and fourteenth embodiments.

The data display 36 differs from the message display 11 in the seventeenth embodiment in that the reservation (or presetting) of video-recording is instructed to the rebroadcast converter 37. The program recording reserver 18 differs from the program recording reserver 18 in the seventh embodiment in that the rebroadcast converter 38 issues an instruction for the reservation of video-recording. The program video recorder 20 is similar to the program video recorder 20 in the seventh embodiment in configuration and operation.

Figure 41:
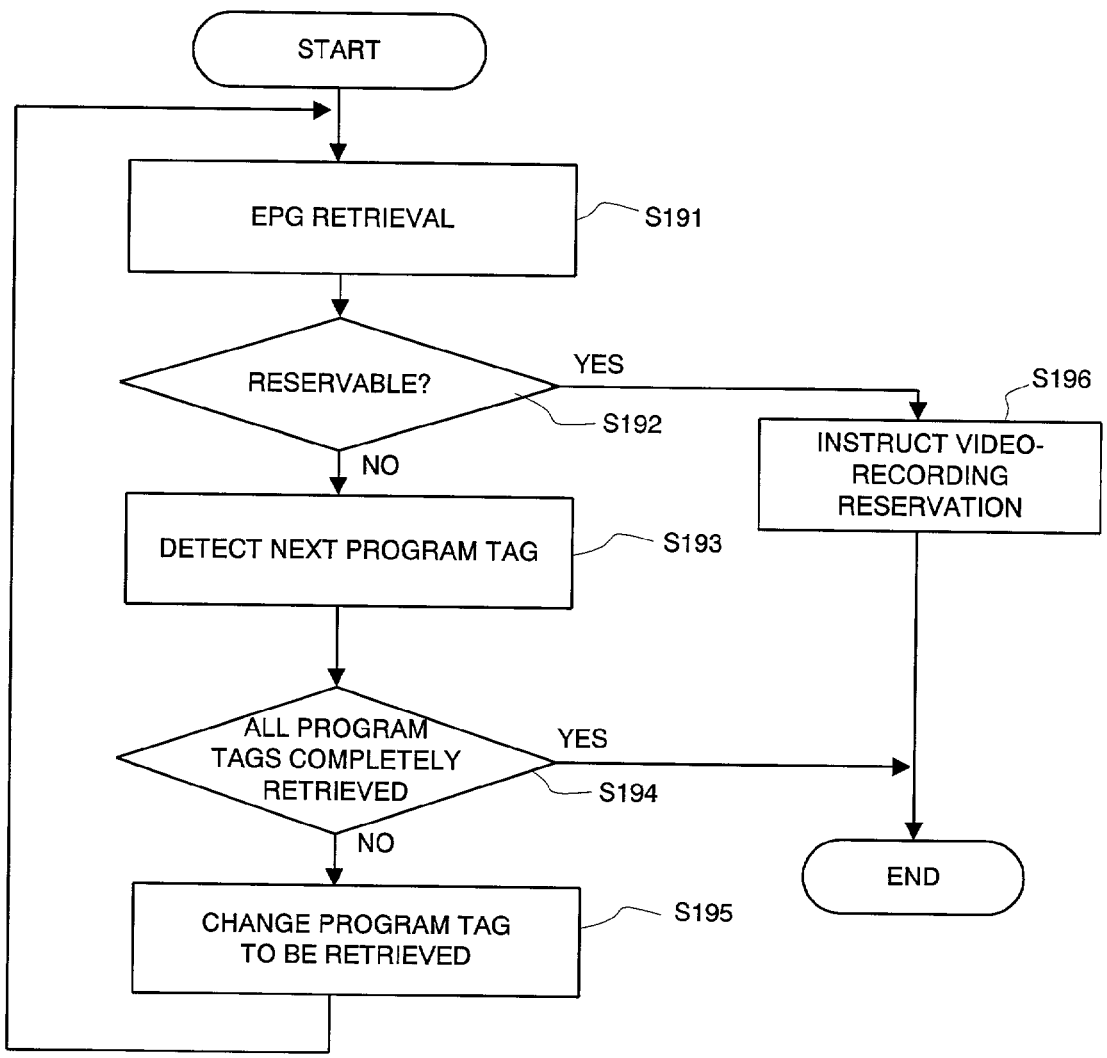
FIG. 41 is a flowchart illustrating the operation in which the rebroadcast converter in FIG. 40 receives an instruction for video recording from the data display.

FIG. 41 is a flowchart illustrating the operation that the rebroadcast converter 37 (FIG. 40) receives an instruction for video-recording reservation from the data display 36. The operation of a broadcast program related information processor according to the eighteenth embodiment will be described by referring to FIGS. 40 and 41.

In response to an instruction for the reservation of video-recording, the rebroadcast converter 37 retrieves the EPG 17 for information on a program specified with a retrieval intended program tag being a specified program tag (step S191 in FIG. 41).

When the program retrieved with the EPG 17 is video-recordable (pre-settable) (step S192 in FIG. 41), the rebroadcast converter 37 specifies the retrieved program tag to the program recording reserver and instructs the presetting of video-recording (step S196 in FIG. 41).

When the intended program is not pre-settable (step S192 in FIG. 41), the rebroadcast converter 37 finds an entry of the retrieval intended program tag from the rebroadcast database 28 (step S193 in FIG. 41).

When there is no entry referred by the pointer in the entry, or the program tag in the entry referred by the pointer matches with the program tag already retrieved, that is, all program tags are in a retrieved state (step S194 in FIG. 41), the rebroadcast converter 37 ends the process.

When all program tags are not in a retrieved state (step S194 in FIG. 41), the rebroadcast converter 37 changes the program tag in the referred entry to a retrieval intended program tag (step S195 in FIG. 41) and then returns to retrieval of the EPG 17 (step S191 in FIG. 41).

The program corresponding to a program tag in a message may be in an already broadcast state but may not be able to be preset for video-recording. In such a case, if there is an unbroadcast program to be broadcast at a different time, the reservation of video-recording can be easily preset by finding a program tag corresponding to the same program to be broadcast at a different time.

Figure 42:
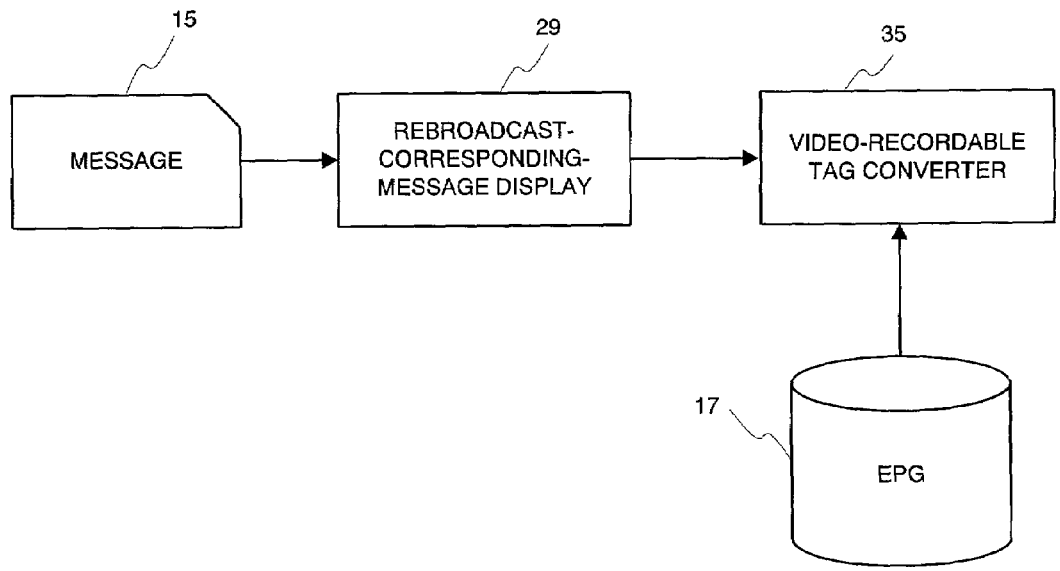
FIG. 42 is a block diagram illustrating the configuration of a broadcast program related information processor according to a nineteenth embodiment of the present invention.

FIG. 42 is a block diagram illustrating the configuration of a broadcast program related information processor according to the nineteenth embodiment of the present invention. Referring to FIG. 42, the broadcast program related information processor includes an EPG 17, a recordable tag converter 35, and a rebroadcast corresponding message display 29. The recordable tag converter 35 converts a program tag specified with the EPG 17 into a recordable program tag of the same content. The rebroadcast corresponding message display 29 makes the recordable tag converter 35 convert a program tag in the message 15 and displays the message 15.

The present embodiment can be used to reserve program recording by replacing the message display 11 in the seventh embodiment with the rebroadcast corresponding message display 29 in the present embodiment. In the configuration and operation, the rebroadcast corresponding message display 29 in the present embodiment is similar to the rebroadcast corresponding message display 29 in the seventeenth embodiment and to the rebroadcast corresponding message display 37 in the seventeenth and eighteenth embodiments.

Figure 43:
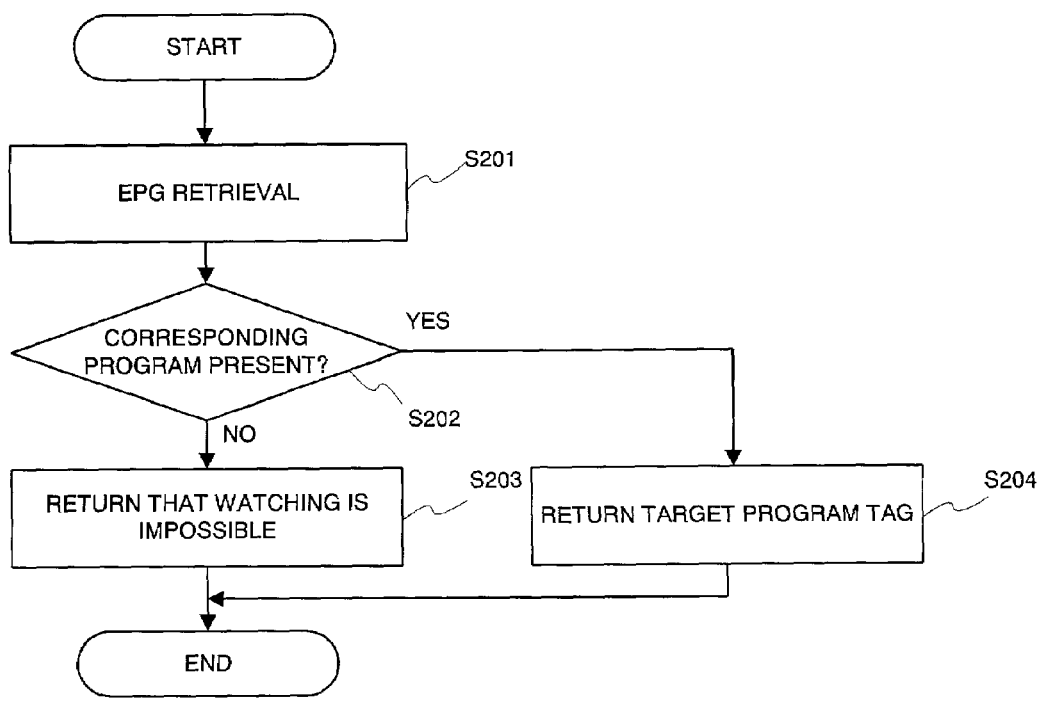
FIG. 43 is a flowchart illustrating the operation of the recordable tag converter in FIG. 42.

FIG. 43 is a flowchart illustrating the operation of the recordable tag converter 35 in FIG. 42. The operation of broadcast program related information processor according to the nineteenth embodiment of the present invention will be described by referring to FIGS. 42 and 43.

The recordable tag converter 35 extracts a program name (often, a series and subtitle) from program information on a specified program tag and retrieves the program matching with the program name from an unbroadcast program in the EPG 17 (step S201 in FIG. 43).

When the program matching with the program name is found (step S202 in FIG. 43), the recordable tag converter 35 creates a program tag from information on the program and returns it (step S204 in FIG. 43), thus ending the process.

When the program matching with the program name is not found (step S202 in FIG. 43), the recordable tag converter 35 returns "disabled watching" (step S203 in FIG. 43) and then ends the process.

As described above, when a program corresponding to a program tag in the message 15 is in an already broadcast state but cannot be preset for video-recording, the program tag corresponding to the same program to be broadcast at a different time is found. Thus, if there is an unbroadcast program to be broadcast at a different time, video-recording can be easily preset.

In the broadcast program related information processor according to the nineteenth embodiment, the rebroadcast corresponding message display 29 can perform the conversion of a program tag only when a user indicates.

In the broadcast program related information processor according to the nineteenth embodiment, the rebroadcast corresponding message display 29 displays to a user a program tag of a message to be converted by the recordable tag converter 35. The program tag converted by the recordable tag converter 35 may be used as only the program tag used when an instruction is sent to the program recording reserver.

Figure 44:
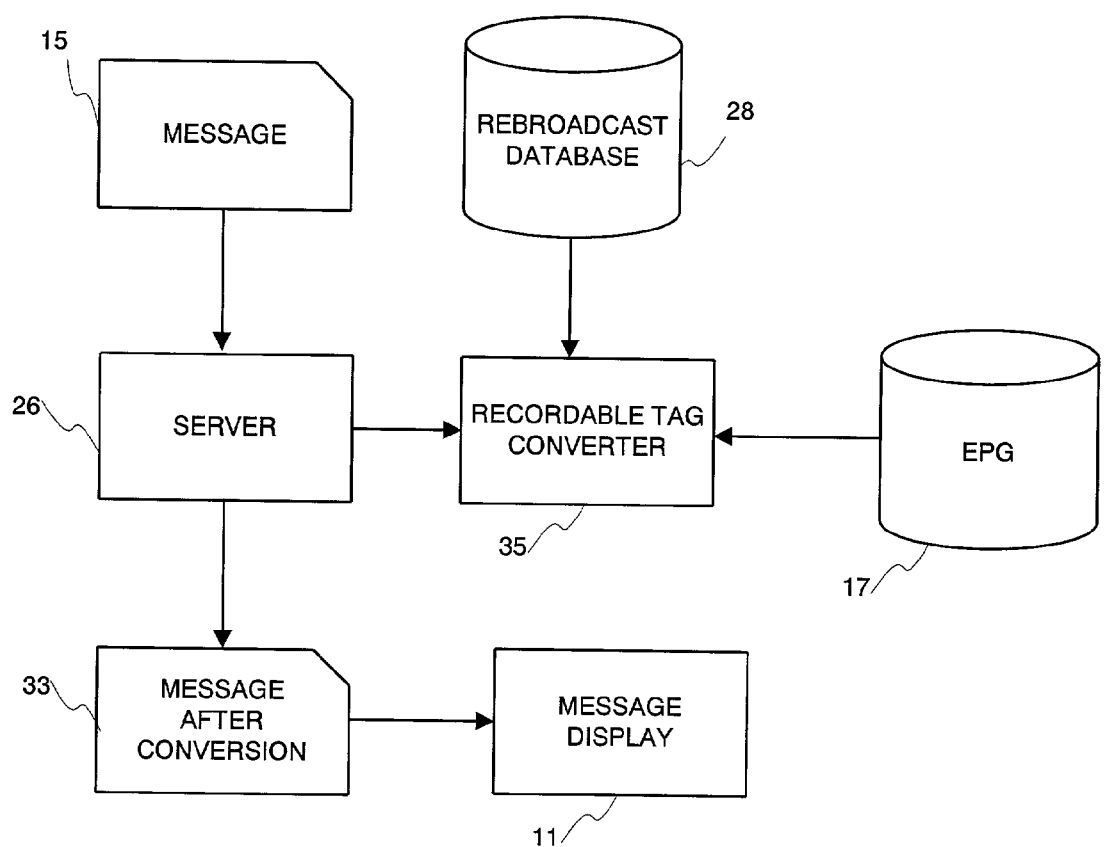
FIG. 44 is a block diagram illustrating the configuration of a broadcast program related information processor according to a twentieth embodiment of the present invention.

FIG. 44 is a block diagram illustrating the configuration of a broadcast program related information processor according to the twentieth embodiment of the present invention. Referring to FIG. 44, the broadcast program related information processor includes a message display 11, an EPG 17, a rebroadcast database 28, a recordable tag converter 35, and a server 26. The message display 11 displays a message transmitted from the server 26. The rebroadcast database 28 records relationships between different program tags of the same program to be broadcast at a different time. The recordable tag converter 35 converts a specified program tag into a program tag of a recordable program with the same content, using both the EPG 17 and the rebroadcast database 28. The server 26 converts the program tag in the message 15 using the recordable tag converter 35 and then transmits it.

The rebroadcast database 28 is similar to the rebroadcast database 28 in the thirteenth and fourteenth embodiments. The present embodiment can preset the video-recording by adding the present embodiment to the seventh embodiment.

In configuration and operation, the message display 11 is similar to the message display 11 in the seventh embodiment. The recordable tag converter 35 differs from the recordable tag converter 35 in the seventeenth and eighteenth embodiments in that the server 26 sends a request.

Figure 45:
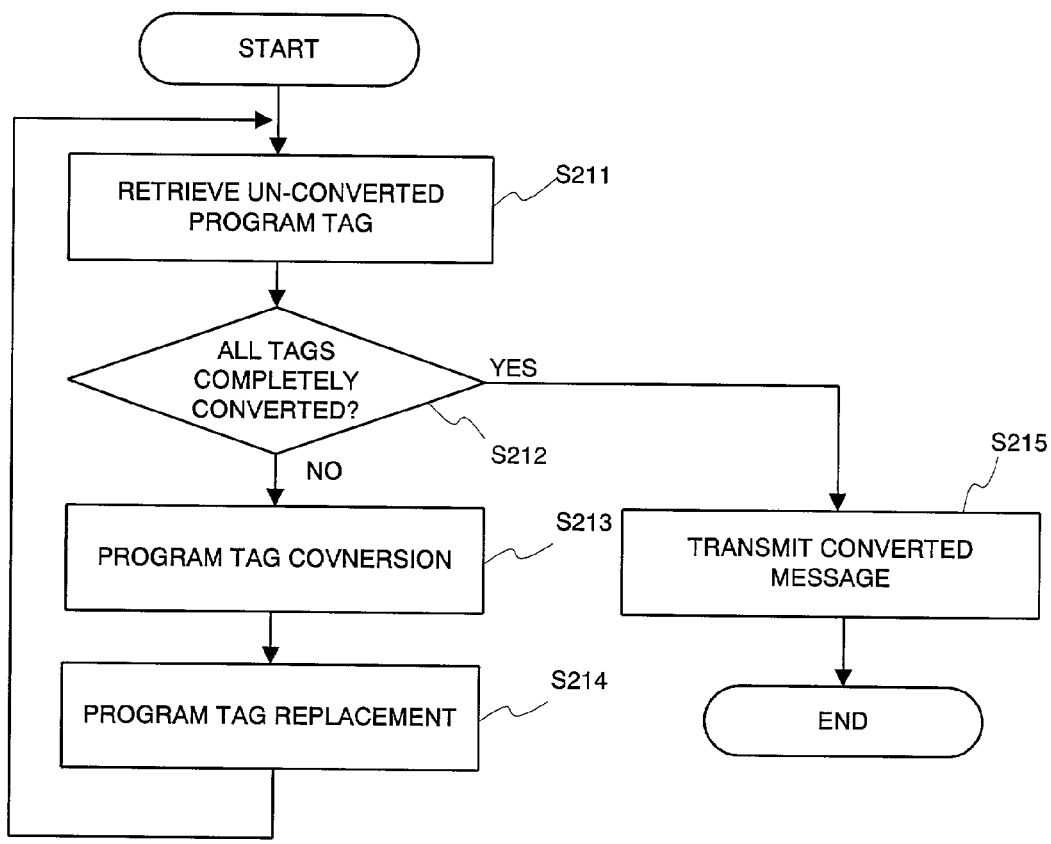
FIG. 45 is a flowchart illustrating the process to message transmission of the server in FIG. 44.

FIG. 45 is a flowchart illustrating the process to the message transmission of the server 26 in FIG. 44. The operation of the broadcast program related information processor in the twentieth embodiment will be described below by referring to FIGS. 44 and 45.

When the message display 11 requests a message, the server 26 retrieves an unconverted program tag in the message 15 (step S211 in FIG. 45). When all program tags are in a converted state (step S212 in FIG. 45), the server 26 transmits the converted message (step S215 in FIG. 45) and then ends the process.

When there is an unconverted program tag, the server 26 specifies a conversion intended program tag and instructs the recordable tag converter 35 to convert it (step S213 in FIG. 45). Thereafter, the server 26 replaces the program tag in the message with the converted program tag (step S214 in FIG. 45) and returns to retrieval of unconverted program tag (step S211 in FIG. 45).

As described above, when a program corresponding to a program tag in the message 15 is in an already broadcast state but cannot be preset for video-recording, the program tag corresponding to the same program to be broadcast at a different time is found. Thus, if there is an unbroadcast program to be broadcast at a different time, the video-recording can be easily preset.

The present invention has the following aspects in connection with the attached claims:

1) A broadcast program related information processor comprises an EPG (Electric Program Guide) containing program information to be broadcast; a creator for creating a program tag based on the content of the EPG, the program tag referring to at least the program; and an inserter for inserting the created program tag into a location externally specified.

2) In the broadcast program related information processor, the program tag is inserted into the specified location of a message in creation based on the external instruction.

3) In the broadcast program related information processor, the program tag is distinguished from other text in the message.

4) In the broadcast program related information processor, when the message is structured data, a program tag is distinguishable by the format of the data.

5) In the broadcast program related information processor, when the message is HTML (Hyper Text Markup Language) data, a program tag is identified by a predetermined dedicated tag.

6) The broadcast program related information processor further comprises means for instructing the program display controller to replay a program specified in accordance with program tag information externally specified during display of the message, said display controller controlling the display of a telecast program during recording or broadcasting and of a stored program during reproduction.

7) In the broadcast program related information processor, the program replay instructing means instructs to replay a specified scene of a specified program.

8) The broadcast program related information processor further comprises means for instructing to reserve recording of a program specified in accordance with program tag information externally specified during displaying the message.

9) The broadcast program related information processor further comprises a decider for deciding whether or not a program specified with a program tag externally specified during displaying the message is before or during broadcasting or in a recorded state. When determining a program before broadcasting, the decider instructs to preset recording of a program specified in accordance with the program tag information. When determining a program during broadcasting or a recorded program, the decider instructs to replay a program specified in accordance with the program tag information.

10) In the broadcast program related information processor, when a program specified with a program tag in a message to be displayed is before broadcasting, a program tag is displayed in a representation method representing a record reservable state. When a program specified with the program tag is during broadcasting or in a recorded state, a program tag is displayed in a representation method of representing a displayable state. When a program specified with the program tag is in a broadcast state and in an unrecorded state, a program tag is displayed in a representation method of representing a non-displayable state.

11) In the broadcast program related information processor, the representation method is a method of changing the color, font, and character modification of the program tag or a method of displaying a character string indicating a state.

12) The broadcast program related information processor further comprises a database for storing correspondence relationships between program tags different at each area; and means for converting a program tag in a message transmitted from a different area based on the database and in accordance with an area representing the program.

13) The broadcast program related information processor further comprises means for converting the program tag information in a message transmitted from a different area into a program tag corresponding to an area displaying the program, using an EPG (Electric Program Guide) for a user area.

14) In the broadcast program related information processor, by specifying a subscriber area to a server that stores the message, the server converts a program tag in the message in accordance with the subscriber area and transmits the converted program tag.

15) The broadcast program related information processor further comprises means for converting, when a program with the same content is rebroadcast at a different time, a program tag buried in the message into a program tag with the same content of a program during broadcasting or in a recorded state.

16) The broadcast program related information processor further comprises means for converting, when a program specified with a program tag in the message is in an already broadcast state and in a non-recorded state, a program tag information into a program tag of a program during broadcasting or in a recorded state, using an EPG (Electric Program Guide).

17) In the broadcast program related information processor, a program tag of a recorded program is transmitted to the server storing the message. When a program tag in a message has the same content as the program content of a program tag of the recorded program, the server converts the program tag in the message into the program tag of the recorded program and then transmits the program tag of the recorded program.

18) The broadcast program related information processor further comprises means for converting, when a program with the same content is rebroadcast at a different time, a program tag buried in the message into a program tag of a program with the same content before broadcasting.

19) The broadcast program related information processor further comprises means for converting, when a program specified with a program tag in the message is in an already broadcast state, the program tag information in the message into a program tag of a program before broadcasting, using an EPG (Electric Program Guide).

20) In the broadcast program related information processor, when there is a program before broadcasting with the same content as that of the already-broadcast program, a program tag of an already-broadcast program, the server storing the message converts the program tag of the already-broadcast program of program tags in a message into a program tag of a program before broadcasting and then transmits the converted program tag.

21) A broadcast program related information processing method comprises the steps of creating, based on the content of an EPG (Electric Program Guide) containing program information to be broadcast, at least a program tag referring to the program, and inserting the created program tag into a location externally specified.

22) In the broadcast program related information processing method, the program tag is inserted into the specified location of a message in creation based on the external instruction.

23) In the broadcast program related information processing method, the program tag is distinguished from other texts in the message.

24) In the broadcast program related information processing method, when the message is formed of structured data, a program tag is distinguishable by the format of the data.

25) In the broadcast program related information processing method, when the message is HTML (Hyper Text Markup Language) data, a program tag is identified by a predetermined dedicated tag.

26) The broadcast program related information processing method further comprises the step of instructing the program display controller to replay a program specified in accordance with a program tag information externally specified during displaying the message, the program display controller controlling the display of a video program during video-recording or broadcasting and a program stored in replaying.

27) In the broadcast program related information processing method, the program reply instructing step comprises issuing an instruction for replaying a specified scene of a specified program.

28) The broadcast program related information processing method further comprises the step of issuing an instruction for reserving the video-recording of a program specified in accordance with program tag information externally specified during displaying the message.

29) The broadcast program related information processing method further comprises the step of deciding whether or not a program specified with a program tag externally specified during displaying the message is before or during broadcasting, or in a recorded state, and issuing, when determining a program before broadcasting, an instruction for reserving the video-recording of a program specified in accordance with the program tag information, and issuing, when determining a program during broadcasting or in a recorded state, an instruction for replaying a program specified in accordance with the program tag information.

30) In the broadcast program related information processing method, when a program specified with a program tag in a message to be displayed is before broadcasting, a program tag is displayed in a representation method representing a record reservable state, and when a program specified with the program tag is during broadcasting or in a recorded state, a program tag is displayed in a representation method of representing a displayable state, and when a program specified with the program tag is in an already broadcast state and in non-recorded state, a program tag is displayed in a representation method of representing a non-displayable state.

31) In the broadcast program related information processing method, the representation method is a method of changing the color, font, and character modification of the program tag or a method of displaying a character string indicating a state.

32) The broadcast program related information processing method further comprising the step of converting a program tag in a message transmitted from a different area based on a database and in accordance with an area representing the program, the database storing correspondence relationships between program tags different at each area.

33) The broadcast program related information processing method further comprises the step of converting a program tag in a message transmitted from a different area into a program tag in accordance with an area displaying the program, using an EPG (Electric Program Guide) for a user area.

34) The broadcast program related information processing method further comprises the step of specifying a subscriber area to a server that stores the message, converting by the server a program tag in the message in accordance with the subscriber area, and transmitting the converted program tag.

35) The broadcast program related information processing method further comprises the step of converting, when a program with the same content is rebroadcast at a different time, a program tag buried in the message into a program tag with the same content of a program during broadcasting or in a recorded state.

36) The broadcast program related information processing method further comprises the step of converting, when a program specified with a program tag in the message is in an already broadcast state and in a non-recorded state, a program tag information into a program tag of a program during broadcasting or in a recorded state, using an EPG (Electric Program Guide).

37) In the broadcast program related information processing method, a program tag of a recorded program is transmitted to a server storing the message. When a program tag in a message transmitted by the server has the same content as that of the recorded program, the program tag in the message is converted into the program tag of the recorded program and the program tag of the recorded program is transmitted.

38) The broadcast program related information processing method further comprises the step of converting, when a program with the same content is rebroadcast at a different time, a program tag buried in the message into a program tag of a program with the same content before broadcasting.

39) The broadcast program related information processing method further comprises the step of converting, when a program specified with a program tag in the message has been already broadcast, the program tag information in the message is converted into a program tag of a program before broadcasting, using an EPG (Electric Program Guide).

In the broadcast program related information processing method, when there is a pre-broadcast program with the same content as that of an already-broadcast program, the server storing the message converts a program tag of an already-broadcast program of program tags in a message into a program tag of the pre-broadcast program, and then transmits the converted program tag.

As described above, according to the first aspect of the invention, the broadcast program related information processor creates at least a program tag referring to a program, based on information on a program during watching received from the program display controller, display-controlling a broadcast program during video recording or broadcasting and a stored program during reproduction, and then inserts the created program tag into a location externally specified. Hence, a user can easily create a message containing a program tag corresponding to a program during watching.

In the second aspect of the present invention, the broadcast program related information processor creates a message containing the program tag based on the content of an Electric Program Guide including predetermined broadcast program information. Hence, a message containing a program tag corresponding to a program can be easily created using the Electric Program Guide.

In the third aspect of the present invention, the broadcast program related information processor instructs the program display controller to replay a program specified in accordance with a program tag information externally specified during displaying the message. Hence, the program specified with the program tag in a message can be easily watched.

In the fourth aspect of the present invention, the broadcast program related information processor instructs to preset the recording of a program specified in accordance with program tag information externally specified during displaying the message. Hence, the recording of a program specified with a program tag in a message can be easily preset.

In the fifth aspect of the present invention, the broadcast program related information processor decides whether or not a program specified with a program tag externally specified during displaying the message is before or during broadcasting or in a recorded state, and instructs, when determining a program before broadcasting, to preset the recording of a program specified in accordance with the program tag information, and instructs, when determining a program during broadcasting or in a recorded state, to replay a program specified in accordance with the program tag information. Hence, watching or presetting of recording can be easily performed by automatically deciding whether or not a program corresponding to a program tag in the message can be video-recorded or watched.

In the sixth aspect of the present invention, the broadcast program related information processor displays, when a program specified with a program tag in a message to be displayed is before broadcasting, the program tag is displayed in a method for representing a recording reservable state, and displays, when a program specified with the program tag is during broadcasting or in a recorded state, the program tag is shown in a method of representing a displayable state, and displays, when a program specified with the program tag is in a broadcast state and in a non-recorded state, the program tag is shown in a method of representing a non-display state. Hence, by automatically deciding whether or not a program corresponding to a program tag in the message can be video-recorded or watched, the status of the program can be shown to a user.

In the seventh aspect of the present invention, the broadcast program related information processor converts a program tag in a message transmitted from a different area based on a database for storing correspondence relationships between program tags different at each area and in accordance with an area representing the program. Thus, watching or presetting of recording can be easily performed, with differences in broadcast time between areas concealed.

In the eighth aspect of the present invention, the broadcast program related information processor converts, when a program with the same content is re-telecast at a different time, a program tag buried in the message is converted into a program tag with the same content during broadcasting or in a recorded state. Hence, if a program broadcast at a different time is video-recorded, the same program can be easily watched.

In the ninth aspect of the present invention, the broadcast program related information processor converts, when a program with the same content is re-telecast at a different time, a program tag buried in the message is converted into a program tag of a program with the same content before broadcasting. Hence, if there is an unbroadcast program to be broadcast at a different time, video-recording can be easily reserved.

What is claimed is:

1. A broadcast program related information processor comprising:
   a creator for creating at least a program tag referring to said program based on information regarding a program during watching received from a program display controller, said program display controller display-controlling a telecast program during video-recording or broadcasting and a stored program during replaying;
   an inserter for inserting said created program tag into a location of a message as externally specified by a user, said program tag being subsequently usable to control displaying and/or recording of a program, wherein said inserter inserts said program tag into said location of a message in creation in accordance with an external instruction;
   a decider for deciding whether or not a program specified with a program tag externally specified during displaying said message is before or during broadcasting or in a recorded state, and wherein said decider, when determining a program before broadcasting, issues an instruction for reserving the video-recording of a program specified in accordance with information of said program tag and wherein said decider, when determining a program during broadcasting or a recorded program, issues an instruction for replaying a program specified in accordance with information of said program tag;
   means for displaying, when a program specified with a program tag in a message to be displayed is before broadcasting, a program tag in a representation method representing a record reservable state;
   means for displaying, when a program specified with said program tag is during broadcasting or in a recorded state, a program tag in a representation method of representing a displayable state;
   means for displaying, when a program specified with said program tag is in an already broadcast state and in a non-recorded state, a program tag in a representation method of representing a non-displayable state;
   means for instructing said program display controller to replay a program specified in accordance with program tag information externally specified during displaying said message;
   a database for storing correspondence relationships between program tags different at every area; and
   means for converting a program tag in a message transmitted from a different area based on said database and in accordance with an area representing said program.

2. A broadcast program related information processor comprising:
   a creator for creating at least a program tag referring to said program based on information regarding a program during watching received from a program display controller, said program display controller display-controlling a telecast program during video-recording or broadcasting and a stored program during replaying;
   an inserter for inserting said created program tag into a location of a message as externally specified by a user, said program tag being subsequently usable to control displaying and/or recording of a program, wherein said inserter inserts said program tag into said location of a message in creation in accordance with an external instruction;
   a decider for deciding whether or not a program specified with a program tag externally specified during displaying said message is before or during broadcasting or in a recorded state, and wherein said decider, when determining a program before broadcasting, issues an instruction for reserving the video-recording of a program specified in accordance with information of said program tag and wherein said decider, when determining a program during broadcasting or a recorded program, issues an instruction for replaying a program specified in accordance with information of said program tag;
   means for displaying, when a program specified with a program tag in a message to be displayed is before broadcasting, a program tag in a representation method representing a record reservable state;
   means for displaying, when a program specified with said program tag is during broadcasting or in a recorded state, a program tag in a representation method of representing a displayable state;
   means for displaying, when a program specified with said program tag is in an already broadcast state and in a non-recorded state, a program tag in a representation method of representing a non-displayable state;
   means for instructing said program display controller to replay a program specified in accordance with program tag information externally specified during displaying said message; and
   means for converting said program tag information in a message transmitted from a different area into a program tag in accordance with an area displaying said program, using an EPG (Electric Program Guide) for a user area.

3. A broadcast program related information processor comprising:
   a creator for creating at least a program tag referring to said program based on information regarding a program during watching received from a program display controller, said program display controller display-controlling a telecast program during video-recording or broadcasting and a stored program during replaying;
   an inserter for inserting said created program tag into a location of a message as externally specified by a user, said program tag being subsequently usable to control displaying and/or recording of a program, wherein said inserter inserts said program tag into said location of a message in creation in accordance with an external instruction;
   a decider for deciding whether or not a program specified with a program tag externally specified during displaying said message is before or during broadcasting or in a recorded state, and wherein said decider, when determining a program before broadcasting, issues an instruction for reserving the video-recording of a program specified in accordance with information of said program tag and wherein said decider, when determining a program during broadcasting or a recorded program, issues an instruction for replacing a program specified in accordance with information of said program tag;
   means for displaying, when a program specified with a program tag in a message to be displayed is before broadcasting, a program tag in a representation method representing a record reservable state;

means for displaying, when a program specified with said program tag is during broadcasting or in a recorded state, a program tag in a representation method of representing a displayable state;

means for displaying, when a program specified with said program tag is in an already broadcast state and in a non-recorded state, a program tag in a representation method of representing a non-displayable state;

means for instructing said program display controller to replay a program specified in accordance with program tag information externally specified during displaying said message;

wherein, by specifying a subscriber's area to a server that stores said message, said server converts a program tag in said message in accordance with said subscriber's area and transmits the converted program tag.

4. A broadcast program related information processor comprising:

a creator for creating at least a program tag referring to said program based on information regarding a program during watching received from a program display controller, said program display controller display-controlling a telecast program during video-recording or broadcasting and a stored program during replaying;

an inserter for inserting said created program tag into a location of a message as externally specified by a user, said program tag being subsequently usable to control displaying and/or recording of a program, wherein said inserter inserts said program tag into said location of a message in creation in accordance with an external instruction;

a decider for deciding whether or not a program specified with a program tag externally specified during displaying said message is before or during broadcasting or in a recorded state, and wherein said decider, when determining a program before broadcasting, issues an instruction for reserving the video-recording of a program specified in accordance with information of said program tag and wherein said decider, when determining a program during broadcasting or a recorded program, issues an instruction for replaying a program specified in accordance with information of said program tag;

means for displaying, when a program specified with a program tag in a message to be displayed is before broadcasting, a program tag in a representation method representing a record reservable state;

means for displaying, when a program specified with said program tag is during broadcasting or in a recorded state, a program tag in a representation method of representing a displayable state;

means for displaying, when a program specified with said program tag is in an already broadcast state and in a non-recorded state, a program tag in a representation method of representing a non-displayable state;

means for instructing said program display controller to replay a program specified in accordance with program tag information externally specified during displaying said message;

wherein a server storing said message receives a program tag of a recorded program and wherein said server converts, when a program tag in a message has the same content as the program content of a recorded program, the program tag in said message into the program tag of said recorded program and then transmits the program tag of said recorded program.

5. A broadcast program related information processing method, comprising the steps of:

creating at least a program tag referring to a program tag based on information on a program in watching received from a program display controller, said program display controller display-controlling a telecast program during video-recording or broadcasting and a stored program during replaying; and inserting said created program tag into a location of a message as externally specified by a user, said program tag being subsequently usable to control displaying and/or recording of a program, wherein said program tag is inserted into said location of a message in creation based on said external instruction;

deciding whether or not a program specified with a program tag externally specified during displaying said message is before or in broadcasting or in a recorded state, and issuing, when determining a program before broadcasting, an instruction for reserving the video-recording of a program specified in accordance with information of said program tag and issuing, when determining a program during broadcasting or in a recorded state, an instruction for replaying a program specified in accordance with information of said program tag;

displaying, when a program specified with a program tag in a message to be displayed is before broadcasting, a program tag in a representation method representing a record reservable state;

displaying, when a program specified with said program tag is during broadcasting or in a recorded state, a program tag in a representation method of representing a displayable state;

displaying, when a program specified with said program tag is in an already-broadcast state and in a non-recorded state, a program tag in a representation method of representing a non-displayable state;

instructing said program display controller to replay a program specified in accordance with program tag information externally specified during displaying said message; and converting a program tag in a message transmitted from a different area based on a database and in accordance with an area representing said program, said database storing correspondence relationships between program tags different at every area.

6. A broadcast program related information processing method, comprising the steps of:

creating at least a program tag referring to a program tag based on information on a program in watching received from a program display controller, said program display controller display-controlling a telecast program during video-recording or broadcasting and a stored program during replaying; and inserting said created program tag into a location of a message as externally specified by a user, said program tag being subsequently usable to control displaying and/or recording of a program, wherein said program tag is inserted into said location of a message in creation based on said external instruction;

deciding whether or not a program specified with a program tag externally specified during displaying said message is before or in broadcasting or in a recorded state, and issuing, when determining a program before broadcasting, an instruction for reserving the video-recording of a program specified in accordance with information of said program tag and issuing, when determining a program during broadcasting or in a recorded state, an instruction for replaying a program specified in accordance with information of said program tag;

displaying, when a program specified with a program tag in a message to be displayed is before broadcasting, a program tag in a representation method representing a record reservable state;

displaying, when a program specified with said program tag is during broadcasting or in a recorded state, a program tag in a representation method of representing a displayable state;

displaying, when a program specified with said program tag is in an already-broadcast state and in a non-recorded state, a program tag in a representation method of representing a non-displayable state;

instructing said program display controller to replay a program specified in accordance with program tag information externally specified during displaying said message; and converting said program tag information in a message transmitted from a different area into a program tag in accordance with an area displaying said program, using an EPG (Electric Program Guide) for a user area.

7. A broadcast program related information processing method, comprising the steps of:

creating at least a program tag referring to a program tag based on information on a program in watching received from a program display controller, said program display controller display-controlling a telecast program during video-recording or broadcasting and a stored program during replaying; and inserting said created program tag into a location of a message as externally specified by a user, said program tag being subsequently usable to control displaying and/or recording of a program, wherein said program tag is inserted into said location of a message in creation based on said external instruction;

deciding whether or not a program specified with a program tag externally specified during displaying said message is before or in broadcasting or in a recorded state, and issuing, when determining a program before broadcasting, an instruction for reserving the video-recording of a program specified in accordance with information of said program tag and issuing, when determining a program during broadcasting or in a recorded state, an instruction for replaying a program specified in accordance with information of said program tag;

displaying, when a program specified with a program tag in a message to be displayed is before broadcasting, a program tag in a representation method representing a record reservable state;

displaying, when a program specified with said program tag is during broadcasting or in a recorded state, a program tag in a representation method of representing a displayable state;

displaying, when a program specified with said program tag is in an already-broadcast state and in a non-recorded state, a program tag in a representation method of representing a non-displayable state;

instructing said program display controller to replay a program specified in accordance with program tag information externally specified during displaying said message; and specifying a subscriber's area to a server that stores said message, converting by said server a program tag in said message in accordance with said subscriber's area, and transmitting the converted program tag.

8. A broadcast program related information processing method, comprising the steps of:

creating at least a program tag referring to a program tag based on information on a program in watching received from a program display controller, said program display controller display-controlling a telecast program during video-recording or broadcasting and a stored program during replaying; and inserting said created program tag into a location of a message as externally specified by a user, said program tag being subsequently usable to control displaying and/or recording of a program, wherein said program tag is inserted into said location of a message in creation based on said external instruction;

deciding whether or not a program specified with a program tag externally specified during displaying said message is before or in broadcasting or in a recorded state, and issuing, when determining a program before broadcasting, an instruction for reserving the video-recording of a program specified in accordance with information of said program tag and issuing, when determining a program during broadcasting or in a recorded state, an instruction for replaying a program specified in accordance with information of said program tag;

displaying, when a program specified with a program tag in a message to be displayed is before broadcasting, a program tag in a representation method representing a record reservable state;

displaying; when a program specified with said program tag is during broadcasting or in a recorded state, a program tag in a representation method of representing a displayable state;

displaying, when a program specified with said program tag is in an already-broadcast state and in a non-recorded state, a program tag in a representation method of representing a non-displayable state;

instructing said program display controller to replay a program specified in accordance with program tag information externally specified during displaying said message;

wherein a server storing said message receives a program tag of a recorded program and wherein said server converts, when a program tag in a message has the same content as the program content of a recorded program, the program tag in said message into the program tag of said recorded program and then transmits the program tag of said recorded program.

* * * * *